United States Patent
Yoon et al.

(10) Patent No.: US 9,832,747 B2
(45) Date of Patent: Nov. 28, 2017

(54) MOBILE TERMINAL DEVICE, MOBILE PROCESSING CIRCUIT AND METHOD OF PROCESSING SIGNALS

(71) Applicant: Intel IP Corporation, Santa Clara, CA (US)

(72) Inventors: Dae Jung Yoon, Santa Clara, CA (US); Bertram Gunzelmann, Koenigsbrunn (DE); Ansgar Scherb, Nuremberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 65 days.

(21) Appl. No.: 14/859,404

(22) Filed: Sep. 21, 2015

(65) Prior Publication Data

US 2017/0086153 A1    Mar. 23, 2017

(51) Int. Cl.
*H04L 1/00* (2006.01)
*H04W 56/00* (2009.01)
*H04W 4/02* (2009.01)
*H04L 5/00* (2006.01)

(52) U.S. Cl.
CPC ......... *H04W 56/001* (2013.01); *H04L 5/0007* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 2010/0248708 A1* | 9/2010 | Koivisto | H04L 1/0003 455/419 |
| 2010/0279707 A1 | 11/2010 | Fischer et al. | |
| 2011/0263282 A1* | 10/2011 | Rune | H04J 11/0093 455/507 |

(Continued)

FOREIGN PATENT DOCUMENTS

WO    2014129716 A1    8/2014

OTHER PUBLICATIONS

International Search Report and the written opinion based on Application No. PCT/US2016/047115 (14 Pages) dated Nov. 18, 2016 (Reference Purpose Only).

(Continued)

*Primary Examiner* — Fan Ng
(74) *Attorney, Agent, or Firm* — Viering, Jentschura & Partner mbB

(57) ABSTRACT

A mobile terminal device includes a receiver circuit and a processing circuit. The receiver circuit is configured to receive a plurality of reference signal patterns from a plurality of transmission locations, wherein each of the plurality of reference signal patterns corresponds to a respective transmission location of the plurality of transmission locations. The processing circuit is configured to determine a synchronization offset estimate for each of the plurality of transmission locations based on the plurality of reference signal patterns to generate a plurality of synchronization offset estimates; determine if a minimum-valued synchronization offset estimate of the plurality of synchronization (Continued)

offset estimates satisfies predefined criteria; and determine a reception time window for processing data based on the minimum-valued synchronization offset estimate if the minimum-valued synchronization offset estimate satisfies the predefined criteria.

19 Claims, 14 Drawing Sheets

(56) References Cited

U.S. PATENT DOCUMENTS

| | | | | |
|---|---|---|---|---|
| 2013/0070726 A1* | 3/2013 | Zhang | ............... | H04W 56/0035 370/331 |
| 2013/0083780 A1* | 4/2013 | Luo | ................... | H04W 72/0406 370/336 |
| 2013/0170590 A1* | 7/2013 | Hyll | ................... | H04L 27/0014 375/343 |
| 2013/0178202 A1 | 7/2013 | Ho | | |
| 2013/0279437 A1* | 10/2013 | Ng | ........................ | H04W 48/16 370/329 |
| 2013/0308555 A1 | 11/2013 | Ho | | |
| 2014/0036800 A1 | 2/2014 | Frenne et al. | | |
| 2014/0056156 A1 | 2/2014 | Joengren | | |
| 2014/0092829 A1 | 4/2014 | Han et al. | | |
| 2014/0211762 A1* | 7/2014 | Bontu | ................... | H04W 36/30 370/332 |
| 2014/0301303 A1 | 10/2014 | Roman et al. | | |
| 2015/0085715 A1* | 3/2015 | Sun | ...................... | H04B 7/2656 370/280 |
| 2015/0092655 A1 | 4/2015 | Liao et al. | | |
| 2015/0350928 A1* | 12/2015 | Zhang | ................. | H04W 52/244 370/252 |

OTHER PUBLICATIONS

3GPP, TS 36.213 v12.5.0, 2015, pp. 72-73, Release 12.
Qualcomm Europe, "3GPP TSG-RAN WG1 #56bis; R1-091471, Time synchronization requirements for different LTE-A techniques", R1-091471, 2009, 4pages, South Korea.
Ericsson et al, "3GPP TSG-RAN WG1 #64; R1-110649, Aspects on Distributed RRUs with Shared Cell-ID for Heterogeneous Deployments", R1-110649, 2011, 11 pages,Taiwan.
Catt, "3GPP TSG RAN WG1 Meeting #72; R1-130118, Discussion on RE mapping for NZP CSI-RS", R1-130118, 2013, 5pages, Malta.
Office action received for the U.S. Appl. No. 14/864,995, dated Jun. 14, 2017, 20 Pages. (Reference Purpose Only).

* cited by examiner

NZP-CSI-RS RE allocation, AP 15 with normal CP

Timing offset phase rotation and DMRS-based/NZP-CSI-RS-based
timing offset estimation range MOBILE TERMINAL DEVICE, MOBILE PROCESSING CIRCUIT AND METHOD OF PROCESSING SIGNALS

TECHNICAL FIELD

Various embodiments relate generally to methods of processing signals, mobile processing circuits, and mobile terminal devices.

BACKGROUND

Timing synchronization between mobile terminals and network access points are an essential aspect in many conventional radio access technologies. Accordingly, it is critical that mobile terminals obtain initial timing offset synchronization and perform Continuous timing offset tracking with one or more network access points.

Conventional mobile terminals operating on Long Term Evolution (LTE) networks obtain initial timing synchronization with a proximate cell through reception and analysis of synchronization sequences such as Primary Synchronization Signals (PSS) and Secondary Synchronization Signals (SSS). After obtaining initial timing synchronization and determining the identity of the proximate cell using PSS and SSS, a mobile terminal may perform continuous synchronization tracking using cell specific reference signals (CRS) transmitted by the proximate cell. Accordingly, timing synchronization (i.e. both initial synchronization and tracking) may be reliant on a combination of both synchronization sequences and CRS.

In conventional use cases, mobile terminals operating on LTE networks may receive both control and traffic data from a single cell, i.e. a serving cell. However, recent introductions to the 3GPP specification, such as Coordinated Multipoint (CoMP) in Release 11, may involve receiving control and traffic data from different cells, which may change over time. For example, in a Joint Transmission (JT) CoMP scheme a mobile terminal may receive control data from a serving cell and subsequently receive traffic data from a plurality of cells, i.e. to promote transmit diversity in reception of traffic data. Alternatively, in a Dynamic Point Switching (DPS) CoMP scheme a mobile terminal may receive control data from a serving cell and subsequently receive traffic data from any one of a potential set of transmitting cells, where the transmitting cell performing transmission of the traffic data may change every subframe.

Accordingly, timing synchronization in scenarios having multiple transmit locations to a single mobile terminal may require synchronization with each transmit location instead of only a single transmit location as in conventional use cases.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
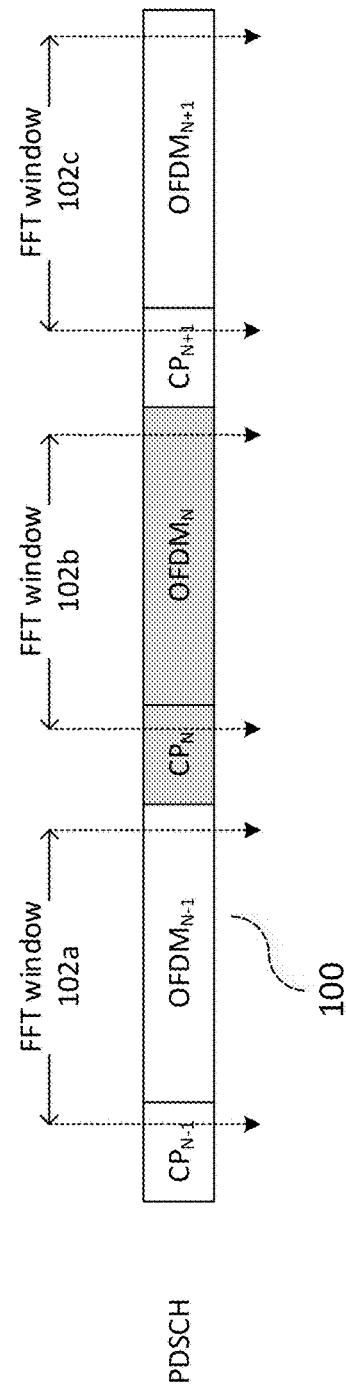
FIG. 1 shows an exemplary Orthogonal Frequency Division Multiplexing (OFDM) symbol stream.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

A "processing circuit" (or equivalently "processing circuitry") as used herein is understood as referring to a circuit that performs processing on a signal, such as e.g. any circuit that performs processing on an electrical or optical signal. A processing circuit may thus refer to any analog or digital circuitry that alters a characteristic or property of an electrical or optical signal. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), microprocessor(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, a "cell" in the context of telecommunications may be understood as a sector served by a base station. Accordingly, a cell may be a set of geographically co-located antennas that correspond to a particular sectorization. A base station may thus serve one or more "cells" (or sectors), where each cell includes at least one unique communication channel. An "inter-cell handover" may thus be understood as handover from a first "cell" to a second "cell", where the first "cell" is different than the second "cell". "Inter-cell handovers" may be characterized as either "inter-base station handovers" or "intra-base station handovers". "Inter-base station handovers" may be understood as handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" (or e.g. a "proxy cell") which a mobile terminal is currently connected to according to the mobile communication protocols of the associated mobile communication network standard. Furthermore, the term "cell" may be utilized herein in reference to any of a macrocell, microcell, femtocell, picocell, etc.

A mobile communication network may be characterized as a "heterogeneous" network or "homogenous" work. In a homogenous network, each cell may serve geographic areas having substantially similar size. In contrast, cells of a heterogeneous network may serve geographic areas having substantially different sizes. For example, a homogenous network may be composed entirely of "macro" cells, each of which transmit at high power to cover large geographic areas having substantially similar size. A heterogeneous network may be composed of cells serving geographic areas of a varying array of sizes, including macro cells, micro cells, pico cells, and femto cells. Accordingly, one or more "small" cells (micro, pico, femto, etc.) may be contained within a nearby macro cell. A further example may be a Remote Radio Head (RRH), which may be connected to a base station over e.g. an optical fiber, and may serve a smaller cell (e.g. pico or femto) which may be contained within a macro cell of the base station.

Downlink communications in mobile communication networks, i.e. data transmission from a network access point to a mobile terminal, may be conventionally received by a mobile terminal from a single network access point. Such downlink transmissions may require tight timing synchronization between a mobile terminal and the network access point it is receiving data from. However, recent advances in mobile communication technologies, such as Coordinated Multipoint (CoMP) network architectures, have provided additional scenarios involving multiple network access points. As a result, mobile terminals may need to maintain timing synchronization with multiple network access points, thereby adding additional complexity to timing synchronization procedures.

Third Generation Partnership Project (3GPP) Release 11 has introduced downlink CoMP as an instrument for reduction of inter-cell interference and improved utilization of wireless resources in Long Term Evolution (LTE) networks. 3GPP has specified several different CoMP schemes, including coordinated scheduling/coordinated beamforming (CS/CB), dynamic point blanking (DPB), dynamic point switching (DPS), and joint transmission (JT) in order to provide varying degrees of coordination for downlink transmissions to mobile terminals.

Each CoMP scheme may involve a level of coordination between multiple cells, i.e. "points", for transmission of downlink data traffic to a UE. Each CoMP implementation may include a set of points participating in such coordination, i.e. a CoMP cooperating set. CoMP schemes may include a set of points which participating mobile terminals are to perform and report signal measurements on, i.e. a CoMP measurement set. Each CoMP scheme may additionally include one or more transmission points (TPs), which collectively may be a subset of the CoMP cooperating set and/or the CoMP measuring set, that perform actual transmission of downlink data traffic to a given UE. CoMP schemes such as CS/CB and DPB may involve only cooperation in scheduling and beamforming between points to support transmission from a single TP to a given UE, and may thus be characterized by only having a single TP. As only a single TP may transmit downlink data traffic to a given UE, the downlink data traffic intended for the given UE may only need to be available at a single TP.

In contrast, JT and DPS (collectively referred to as Joint Processing (JP)) may have multiple TPs, and accordingly it may be possible for any single one of the TPs to transmit downlink data traffic to a given UE during a CoMP subframe. While control information associated with the Physical Downlink Control Channel (PDCCH) may be consistently transmitted to a UE from a single serving cell (which may or may not be a TP), downlink data traffic associated with the Physical Downlink Shared Channel (PDSCH) may be transmitted from any subset of a plurality of TPs during a given subframe. For example, JT schemes involve transmission of downlink data traffic by multiple TPs during a CoMP subframe, i.e. a plurality of the TPs may simultaneously transmit the same downlink data traffic to a single UE. DPS schemes involve dynamic switching of the actual transmitting TP on a per-subframe basis, and accordingly the active TP (i.e. the single TP performing PDSCH transmission during a given subframe) may switch between any one of the provided TPs every subframe.

3GPP Release 11 included the aforementioned downlink CoMP schemes as part of Transmission Mode 10 (TM10). 3GPP Release 11 additionally specified two distinct configurations of TM10 UE behavior: TM10 UE type-A and TM10 UE type-B. TM10 UE type-A and TM10 UE type-B configurations are both associated with the concept of "quasi co-location", which specifies assumptions that a UE may make regarding large scale signal properties of antenna ports. Type A TM 10 UEs may assume that antenna ports 0-3 and 7-22 of a serving cell are quasi co-located, i.e. have the same large scale signal properties such as Doppler shift, Doppler spread, average delay, and delay spread. In contrast, TM10 UE type-B may only assume that antenna ports 15-22 (e.g. corresponding to Channel State Information Reference Signal (CSI-RS) resource configurations) corresponding to a CSI-RS configuration specifically identified in control information and antenna ports 7-22 (e.g. corresponding to PDSCH and Demodulation Reference Signal (DMRS) configurations) are quasi co-located. A TM 10 UE type-B may thus need to receive control information specifying quasi co-location between specific antenna ports in order to assume quasi co-location between CSI-RS antenna ports and DMRS antenna ports. TM10 UE Type-B may not make any quasi co-location assumptions between CRS and CSI-RS or DMRS antenna ports.

It is appreciated that due to the associated quasi co-location assumptions relative to cell-specific reference signal (CRS) antenna ports 0-3, TM10 UE type-A may be able to utilize CRS for timing synchronization procedures. However, CRS may be ineffective for timing synchronization purposes for TM10 UE type-B, especially in scenarios in which one or more TPs share the same cell ID and thus may transmit identical CRS.

Accordingly, TM10 UE type-B may utilize CSI-RS (specifically non-zero power CSI-RS, or NZP-CSI-RS) for timing synchronization in TM10 UE type-B. Cells that are part of a CoMP scheme in an LTE network may transmit an NZP-CSI-RS configuration according to one of 19 possible CSI-RS configurations on one or more of antenna ports 15-22. The network may provide a TM10 UE type-B with an NZP-CSI-RS configuration during each CoMP subframe that informs the TM10 UE type-B which NZP-CSI-RS configuration should be used for synchronized reception of data during the given CoMP subframe. The specified NZP-CSI-RS configuration may correspond to a single TP, such as e.g. in a DPS scheme, or more than one TP, such as e.g. in a JT scheme.

Accordingly, the network may provide a TM10 UE type-B with the relevant NZP-CSI-RS configuration for a given CoMP subframe as a PDSCH Resource Element (RE) Mapping and Quasi Co-location Indicator (PQI) index, which may be received by a TM10 UE type-B as control information associated with PDCCH during the beginning of each CoMP subframe. 3GPP has specified up to 4 possible values for the PQI index (e.g. 00, 01, 10, 11), where each PQI index uniquely corresponds to a parameter set specified by the higher layers. Each PQI index may thus, by way of the associated parameter set, correspond to a distinct NZP-CSI-RS configuration. A TM10 UE type-B may therefore receive and identify the PQI index for each CoMP subframe and utilize the NZP-CSI-RS configuration corresponding to the PQI index value for timing synchronization during each subframe, such as by calculating a timing offset estimate based on the NZP-CSI-RS configuration.

Each PQI index may correspond to one or more TPs in a CoMP scheme. For example, each PQI index may correspond to a single TP in a DPS scheme, thereby allocating each TP a distinct NZP-CSI-RS configuration. However, a PQI index may correspond to more than one TP in a JT scheme, thereby forming a "virtual TP" composed of several TPs that is associated with a single NZP-CSI-RS configuration. A TM10 UE type-B may thus not be able to explicitly identify which TP(s) is/are the active TP(s) (i.e. the TP(s) transmitting PDSCH data during the current CoMP subframe according to the specified PQI index). Nevertheless, TM10 UE type-B may maintain timing synchronization with each TP or set of TPs by way of utilizing the PQI index to identify the corresponding NZP-CSI-RS configuration (as specified in the parameter set associated with each PQI index) to perform timing synchronization during each CoMP subframe.

The NZP-CSI-RS configuration corresponding to each of the PQI indices may be a distinct NZP-CSI-RS configuration, where each NZP-CSI-RS configuration is distinguished by a different RE allocation in the time-frequency resource grid. Consequently, a TM10 UE type-B may be able to receive the NZP-CSI-RS configuration corresponding to a selected PQI index during each CoMP subframe. Although only one NZP-CSI-RS configuration may be utilized for synchronized PDSCH data demodulation, a TM10 UE type-B may nevertheless calculate a timing offset estimate for each received NZP-CSI-RS configuration, which may then be utilized at a later time. For example, a TM10 UE type-B may perform timing synchronization tracking on each PQI index by calculating a timing offset estimate for each received NZP-CSI-RS configuration. While only the timing offset corresponding to the NZP-CSI-RS configuration of the specified PQI index may be used for actual synchronized PDSCH data demodulation during a given CoMP subframe, a TM10 UE type-B may nevertheless maintain synchronization with the TP(s) associated with each PQI index by performing timing offset estimation on the NZP-CSI-RS configuration associated with each PQI index.

A TM10 UE type-B may thus maintain an NZP-CSI-RS-based timing offset estimate for each PQI index, and may update each NZP-CSI-RS-based timing offset estimate based on the NZP-CSI-RS configuration received from the TPs associated with each PQI index during each CoMP subframe. As the RE allocation of each NZP-CSI-RS configuration is assumed constant, a TM10 UE type-B may continuously update the NZP-CSI-RS-based timing offset estimated associated with each PQI index during each subframe. A TM10 UE type-B may then select the appropriate NZP-CSI-RS-based timing offset estimate for each CoMP subframe based on the received PQI, and utilize the select NZP-CSI-RS-based timing offset estimate for PDSCH demodulation during the current subframe.

A TM10 UE type-B may perform NZP-CSI-RS-based timing offset estimation by performing on phase rotation measurements of reference signals over multiple frequency tones (i.e. subcarriers). A measured phase rotation is then translated into the time domain as a timing offset. Timing offset estimation may be calculated in the frequency domain as a phase rotation estimate $\hat{\theta}_{rs}$ as follows:

$$\hat{\theta}_{rs} = angle\left(\sum_{i=0}^{N_{sample}-1} Y_i Y_{i+1}^*\right) / N_{REgap}, \quad (1)$$

where angle(•) gives the phase of the argument, $Y_i$ is the $i^{th}$ sample of the reference signal over frequency tones, $N_{sample}$ is the number of reference signal samples in the frequency domain, and $N_{REgap}$ is the number of RE gaps between sample $Y_i$ and $Y_{i+1}$, which may consequently be dependent on the frequency distribution of based on the type of reference signal of $Y_i$. NZP-CSI-RS configurations may be relatively sparsely distributed in the frequency domain, and accordingly may have $N_{REgap\_CSIRS}=12$ corresponding to the distribution of a single subcarrier allocated to CSI-RS per block of 12 subcarriers. A TM10 UE type-B may therefore determine a timing offset estimate for each PQI by calculating an NZP-CSI-RS-based timing offset estimate for the NZP-CSI-RS configuration associated with each PQI index according to the specified parameter sets.

A TM10 UE type-B may utilize the NZP-CSI-RS-based timing offset estimate for the current subframe by applying the NZP-CSI-RS-based timing offset estimate in phase de-rotation during PDSCH demodulation. TM10 UE type-B may simply perform this timing synchronization procedure during each subframe, i.e. by determining an appropriate NZP-CSI-RS-based timing offset estimate from the specified NZP-CSI-RS configuration and applying the NZP-CSI-RS-based timing offset estimate during the current subframe.

In addition to performing phase de-rotation of PDSCH data as part of timing synchronization procedures, a TM10 UE type-B may also need to determine appropriate placement of a time window in order to demodulate the individual symbols of PDSCH data. For example, PDSCH data may be received as a sequence of Orthogonal Frequency Division Multiplexing (OFDM) symbols, where each OFDM symbol has a predetermined duration.

FIG. 1 shows exemplary PDSCH data 100 including OFDM symbols $OFDM_{N-1}$, $OFDM_N$, and $OFDM_{N-1}$ with corresponding respective cyclic prefixes $CP_{N-1}$, $CP_N$, and $CP_{N+1}$. As shown in FIG. 1, Fast Fourier Transform (FFT) windows 102a-102c may be utilized in order to receive OFDM symbols $OFDM_{N-1}$, $OFDM_N$, and $OFDM_{N-1}$, respectively.

Cyclic prefixes $CP_{N-1}$, $CP_N$, and $CP_{N+1}$ may be placed in front of respective OFDM symbols $OFDM_{N-1}$, $OFDM_N$, and $OFDM_{N-1}$ in order to counter inter-symbol interference (ISI), such as e.g. ISI caused by multipath channel effects. Cyclic prefixes $CP_{N-1}$, $CP_N$, and $CP_{N+1}$ may be e.g. 4.7 μs in duration (or e.g. 5.2 μs in the case of special OFDM symbols), while OFDM symbols $OFDM_{N-1}$, $OFDM_N$, and $OFDM_{N-1}$ may be 66.7 μs in duration.

A UE operating in an LTE network may be able to properly demodulate each of OFDM symbols $OFDM_{N-1}$, $OFDM_N$, and $OFDM_{N-1}$, thereby demodulating PDSCH PDSCH data 100, by selecting appropriate placement of each of FFT windows 102a-102c. In particular, placement of FFT windows such that an FFT window contains an OFDM symbol or an OFDM symbol and a portion of the cyclic prefix of the OFDM symbol may allow for effective demodulation of an OFDM symbol. Accordingly, FFT window placement that contains the cyclic prefix of a different OFDM symbol may introduce corruption to the PDSCH data during demodulation, e.g. in the form of ISI. It is appreciated that such FFT window placement scenarios are not unique to PDSCH data, and may be utilized for data associated with any channel in an LTE system.

A TM10 UE type-B may thus need to select a time window with which to apply a Fast Fourier Transform (FFT) to in order to properly demodulate each OFDM symbol, where the optimal placement of the FFT window may vary depending on which TP(s) is/are the active TP(s) (e.g. which TP or TPs are associated with the specified PQI index for the current CoMP subframe). However, the positioning of FFT windows may be relatively constant for each subframe, and thus, a TM10 UE type-B may not be able to dynamically adjust the FFT window placement for each CoMP subframe. Accordingly, a TM10 UE type-B may need to select an FFT window placement that is suitable for PDSCH demodulation for each possible PQI index. As will be described, it is essential that a TM10 UE type-B select such proper FFT window placement in order to ensure that the PDSCH data for each CoMP subframe is demodulated successfully.

Figure 2:
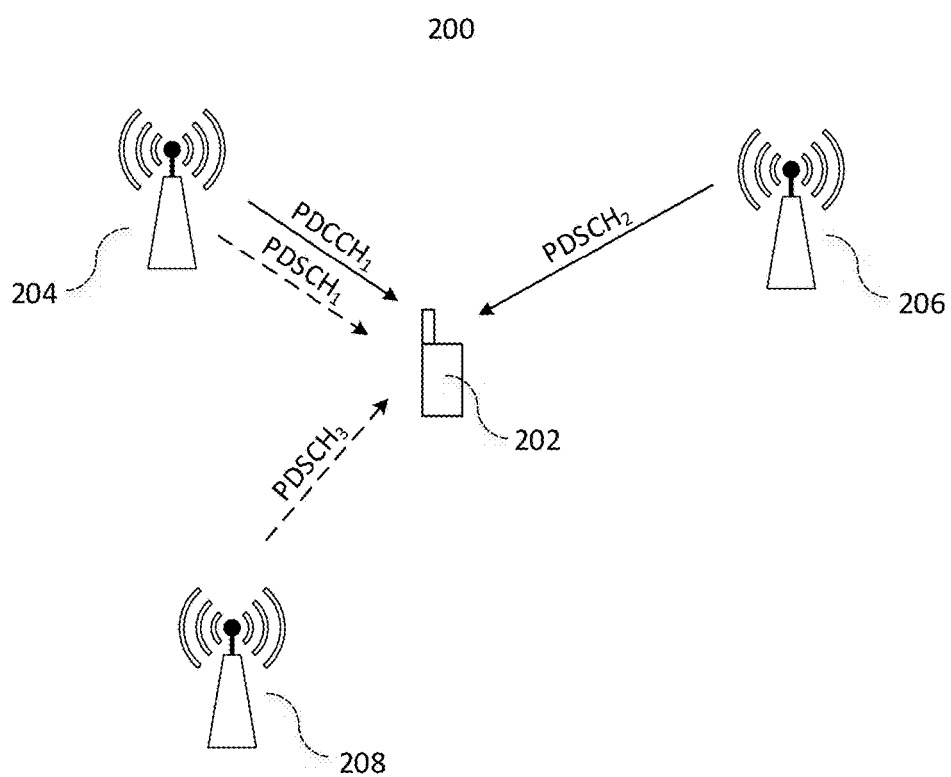
FIG. 2 shows an exemplary mobile communication network.

FIG. 2 illustrates an exemplary CoMP architecture for a CoMP network using DPS scheme 200. TPs 204-208 may each be a TP for A CoMP network using DPS scheme 200, and accordingly may each be part of the CoMP cooperating set for CoMP network 200. TPs 204-208 may therefore each coordinate to transmit downlink data traffic to UE 202, which may be located proximate to TPs 204-208. It is appreciated that while 3 TPs are explicitly shown in FIG. 2, it is understood that more or fewer TPs may be utilized in a CoMP scenario. Additionally, while the following scenarios will be described where each TP uniquely corresponds to a PQI index, it is additionally understood that more than one TP may correspond to a PQI index, thus forming a "virtual cell" as previously indicated. Thus, while the following description may refer to a single TP as the "active TP" for each CoMP subframe, it is understood that more than one TP may be the "active TPs" in scenarios where multiple TPs are associated with a single PQI index.

Each of eNBs 204-208 may thus be available to transmit downlink data traffic associated with the PDSCH to UE 202 during each subframe. The active TP (i.e. the single TP of TPs 204-208 performing transmission of PDSCH data to UE 202 during the current subframe) may dynamically switch for each subframe, such as e.g. based on feedback received from UE 202 indicating the channel quality associated with PDSCH data received from each of TPs 204-208. UE 202 may thus need to be prepared to receive PDSCH data from any one of TPs 204-208 for each subframe, and accordingly may be required to maintain continuous synchronization with each of TPs 204-208.

As shown in FIG. 2, PDSCH channels $PDSCH_1$, $PDSCH_2$, and $PDSCH_3$ may each represent a wireless channel used to transmit PDSCH data from one of respective TPs 204-208 to UE 202. In accordance with DPS schemes as specified by 3GPP Release 11, only one of TPs 204-208 may be designated as the active TP during a given CoMP subframe, and accordingly only the respective PDSCH channel of PDSCH channels $PDSCH_1$, $PDSCH_2$, and $PDSCH_3$ may be active during the given CoMP subframe. As illustrated in FIG. 2, TP 206 may be designated as the active TP during the current subframe, and accordingly $PDSCH_2$ may be active during the current subframe (as indicated by the solid line for $PDSCH_2$). In contrast, PDSCH channels $PDSCH_1$ and $PDSCH_3$ may be inactive during the current subframe (as indicated by the dashed lines for $PDSCH_2$ and $PDSCH_3$). Although $PDSCH_1$ and $PDSCH_3$ may be inactive during the current subframe, TPs 206 and 208 may still transmit wireless signals that may be received by UE 202, such as e.g. reference signals as will be later described. It is appreciated that while the exemplary scenario of FIG. 2 includes three TPs, 3GPP Release 11 has specified the use of anywhere up to four TPs in downlink CoMP scenarios. In connection, it is understood that this disclosure is demonstrative in nature, and accordingly may be expanded in application to CoMP scenarios with any number of TPs.

TP 204 may be designated as the serving cell for UE 202, and therefore may exhibit an increased degree of control over communications with UE 202 than eNBs 206 and 208. It is appreciated that while the serving cell, i.e. TP 204, in the current exemplary scenario is a TP in A CoMP network using DPS scheme 100, the serving cell for a TM10 UE type-B may or may not be a TP in a CoMP network. TP 204 may be responsible for transmitting control information to UE 202, such as control information associated with the PDCCH. TP 204 may therefore transmit PDCCH data to UE 202 over PDCCH channel $PDCCH_1$. TP 204 may transmit PDCCH data to UE 202 during each subframe. It is appreciated that the TP transmitting PDCCH data to UE 202 may not switch on a subframe basis. TP 204 may thus be solely responsible for transmission of PDCCH data to UE 202 for the duration of time that TP 204 remains the serving cell of UE 202.

3GPP Release 11 has identified several scenarios particularly applicable to CoMP architectures, where each scenario involves coordination between one or more macro evolved nodeBs (eNB) and/or Remote Radio Heads (RRHs). It is appreciated that TPs 204-208 may in practice be any type of network access point of A CoMP network using DPS scheme 200. For example, TPs 204-208 may be individual cells of one or more base stations, RRHs associated with one or more base stations, micro cells, etc.

In JP applications such as a network using CoMP DPS scheme 200, a mobile terminal such as UE 202 may receive downlink data transmissions from multiple TPs over time, and accordingly must continuously maintain timing synchronization with each PQI index (i.e. the one or more TPs associated with each PQI index by way of the specified parameter sets). In one such scenario, multiple TPs in a JP configuration may share the same cell identity (cell ID). For example, TP 206 may be an RRH associated with TP 204, and may share the same cell ID with TP 204. TP 206 may therefore accordingly transmit identical cell-specific reference signals (CRSs), Primary Synchronization Signals (PSSs), and Secondary Synchronization Signals (SSSs) as TP 204. Accordingly, UE 202 may not be able to utilize these reference signals transmitted by TP 206 timing synchronization with TP 206.

Additionally, as the TPs in a CoMP configuration may be located at physically different locations (i.e. at separate eNBs and/or RRHs), quasi co-location of antenna ports can no longer be assumed with respect to some channel characteristics such as Doppler shift, Doppler spread, delay spread, delay shift or average gain. Regarding the specific example of a CoMP network using DPS scheme 200, UE 202 may not be able to assume that the antenna port transmitting PDCCH data, such e.g. one of CRS antenna ports 0-3 of serving cell 204, is quasi co-located with antenna ports transmitting PDSCH data, i.e. antenna ports 7-14, or with antenna ports transmitting CSI-RS, i.e. antenna ports 15-22.

Furthermore, one or more TPs in a CoMP scheme may not transmit any CRS, therefore rendering CRS-based timing synchronization therewith unfeasible.

Due to these restrictions on CRS-based timing synchronization, 3GPP Release 11 has specified that TM10 UE type-B are to perform timing synchronization using CSI-RS, which are additionally used by UEs for channel state estimation reporting and feedback. TPs in a JP CoMP scheme may transmit a NZP-CSI-RS pattern according to a specific NZP-CSI-RS configuration. Accordingly, TPs may transmit a periodic pattern of NZP-CSI-RS using an assigned set of REs over a sequence of CoMP subframes. The TPs associated with each PQI index may be configured to utilize a distinct set of REs to transmit NZP-CSI-RS, and accordingly a TM10 UE type-B may be able to uniquely receive a distinct NZP-CSI-RS configuration from the TP(s) associated with each PQI index during each subframe.

TM10 UE type-B may perform timing synchronization tracking for each PQI index by receiving and processing the respective NZP-CSI-RS configuration transmitted by the TP(s) of each PQI index. As previously indicated, a TM10 UE type-B perform timing synchronization by tracking an NZP-CSI-RS-based timing offset estimate based on PQI indices specified by the network for each CoMP subframe. A TM10 UE type-B may thus identify and update an NZP-CSI-RS-based timing offset estimate for each PQI index in a CoMP scheme, thereby maintaining a CSI-RS-based timing offset estimate for each TP without explicit knowledge of the identity of each TP.

A UE may then execute downlink reception during each CoMP subframe by utilizing the NZP-CSI-RS-based timing offset estimate associated with the PQI index specified by the network in relation to the current CoMP subframe, such as e.g. by selecting the related NZP-CSI-RS-based timing offset estimate based on the specified PQI index and applying the selected NZP-CSI-RS-based timing offset estimate in phase de-rotation for demodulation of PDSCH data.

Accordingly, each of TPs 204-208 may transmit a sequence of NZP-CSI-RS according to an assigned NZP-CSI-RS configuration. As previously indicated, the scenario detailed herein regarding A CoMP network using DPS scheme 200 is exemplary, and while the related description may assume only one TP per PQI index it is further understood that the parameter sets may be configured such that more than one TP maps to a single PQI index. It is appreciated that the following description is demonstrative in nature, and thus may be similarly applied to further scenarios in which more than one TP maps to a single PQI index.

In the exemplary scenario of A CoMP network using DPS scheme 200, each of TPs 204-208 may be mapped to a single distinct PQI index, which may be specified by the parameter sets configured by higher layers. UE 202 may receive the parameter set and PQI information via Radio Resource Control (RRC) signaling, and thus may be able to determine an NZP-CSI-RS-configuration corresponding to each PQI index. As previously indicated, UE 202 may thus be able to determine a distinct NZP-CSI-RS configuration corresponding to each PQI index, and thus may be able to determine an NZP-CSI-RS-based timing offset estimate for each PQI index based on NZP-CSI-RS configurations received during each CoMP subframe.

Figure 3:
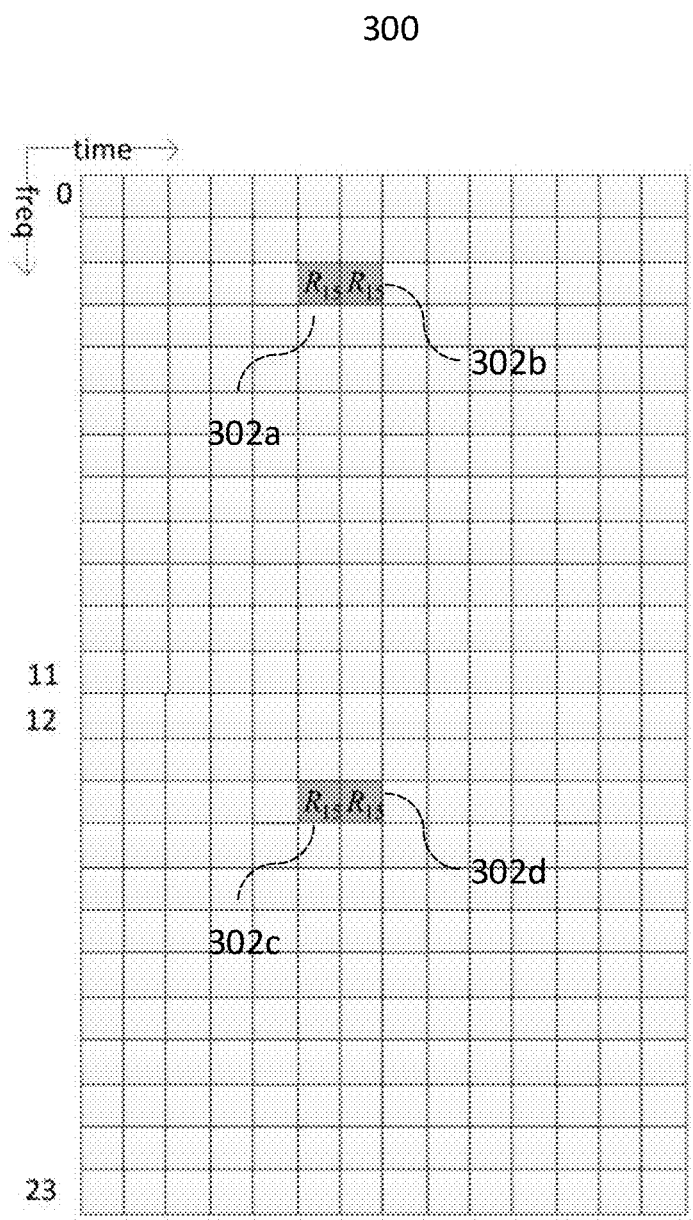
FIG. 3 shows a time-frequency reference grid.

FIG. 3 shows an exemplary illustration of resource grid 300. It is appreciated that resource grid 300 may correspond to a resource grid corresponding to an antenna port in LTE networks, where the vertical index of each RE corresponds to a subcarrier used for Orthogonal Frequency Division Multiplexing (OFDM) transmissions and the horizontal index of each RE corresponds to an OFDM symbol in time. Resource grid 300 may correspond to an RE allocation for an NZP-CSI-RS configuration for a TP operating in a CoMP scheme, such as e.g. one of TPs 204-208. Resource grid 300 may correspond to the RE mapping for an NZP-CSI-RS configuration on a single antenna port (AP) of TP 204 with a normal cyclic prefix (CP), e.g. antenna port 15 as depicted in FIG. 3.

As each of TPs 204-208 may transmit a NZP-CSI-RS configuration corresponding to the NZP-CSI-RS configuration associated with the respective PQI index of each TP. Each of TPs 204-208 may be configured to utilize a different set of REs. As illustrated in resource grid 300, TP 206 may transmit an NZP-CSI-RS configuration on REs 302a-302d. TPs 204 and 208 may therefore transmit respective NZP-CSI-RS configurations where each respective NZP-CSI-RS configuration uses a set of REs at different time-frequency locations on a common resource grid than REs 302a-302d.

As previously indicated, each TP may be associated with a parameter set, where each parameter set is configured by higher layers and uniquely identified by a PQI index. Accordingly, UE 202 may be able to determine the specific RE allocation for the NZP-CSI-RS configuration of each of PQI index. UE 202 may thus be able to measure and perform timing synchronization on each NZP-CSI-RS configuration using the connected RE allocation.

TM10 UE type-B may need to perform timing synchronization tracking using NZP-CSI-RS configurations transmitted from multiple TPs, i.e. from each of the TP(s) associated with each PQI index. For example, in order to effectively receive PDSCH data from each of TPs 204-208 in a DPS configuration, UE 202 may need to maintain timing synchronization with each of TPs 204-208. UE 202 may have several options to compute timing offset estimates to use for timing synchronization with each of TPs 204-208, including DMRS, CSI-RS, and CRS. Due to the aforementioned disadvantages of CRS and the accuracy issues of DMRS detailed below, UE 102 may select to utilize NZP-CSI-RS to compute timing offset estimates.

Timing synchronization may be further complicated in scenarios where more than one TP is mapped to a single PQI index. As opposed to attempting to uniquely associated each of TPs 204-208 with an NZP-CSI-RS configuration to calculate an timing offset estimate for each TP, UE 202 may instead simply calculate an timing offset estimate for each PQI index, where each PQI index may correspond to one or more TPs. UE 202 may thus maintain tight timing synchronization by relying on identifying each NZP-CSI-RS configuration based on PQI index as opposed to explicitly identifying each unique TP. In an exemplary aspect of the disclosure, UE 202 may calculate timing offset estimates (or e.g. phase offset estimates) for each PQI index using received NZP-CSI-RS configuration.

Although it is appreciated that only one of TPs 204-208 may transmit PDSCH data during a single subframe in a DPS configuration, each of TPs 204-208 may transmit an NZP-CSI-RS configuration during each subframe according to the respective NZP-CSI-RS configuration index of the corresponding PQI index. In addition to timing synchronization applications, UE 202 may be configured to perform measurements on each NZP-CSI-RS configuration and provide the resulting measurements back to the network, such as by identifying each measurement according to the PQI index associated with each NZP-CSI-RS configuration. The resulting measurements may be utilized to influence downlink transmissions, such as in order to select which of TPs 204-208 is to be selected as the active TP for a given subframe.

Each NZP-CSI-RS configuration may thus be configured in a manner such that the NZP-CSI-RS configurations for each PQI index utilizes a different RE allocation, thereby allowing UE 202 to uniquely receive each NZP-CSI-RS configuration for each PQI index. In addition to the aforementioned measurements, UE 202 may maintain timing synchronization with the TP(s) of each PQI index (e.g. each of TPs 204-208 in the exemplary scenario of A CoMP network using DPS scheme 200) by continuously receiving and processing NZP-CSI-RS configurations received from each of TPs 204-208 in order to derive an NZP-CSI-RS-based timing offset estimate associated with each PQI index (i.e. indirectly associated with each TP by way of PQI index). UE 202 may then utilize the NZP-CSI-RS-based timing offset estimate for each TP in order to receive PDSCH data during a single subframe from the active TP, such as by utilizing the NZP-CSI-RS-based timing offset estimate associated with the specified PQI index (corresponding to the active TP(s))) in phase de-rotation during PDSCH demodulation.

As previously indicated, UE 202 may apply the appropriate NZP-CSI-RS-based timing offset estimate in phase de-rotation during demodulation of PDSCH data during a given CoMP subframe. UE 202 may be able to apply a different NZP-CSI-RS-based timing offset estimate for phase de-rotation during each CoMP subframe, and thus may be able to adapt phase de-rotation during each CoMP subframe to be fully synchronized with the active TP(s) associated with the specified PQI index.

However, as detailed regarding FIG. 1, UE 202 may not be able to implement such a dynamic approach for FFT window placement, as FFT window placement may be limited to being substantially constant over multiple CoMP subframes. Accordingly, UE 202 may need to select an FFT window placement that is suitable for reception of PDSCH data from all possible PQI indices.

FFT window placement may be based on an initial timing reference point, such as a timing reference point based on the timing of the serving cell of UE 202. In the exemplary scenario detailed regarding FIG. 2, TP 204 may act as the serving cell, and consequently may be responsible for transmitting PDCCH data to UE 202 over PDCCH channel $PDCCH_1$ during each CoMP subframe. TP 204 may additionally transmit a CRS sequence, which UE 202 may utilize for timing synchronization of PDCCH reception from the serving cell. Accordingly, UE 202 may derive an initial timing reference point using conventional CRS-based timing offset estimation of the serving cell (TP 204), which may not be limited by the same timing offset estimation range restrictions as NZP-CSI-RS-based timing offset estimation due to the relatively wideband characteristics of CRS sequences in the frequency domain.

UE 202 may utilize the initial timing reference point for selection of an appropriate FFT window for performing demodulation of OFDM symbols associated with the PDSCH. This process may be relatively straightforward for UEs receiving downlink communications from a single cell, as the PDSCH transmissions may share an identical timing offset with reception of PDCCH data which the initial timing reference point is based upon. However, this may be complicated in CoMP scenarios, as PDSCH traffic may be received from a different point than PDCCH traffic in a CoMP scheme. Consequently, the PDSCH traffic received from the active TP(s) and PDCCH traffic received from the serving cell may not be time-aligned in a given subframe, and may vary on a per-subframe basis as the active TP(s) for each CoMP subframe switches according to PQI index.

The timing of PDSCH traffic received from an active TP(s) may be either negatively offset or positively offset relative to a timing reference point based on PDCCH traffic received from the serving cell. In order to reduce intersymbol interference (ISI) caused by multipath delay, a guard period referred to as a cyclic prefix (CP) is inserted before each OFDM symbol in LTE downlink data. Consequently, reception of delayed multipaths associated with the previous symbol may fall within the CP. ISI may thus be avoided through proper selection of CP length that is sufficient to capture the multipath of the previous symbol with the largest delay, i.e. CP length that is greater than the length of the multi-path delay spread.

As previously indicated, the placement of the FFT window utilized for OFDM modulation may be selected based on the initial timing reference point of the serving cell. The placement of CPs immediately preceding OFDM symbols may alleviate potential adverse effects of positive timing offset, as the beginning FFT window may merely fall within the cyclic prefix of the desired OFDM symbol. Accordingly, ISI in reception of PDSCH data traffic from TPs with positive timing offset may be avoided.

However, reception of PDSCH data traffic from TPs with negative timing offset may have significant adverse effects. In contrast to the positive timing offset case, the FFT window in a negative timing offset case may fall into the CP of the next OFDM symbol, thereby causing ISI with the current OFDM symbol.

Figure 4:
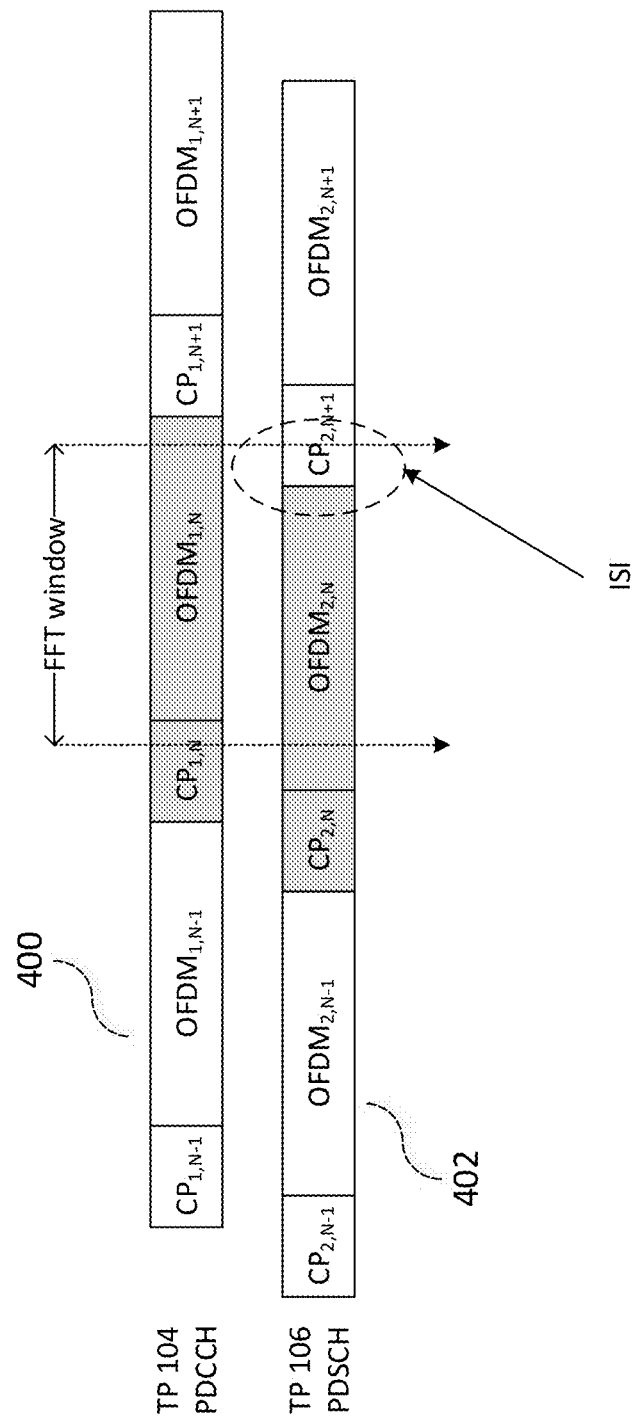
FIG. 4 shows an exemplary OFDM stream affected by inter-symbol interference.

FIG. 4 illustrates an exemplary case of ISI caused by negative timing offset. In FIG. 4, UE 202 may initially receive PDCCH data traffic from TP 204 over $PDCCH_1$ of FIG. 2. TP 204 may therefore be the serving cell to UE 202. UE 202 may derive an initial timing reference point based on CRS received from TP 204, and may accordingly select placement for an FFT window for demodulation of OFDM data symbols based on the initial timing reference point. UE 202 may then utilize the selected FFT window to demodulate PDSCH data traffic received from any one of TPs 204-208 during CoMP subframes. As detailed regarding FIG. 2, any one of TPs 204-208 may transmit PDSCH data traffic to UE 202 during a CoMP subframe according to PQI index.

In the exemplary scenario of FIG. 4, TP 206 may be the active TP for the current subframe. The current subframe may include at least OFDM symbols $OFDM_{N-1}$, $OFDM_N$, and $OFDM_{N+1}$, and accordingly TP 206 may transmit UE 202 at least OFDM symbols $OFDM_{N-1}$, $OFDM_N$, and $OFDM_{N+1}$ over $PDSCH_2$.

UE 202 may select an FFT window based on the initial timing reference point associated with PDCCH data traffic received from TP 204. As shown by OFDM symbol stream 400, the FFT window placement may be selected such that a given OFDM symbol $OFDM_{1,N}$ will fall substantially within the FFT window, thereby allowing effective demodulation. A portion of the FFT window may fall before the start of $OFDM_{1,N}$ in the cyclic prefix $CP_{1,N}$ associated with $OFDM_{1,N}$. However, as $CP_{1,N}$ is associated with $OFDM_{1,N}$, demodulation of $OFDM_{1,N}$ using the FFT window may not be adversely affected.

UE 202 may then utilize the selected FFT window for demodulation of OFDM symbols in OFDM symbol stream 402, which may be PDSCH data traffic received from TP 206 as part of A CoMP network using DPS scheme 200. TP 206 may be negatively offset relative to the initial timing reference point of serving cell 204, which UE 202 has locked onto for the purposes of FFT window placement. While the FFT window placement may be suitable for receiving OFDM symbols in OFDM symbol stream 400, the FFT window will be negatively offset for OFDM symbol such as OFDM symbol $OFDM_{2,N}$ in OFDM symbol stream 402 associated with PDSCH data traffic of TP 206.

As shown in FIG. 4, the end of the FFT window may fall within the $CP_{2,N+1}$ of the next OFDM symbol $OFDM_{2,N+1}$. OFDM symbol $OFDM_{2,N}$ received using the selected FFT window will subsequently be contaminated by ISI. It is appreciated that the FFT window may be similarly placed for OFDM symbol $OFDM_{2,N-1}$, $OFDM_{2,N+1}$, and one or more preceding or proceeding OFDM symbols, which may additionally be contaminated with ISI.

In addition to selecting an initial FFT window placement to align with received PDSCH, UE 202 may periodically update the FFT window placement, which may be dependent on e.g. UE mobility, as timing offsets will appreciably vary as UE 202 moves to different physical locations with respect to the TPs. However, such re-adjustments may still not solve the underlying negative offset problems.

Negative timing offsets for FFT window placement for demodulation of OFDM symbols for PDSCH data traffic may therefore introduce significant performance degradation in demodulation. For normal cyclic prefix settings, cyclic prefix duration is 4.7 µs. If timing alignments of CoMP TPs are not made within the cyclic duration, such performance degradation may be unavoidable. TPs may undertake preventative measures by attempting trial timing adjustments with positive timing offsets, thereby employing the presence of cyclic prefixes in order to avoid ISI. However, such trial timing adjustments may not be robust as TPs are unable to adjust timing alignment in order to target specific UEs. Varying degrees of performance degradation due to negative timing offset may thus be inevitable for certain TM10 UE type-B in a CoMP network.

As previously mentioned, the reception of PDSCH data traffic from TPs characterized by a negative timing offset relative to the serving cell may introduce ISI onto OFDM symbols during PDSCH demodulation. As the FFT window for OFDM symbol demodulation may be placed according to an initial timing reference point based on PDCCH data traffic received from the serving cell, the FFT window may be placed such that the cyclic prefix of a subsequent OFDM symbol following the desired OFDM symbol may fall within the FFT window, i.e. as described regarding FIG. 4. Accordingly, demodulation of the desired OFDM symbol may be corrupted by ISI caused by the subsequent OFDM symbol.

Optimization on FFT window positioning may be effectively performed based on the timing offsets of each PQI index and PQI index switching. Although FFT window placement is semi-static, its optimization can be performance depending on TM10 UE behaviors. For example, the lowest-valued timing offset estimate (including negative timing offset estimates) among the timing offset estimates of each PQI index (i.e. by evaluating a timing offset estimate of each PQI index) may be determined. This lowest-valued timing offset estimate may be utilized in order to select an appropriate FFT window position such that the adverse effects of negative timing offsets are eliminated or reduced.

Referring back to the exemplary scenario of A CoMP network using DPS scheme 200 detailed regarding FIG. 2, UE 202 may obtain a timing offset estimate for each PQI index, such as by performing timing offset estimation on the NZP-CSI-RS configuration specified for each PQI index.

UE 202 may then identify the lowest-valued timing offset estimate based on the timing offset estimates obtained for each PQI. If the lowest-valued timing offset estimate is negative and within CP length, UE 202 may select an FFT window position based on the lowest-valued timing offset estimate, and subsequently utilize the FFT window position for OFDM symbol demodulation for PDSCH demodulation. UE 202 may then compensate the timing offset estimates associated with the remaining PQI indices by performing phase de-rotation.

Figure 5:
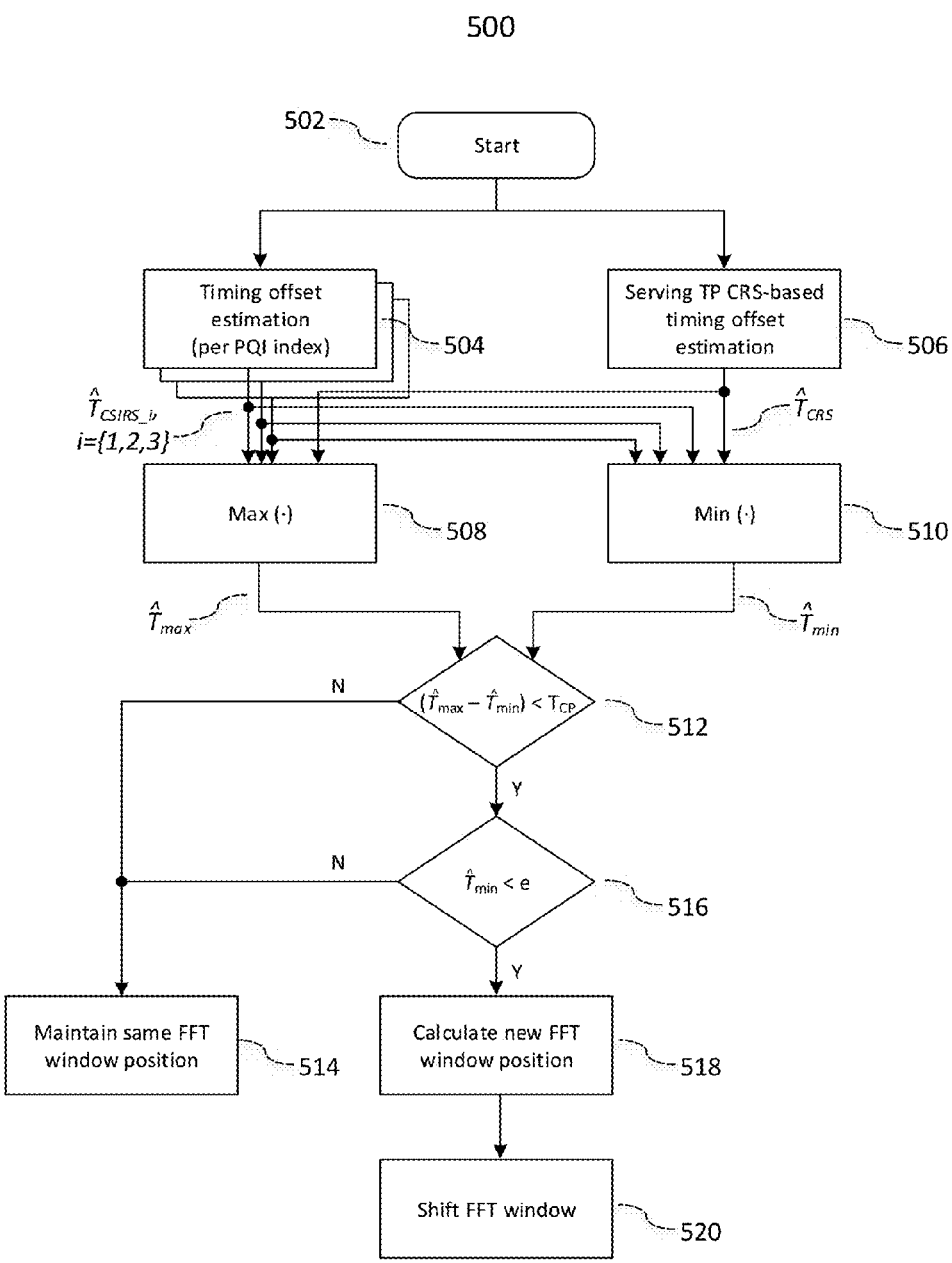
FIG. 5 shows a flow diagram illustrating a Fast Fourier Transform (FFT) window optimization process for multiple transmit locations according to a first aspect of the disclosure.

FIG. 5 shows a flow chart illustrating method 500. Method 500 may be utilized to determine a suitable FFT window position based on the timing offset estimates associated with multiple TPs in a CoMP network, such as TPs 204-208 in A CoMP network using DPS scheme 200 of FIG. 2. Method 500 may be implemented by a UE such as UE 202 in order to mitigate effects of ISI in OFDM symbol demodulation caused by negative timing offset estimates of one or more of TPs 204-208.

Method 500 may start at 502. UE 202 may be initially configured as a TM10 UE type-B, and may be configured to receive CoMP downlink traffic in the form of PDSCH data traffic from TPs 204-208.

UE 202 may perform timing offset estimation in 504. UE 202 may obtain an NZP-CSI-RS-based timing offset estimate for each possible PQI index, i.e. may determine a set of PQI index timing offset estimates $\hat{T}_{CSIRS\_i}$, i={1, 2, 3}. As previously detailed, each possible PQI index i may correspond to one of TPs 204-208, although it is understood that further scenarios are possible in which each possible PQI index i may correspond to more than one TP. UE 202 may obtain a current timing offset estimate for each PQI index in 504 using NZP-CSI-RS-based timing offset estimation.

UE 202 may obtain an NZP-CSI-RS-based timing offset estimate for each PQI index by performing phase rotation measurements for the NZP-CSI-RS configuration associated with each PQI index as detailed regarding Equation 1, thereby determining a set of PQI index timing offset estimates $\hat{T}_{CSIRS\_i}$, i={1, 2, 3} in 504.

UE 202 may additionally perform CRS-based timing offset estimation of the serving cell in 506. UE 202 may therefore receive a CRS from the serving cell along with PDCCH data traffic and obtain a CRS-based timing offset estimate $\hat{T}_{CRS}$ based on the received CRS.

The set of PQI index timing offset estimates $\hat{T}_{CSIRS\_i}$, i={1, 2, 3} and the serving cell CRS-based timing offset estimate $\hat{T}_{CRS}$ may be analyzed in 508 and 510. 508 may select the maximum-valued timing offset estimate $\hat{T}_{max}$ of the provided inputs, i.e. the timing offset estimate that is most positively valued. 510 may select the minimum-valued timing offset estimate $\hat{T}_{min}$ of the provided inputs, i.e. the timing offset estimate that is most negative valued.

512 may then evaluate the expression $(\hat{T}_{max}-\hat{T}_{min})<T_{CP}$, where $\hat{T}_{max}$ is the maximum-valued timing offset estimate, $\hat{T}_{min}$ is the minimum-valued timing offset estimate, and $T_{CP}$ is the duration of the cyclic prefix. 512 may therefore determine the separation in time $(\hat{T}_{max}-\hat{T}_{min})$ between maximum-valued timing offset estimate $\hat{T}_{max}$ and minimum-valued timing offset estimate $\hat{T}_{min}$.

If the separation in time $(\hat{T}_{max}-\hat{T}_{min})$ between maximum-valued timing offset estimate $\hat{T}_{max}$ and minimum-valued timing offset estimate $\hat{T}_{min}$ is greater than the duration of the cyclic prefix $T_{CP}$, ISI may be unavoidable. In other words, there may not exist an FFT window position that is effective for capturing OFDM symbols associated with maximum-valued timing offset estimate $\hat{T}_{max}$ and minimum-valued timing offset estimate $\hat{T}_{min}$ that falls within the length of the cyclic prefix $T_{CP}$. Accordingly, FFT window positioning adjustment may not offer a distinct advantage over the existing FFT window placement, and method 500 may proceed to 514 and maintain the same FFT window position.

Alternatively, if the separation in time $(\hat{T}_{max}-\hat{T}_{min})$ is less than the duration of the cyclic prefix $T_{CP}$, adjustment of the FFT window position may be advantageous. Method 500 may proceed to 516, which may evaluate $\hat{T}_{min}<e$ to determine if minimum-valued timing offset estimate $\hat{T}_{min}$ is negative. Accordingly, e may be a negative tolerance parameter close to zero in value, and thus may be used to determine if $\hat{T}_{min}$ is negative within a small tolerance value.

If minimum-valued timing offset estimate $\hat{T}_{min}$ is positive, method 500 may continue to 514 and maintain the same FFT window position, as ISI may already be avoided due to the effect of the cyclic prefix on positive timing offsets. If minimum-valued timing offset estimate $\hat{T}_{min}$ is negative, method 500 may calculate a new FFT window position in 518 based on minimum-valued timing offset estimate $\hat{T}_{min}$, such as by selecting the new FFT window placement by offseting minimum-valued timing offset estimate $\hat{T}_{min}$ by a predefined margin value. Method 520 may then shift the FFT window accordingly in 520.

Accordingly, UE 202 may utilize method 500 to determine if one of the possible PQI indices has a negative timing offset estimate relative to an initial reference point (i.e. the TP(s) associated with the PQI index have a negative timing offset) utilized for selecting FFT window positioning for OFDM symbol demodulation. The initial reference point may be determined based on PDCCH data received from a serving cell, such as with CRS-based timing offset estimation.

If at least one of the possible PQI indices has a negative timing offset estimate (i.e. the TP(s) associated with the PQI index have a negative timing offset) and the negative timing offset estimate is correctable relative to the cyclic prefix length, UE 202 may utilize method 500 to identify the minimum-valued timing offset estimate and select a new FFT window position accordingly.

It is appreciated that method 500 may be implemented in either the time or phase domain. Furthermore, it is appreciated that method 500 may be implemented after obtaining multiple NZP-CSI-RS timing offset estimates for each PQI index. For example, 504 of method 500 may involve calculating an NZP-CSI-RS timing offset estimate for each PQI index over a sequence of CoMP subframes, and calculating a historical NZP-CSI-RS timing offset estimate, such as an averaged NZP-CSI-RS timing offset estimate based on NZP-CSI-RS timing offset estimates from a plurality of previous CoMP subframes, for each PQI index. Method 500 may then utilize the historical NZP-CSI-RS timing offset estimates for each PQI index as the set of PQI index timing offset estimates $\hat{T}_{CSIRS\_i}$, i={1, 2, 3}.

Figure 6:
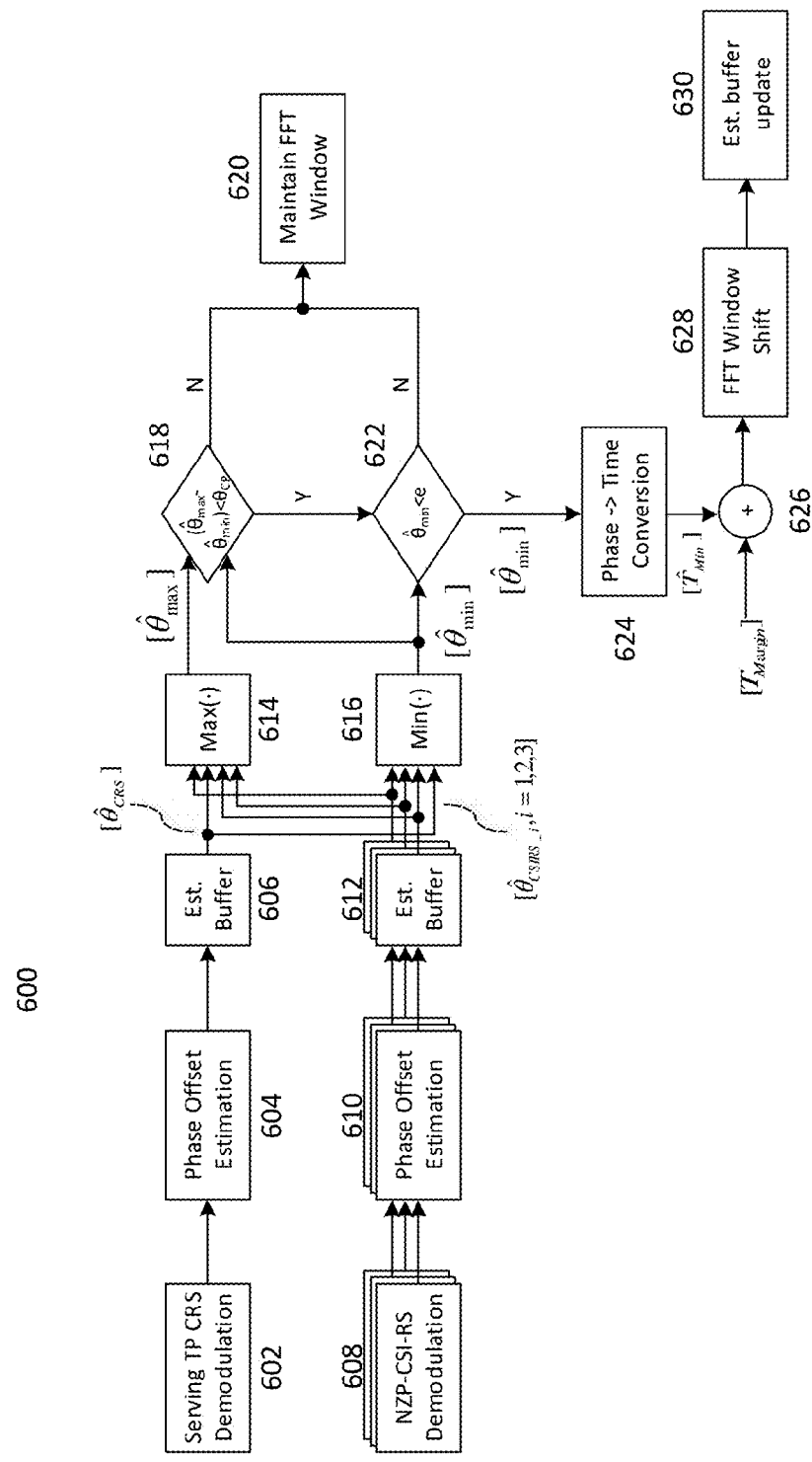
FIG. 6 shows a block diagram illustrating an FFT window optimization process for multiple transmit locations according to a second aspect of the disclosure.

FIG. 6 shows block system 600 further illustrating an approach for identifying minimum-valued negative timing offset $\hat{T}_{min}$ and adjusting FFT window positioning accordingly. It is appreciated that block system 600 may be similar in nature to the approach detailed regarding method 500. Block system 600 may be similarly implemented by UE 202, and accordingly one or more internal components of UE 202 may perform similar functions as to one or more of blocks 602-630.

Serving cell CRS demodulation block 602 may receive and demodulate a CRS configuration received from the serving cell. CRS-based phase offset estimation block 604 may then perform CRS-based phase offset estimation based on the demodulated CRS configuration to produce a CRS-based phase offset estimate. CRS-based phase offset estimation block 604 may then provide the resulting CRS-based phase offset estimate to CRS-based phase offset estimate buffer block 606.

CRS-based phase offset estimate buffer block 606 may utilize the received CRS-based phase offset estimate to update a historical CRS-based phase offset estimate. For example, CRS-based phase offset estimate buffer block 606 may store a historical CRS-based phase offset estimate, which may be an average CRS-based phase offset estimate of one or more previously obtained CRS-based phase offset estimates. CRS-based phase offset estimate buffer block 606 may then update the historical CRS-based phase offset estimate based on the most recent CRS-based phase offset estimate $\hat{\theta}_{CRS}$ provided by CRS-based phase offset estimation block 604.

NZP-CSI-RS demodulation block 608 may perform demodulation of one or more received NZP-CSI-RS configurations. Each received NZP-CSI-RS configuration may be associated with a PQI index, which may each correspond to one or more TPs according to the parameter set specified for each PQI index. As in the exemplary scenario detailed above regarding A CoMP network using DPS scheme 200, each PQI index may map to only one TP, such as e.g. one of TPs 204-208. NZP-CSI-RS-based phase offset estimation block 610 may then perform NZP-CSI-RS-based phase offset estimation in order to obtain an NZP-CSI-RS-based phase offset estimate based on the received NZP-CSI-RS configuration for each PQI index.

NZP-CSI-RS-based phase offset estimation block 610 may provide NZP-CSI-RS-based phase offset estimation buffer block 612 with the resulting NZP-CSI-RS-based phase offset estimates. NZP-CSI-RS-based phase offset estimation buffer block 612 may continuously update a historical NZP-CSI-RS-based phase offset estimate corresponding to each PQI index upon receiving each NZP-CSI-RS-based phase offset estimate. For example, NZP-CSI-RS-based phase offset estimate buffer block 612 may store a historical NZP-CSI-RS-based phase offset estimate associated with each PQI index which may each be an average NZP-CSI-RS-based phase offset estimate over one or more previously obtained NZP-CSI-RS-based phase offset estimates. NZP-CSI-RS-based phase offset estimate buffer block 612 may update each historical NZP-CSI-RS-based phase offset estimate based on the most recent NZP-CSI-RS-based phase offset estimates received from NZP-CSI-RS-based phase offset estimation block 610.

It is appreciated that block system 600 may operate over a plurality of CoMP subframes. Accordingly, NZP-CSI-RS-based phase offset estimation block 610 may obtain NZP-CSI-RS-based phase offset estimates and CRS-based phase offset estimates over a plurality of CoMP subframes, e.g. in order to accumulate a historical CRS-based phase offset estimate and historical NZP-CSI-RS based phase offset estimates for each PQI index.

CRS-based phase offset estimation buffer block 606 and NZP-CSI-RS-based phase offset estimation buffer block 612 may therefore contain a CRS-based phase offset estimate $\hat{\theta}_{CRS}$ and one or more NZP-CSI-RS-based phase offset estimates $[\hat{\theta}_{CSIRS\_i}, i=1, 2, 3]$ each corresponding to a PQI index, respectively. It is appreciated that CRS-based phase offset estimate $\hat{\theta}_{CRS}$ and NZP-CSI-RS-based phase offset estimates $[\hat{\theta}_{CSIRS\_i}, i=1, 2, 3]$ may be averaged values over time.

CRS-based phase offset estimation buffer block 606 and NZP-CSI-RS-based phase offset estimation buffer block 612 may then provide stored phase offset estimates $\hat{\theta}_{CRS}$ and $[\hat{\theta}_{CSIRS\_i}, i=1, 2, 3]$ to maximum phase offset estimate selection block 614 and minimum phase offset estimate selection block 616. Maximum phase offset estimate selection block 614 may then select the maximum-valued (i.e. most positive) phase offset estimate $\hat{\theta}_{max}$ and may provide resulting maximum-valued phase offset estimate $\hat{\theta}_{max}$ to phase offset estimate comparison block 618. Minimum phase offset estimate selection block 616 may select the minimum-valued (i.e. most negative) phase offset estimate $\hat{\theta}_{min}$ and may provide resulting minimum-valued phase offset estimate $\hat{\theta}_{min}$ to phase offset estimate comparison block 618 and negative phase offset estimate analysis block 622.

Phase offset estimate comparison block 618 may then evaluate the expression $(\hat{\theta}_{max}-\hat{\theta}_{min})<\theta_{CP}$ to determine whether the separation in phase between maximum-valued phase offset estimate $\hat{\theta}_{max}$ minimum-valued phase offset estimate $\hat{\theta}_{min}$ is greater than the phase length of the cyclic prefix $\hat{\theta}_{CP}$. The phase length corresponding to the length of the cyclic prefix in time may be derived as $$\theta_{CP} = \left(2\pi \times \frac{T_{CP}}{OFDMSymbolDuration}\right),$$

where $T_{CP}$ is the length of the cyclic prefix in time and OFDMSymbolDuration is the duration of an OFDM symbol in time. Similarly to as detailed regarding method 500, if maximum-valued phase offset estimate $\hat{\theta}_{max}$ and minimum-valued phase offset estimate $\hat{\theta}_{min}$ are separated by a distance in phase greater than the phase length of the cyclic prefix $\hat{\theta}_{CP}$, ISI may be unavoidable regardless of FFT window positioning adjustment. Accordingly, block system 600 may proceed to 620 and maintain the current FFT window positioning.

Alternatively, if the separation in phase $(\hat{\theta}_{max}-\hat{\theta}_{min})$ between maximum-valued phase offset estimate $\hat{\theta}_{max}$ and minimum-valued phase offset estimate $\hat{\theta}_{min}$ is less than the phase length of the cyclic prefix $\theta_{CP}$, block system 600 may determine that FFT window positioning may reduce ISI if at least one of the PQI indices has a negative timing offset.

Accordingly, negative phase offset estimate analysis block 622 may evaluate minimum-valued phase offset estimate $\hat{\theta}_{min}$ provided by minimum phase offset estimate selection block 616 to determine if minimum-valued phase offset estimate $\hat{\theta}_{min}$ is negative, such as by using a negative tolerance parameter e close to zero in value for tolerance purposes. If minimum-valued phase offset estimate $\hat{\theta}_{min}$ is not negative, block system 600 may proceed to 620 and maintain the current FFT window positioning. Alternatively, if negative phase offset estimate analysis block 622 determines that minimum-valued phase offset estimate $\hat{\theta}_{min}$ is negative, block system 600 may proceed to adjust the FFT window positioning.

Block system 600 may shift from the phase domain to the time domain in order to perform the appropriate FFT window positioning shift. Accordingly, time conversion block 624 may convert minimum-valued phase offset estimate $\hat{\theta}_{min}$ provided by negative phase offset estimate analysis block 622 to the time domain. Time conversion block 624 may convert minimum-valued phase offset estimate $\hat{\theta}_{min}$ to corresponding minimum-valued timing offset estimate $\hat{T}_{min}$ as $$\hat{T}_{min} = \frac{1}{2\pi}\hat{\theta}_{Min} OFDMSymbolDuration.$$

After converting the minimum-valued phase offset estimate $\hat{\theta}_{min}$ to the time domain as minimum-valued timing offset estimate $\hat{T}_{min}$, block system 600 may add timing margin $T_{margin}$ to minimum-valued timing offset estimate $\hat{T}_{min}$ with adding block 626 in order to properly position the FFT window relative to the minimum-valued timing offset estimate $\hat{T}_{min}$.

FFT window shift 628 may then shift the FFT window position in the negative direction by $\Delta_{shift}=\hat{T}_{min}-T_{margin}$ μs. Accordingly, the shift in FFT window position may be sufficient to position the FFT window such that a negative offset associated with one or more TPs is compensated for, thereby reducing ISI.

After performing an FFT window shift, block system 600 may need to compensate phase offset estimates $\hat{\theta}_{CRS}$ and $[\hat{\theta}_{CSIRS\_i}, i=1, 2, 3]$ by applying a corresponding phase shift. Accordingly, estimate buffer update block 630 may calculate phase shift $$\theta_\Delta = 2\pi \times \frac{\Delta_{shift}}{OFDMSymbolDuration}$$

and shift each of phase offset estimates $\hat{\theta}_{CRS}$ and $[\hat{\theta}_{CSIRS\_i}, i=1, 2, 3]$ by phase shift $\theta_\Delta$. Estimate buffer update block 630 may therefore update shift phase offset estimates $\hat{\theta}_{CRS}$ and $[\hat{\theta}_{CSIRS\_i}, i=1, 2, 3]$ stored in estimate buffer blocks 606 and 612 to updated phase offset estimate $\hat{\theta}'_{CRS}$ and $[\hat{\theta}'_{CSIRS\_i}, i=1, 2, 3]$ such that $\hat{\theta}'_{CRS}=\hat{\theta}_{CRS}+\theta_\Delta$ and $[\hat{\theta}'_{CSIRS_i}=\hat{\theta}'_{CSIRS_i}+\theta_\Delta, i=1, 2, 3]$.

Block system 600 may then utilize updated phase offset estimates $\hat{\theta}'_{CRS}$ and $[\hat{\theta}'_{CSIRS\_i}, i=1, 2, 3]$ in phase de-rotators for PDCCH and PDSCH compensation, respectively.

Accordingly, method 500 and block system 600 may be utilized to adjust FFT window placement based on timing or phase offset estimates for a plurality of different transmission locations, such as e.g. in order to prevent ISI caused by negative timing or phase offset estimates. In certain scenarios, such as where the difference between the maximum-valued timing or phase offset estimate and the minimum-valued timing or phase offset estimate is less than the duration of the cyclic prefix, the FFT window position may be adjusted such that no ISI caused by negative timing or phase offset estimates is introduced into OFDM symbol demodulation.

It is appreciated that while method 500 and block system 600 have been detailed as being implemented in one of the time or phase domain, it is understood that either implementation is applicable.

Method 500 and block system 600 as detailed above may be implemented using NZP-CSI-RS-based timing (e.g. or phase) offset estimation, i.e. by receiving an NZP-CSI-RS configuration for each PQI index in a CoMP scheme and determining an NZP-CSI-RS-based timing offset estimate for each PQI index. Method 500 or 600 may then select a new FFT window position based on the obtained NZP-CSI-RS-based timing offset estimates and a CRS-based timing offset estimate corresponding to the serving cell. As previously detailed, a TM10 UE type-B such as UE 202 may only be able to utilize CRS-based timing offset estimation for the serving cell due to the quasi co-location assumptions associated with TM10 UE type-B.

However, timing offset estimation using NZP-CSI-RS may be limited compared to timing offset estimation using CRS, which may be unavailable to TM10 UE type-B due to the aforementioned cell ID and quasi co-location issues. As detailed regarding resource grid 300 of FIG. 3, TP 206 may only transmit NZP-CSI-RS using a single subcarrier per block of 12 subcarriers (e.g. using two REs on a single given subcarrier during a single subframe). Accordingly, the allocation of NZP-CSI-RS configurations in frequency may be considered narrowband. The limited bandwidth of NZP-CSI-RS configurations may consequently limit the timing offset estimation range for timing synchronization tracking based on NZP-CSI-RS.

The timing offset estimation range of NZP-CSI-RS-based timing offset estimation may be derived as follows:

$$-\pi \leq 2\pi \cdot \epsilon_{timing} \cdot 12 RE \cdot BW_{SC} \leq \pi \qquad (2),$$

where $\epsilon_{timing}$ is a timing constraint variable, 12 RE corresponds to 12 resource elements (i.e. within a single resource block (RB)), and $BW_{SC}$ is the bandwidth per subcarrier.

With a conventional subcarrier bandwidth $BW_{SC}=15$ kHz for an LTE network, the timing offset estimation range for NZP-CSI-RS-based timing offset estimation is physically bound as [−2.78 μs, +2.78 μs]. In other words, the existing NZP-CSI-RS-based timing offset estimation is limited to producing timing offsets estimates within the range [−2.78 μs, +2.78 μs].

In practice, timing synchronization between a single cell and UE is inherently dependent in part on the physical location of the UE with respect to the single cell due to signal propagation time. Downlink propagation time will be relatively short for UEs located near to the cell, while downlink propagation time will be extended for UEs located far from the cell. Specifically, downlink propagation time is approximately 3.3 μs for UEs located in the cell edge of a cell with a 1 km radius.

However, it may be infeasible for cells to control downlink timing alignment targeting for the location of multiple UEs, as each UE may have a different location and accordingly a different downlink propagation time. Furthermore, additional transmission time differences may be introduced if cells are not synchronized in a near-perfect manner, thereby further contributing to timing alignment issues.

Consequently, there exists no guarantee that the timing offset for TPs in a CoMP scenario will be within the given NZP-CSI-RS-based timing offset estimation range of [−2.78 μs, +2.78 μs]. Reception of PDSCH subframes by TM10 UE type-B with timing offsets that fall outside of the NZP-CSI-RS-based timing offset estimation range may cause significant performance degradation, as the timing offset estimate used for phase de-rotation in PDSCH demodulation will be incorrect.

UE 202 may be configured to estimate the timing offset for each possible PQI index (e.g. corresponding to TPs 204-208 according to the specified parameter set for each PQI index) based on the NZP-CSI-RS configuration transmitted by each of TPs 204-208 according to the respective PQI index of each NZP-CSI-RS configuration. However, the timing offset estimation range of this NZP-CSI-RS-based timing offset estimation may be associated with the aforementioned inherent physical limitations, and accordingly the actual timing offset for one of the possible PQI indicies may fall outside of the possible timing offset estimation range of NZP-CSI-RS-based timing offset estimation. UE 202 may consequently not be able to obtain an accurate timing offset estimation for one or more of the PQI indices, and accordingly FFT window placement based on timing offset estimates corresponding to a PQI set may suffer from performance issues due to the inherently limited range of NZP-CSI-RS-based timing offset estimates.

Figure 7:
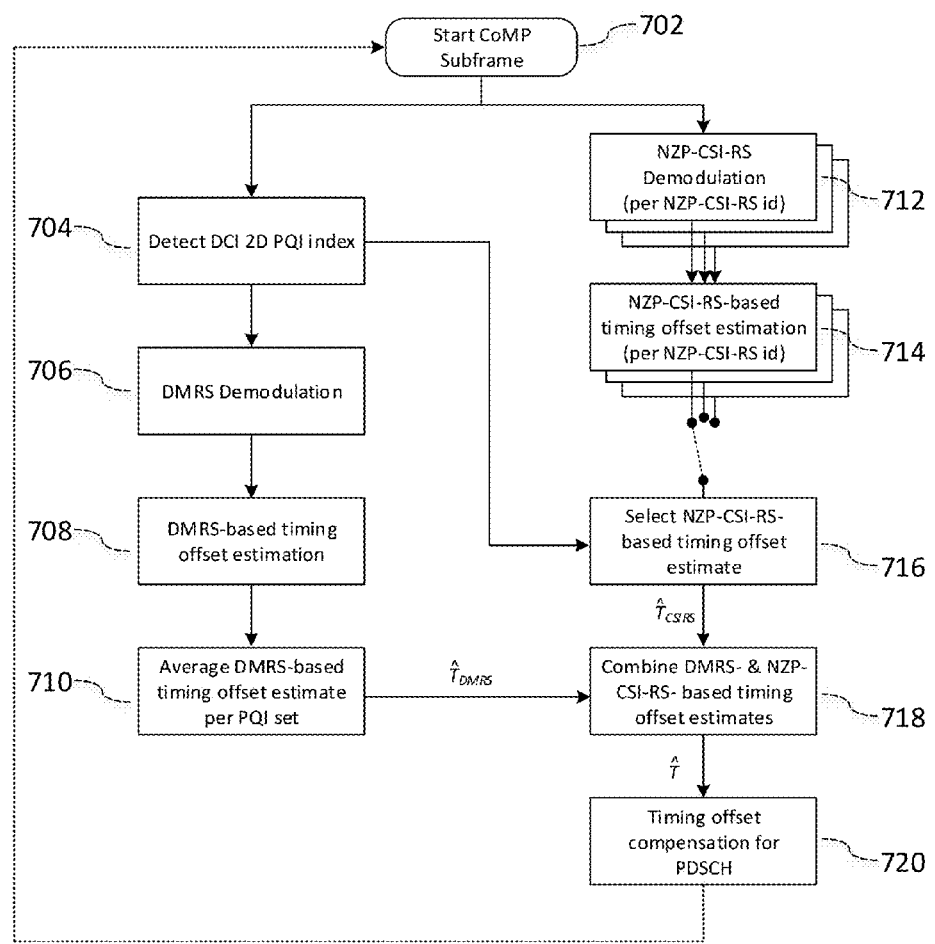
FIG. 7 shows a flow diagram illustrating a timing offset estimation process according to a first exemplary aspect of the disclosure.

FIG. 7 shows a flow chart illustrating method 700. Method 700 may be utilized to obtain more accurate timing offset estimations by offering an expanded timing offset estimation range than conventional NZP-CSI-RS-based timing offset estimation. Method 700 may be performed by a mobile terminal such as UE 202 participating in a CoMP network, such as A CoMP network using DPS scheme 200. It is appreciated that method 700 may be particularly applicable to TM10 UE type-B, which may not be able to utilize CRS-based timing offset estimation due to reduced quasi co-location assumptions. Nevertheless it is understood that any UE operating according to a transmission mode including CSI-RS and Demodulation Reference Signals (DMRS) may be able to perform aspects of time synchronization utilizing the approach of method 700.

Specifically, method 700 may utilize Demodulation Reference Signal (DMRS)-based timing offset estimation in coordination with NZP-CSI-RS-based timing offset estimation in order to produce aggregate timing offset estimates with greater accuracy. Similarly to NZP-CSI-RS, DMRS may be transmitted by cells configured to perform downlink transmissions according to TM10 (in addition to TM9 as of 3GPP Release 11), such as on antenna ports 7-14 along with PDSCH data traffic. However, as opposed to the periodic transmission pattern associated with NZP-CSI-RS configurations (e.g. as detailed regarding FIG. 3), cells may only transmit DMRS during subframes where the cell is transmitting PDSCH data to a UE. The UE receiving the downlink PDSCH may utilize the received DMRS to assist in demodulating the PDSCH data traffic, such as for channel estimation in receiving downlink signals transmitted according to transmit diversity or spatial multiplexing schemes.

Cells may transmit DMRS over multiple subcarriers per block of 12 subcarriers, such as e.g. every 5 subcarriers, and accordingly frequency allocation of DMRS configurations may have comparatively greater bandwidth than NZP-CSI-RS configurations. Accordingly, as timing offset estimates may be obtained based on phase rotation measurements over frequency tones, DMRS-based timing offset estimation may offer a greater timing offset estimation range than NZP-CSI-RS-based timing offset estimation. For example, DMRS may be transmitted every 5 subcarriers as opposed to the 12 subcarrier distribution of NZP-CSI-RS. Accordingly, DMRS-based timing offset estimation may offer an expanded timing offset estimation range of [−6.66 μs, +6.66 μs] compared to the relatively limited range of [−2.78 μs, +2.78 μs] of NZP-CSI-RS-based timing offset estimation in an exemplary scenario using a system bandwidth of 10 MHz (50 RBs) with a 15 kHz subcarrier spacing (as further referenced in below examples). However, due to the narrowband allocation in frequency of DMRS, the accuracy of DMRS-based timing offset estimation may be relatively poor compared to NZP-CSI-RS based timing offset estimation Timing offset estimation based solely upon DMRS may thus ill-suited for practical use, as DMRS may only be received in RBs also containing PDSCH.

The number of occasions in which DMRS-based timing offset estimation can be applied may be limited in CoMP scenarios, especially for timing tracking purposes on the non-active TP(s). In a CoMP scheme, only TPs that are currently transmitting PDSCH to a UE may transmit DMRS, i.e. only the active TP(s) in a DPS scheme may transmit DMRS to a given TM10 UE type-B during a given subframe. For example, in A CoMP network using DPS scheme 200 only the active TP of TPs 204-208, e.g. TP 206 in the above detailed examples, may transmit DMRS to UE 202 along with the PDSCH data. UE 202 may therefore only be able to perform updated timing offset estimation based on DMRS for one TP of TPs 204-208, i.e. the active TP, as only active TP may be transmitting DMRS.

Despite the associated drawbacks of timing offset estimation using only DMRS, it may be advantageous to utilize DMRS in conjunction with NZP-CSI-RS-based timing offset estimation due to the expanded timing offset estimation range offered by DMRS. As previously indicated, while the timing offset estimation range of NZP-CSI-RS-based timing offset estimation may be limited to [−2.78 μs, +2.78 μs] (with e.g. a 10 MHz system bandwidth and 15 kHz subcarrier spacing), DMRS-based timing offset estimation may offer an expanded timing offset estimation range of [−5.56 μs, +5.56 μs], i.e. expanding the corresponding phase offset estimation range from [−π, +π] to [−2π, +2π].

As previously detailed regarding Equation 1, reference signal-based timing offset estimation may be conventionally based on phase rotation measurements of reference signals over multiple frequency tones (i.e. subcarriers). A measured phase rotation may then be translated into the time domain as a timing offset.

The timing offset estimation range of NZP-CSI-RS-based timing offset estimation may be projected to the range [−π, +π] in the discrete sample domain according to Equation 2. However, this range may be expanded to [−2π, +2π] through the use of DMRS-aided timing offset estimation. Accordingly, both NZP-CSI-RS-based and DMRS-based timing offset estimates may be aggregated to expand the timing offset from [−2.78 μs, +2.78 μs] to [−5.56 μs, +5.56 μs] (e.g. with a 10 MHz system bandwidth and 15 kHz subcarrier spacing). The increased timing offset estimation range may therefore reduce the likelihood that the timing offset estimate associated with a TP in a JP CoMP scenario falls outside of the timing offset range, thereby reducing the performance issues with incorrect timing offset estimates.

Method 700 illustrates a method for performing DMRS-aided NZP-CSI-RS-based timing offset estimation according to an aspect of the disclosure. Method 700 may be appropriate for CoMP scenarios such as DPS or JT CoMP schemes that involve receiving PDSCH data traffic from multiple TPs over time. Method 700 may provide an approach to accurately estimate the timing offset for each PQI index, such as TPs 204-208 relative to UE 202 in FIG. 2, such that a TM10 UE type-B receiving PDSCH data traffic over a CoMP network may accurately track timing offsets over time.

As shown in FIG. 7, method 700 may include two calculation paths, where each calculation path is associated with DMRS-based timing offset estimation or NZP-CSI-RS-based timing offset estimation. Both the DMRS-based timing offset estimation and the NZP-CSI-RS-based timing offset estimation may be performed in order to estimate the timing offset associated with the specified PQI index, i.e. the active TP(s) performing transmission of the PDSCH data traffic in the current subframe according to the specified PQI index. The resulting timing offsets may be aggregated to determine a final timing offset estimate for the specified PQI index be used for timing offset compensation. In addition to obtaining a timing offset estimate for the active TP for the current subframe, method 700 may also perform timing offset tracking on one or more additional PQI indices, i.e. the remaining PQI indices not specified by the PQI index, in order to maintain tight synchronization with each PQI index for use in subsequent subframes.

As previously detailed, UE 202 may receive multiple NZP-CSI-RS configurations during each CoMP subframe, where each NZP-CSI-RS configuration is associated with one or more TP(s) by virtue of PQI index. Each NZP-CSI-RS configuration may thus be transmitted by one or more TPs 204-208. However, UE 202 may receive only one DMRS configuration during a CoMP subframe as only the TP(s) corresponding the specified PQI index (i.e. the active TP(s) for the current subframe) may be transmitting PDSCH data traffic to UE 202. Accordingly, in order to utilize both a received NZP-CSI-RS configuration and a received DMRS configuration for timing offset estimation for the active TP(s) in the current subframe, UE 202 must first identify which received NZP-CSI-RS configuration corresponds to the received DMRS configuration, i.e. which NZP-CSI-RS configuration is associated with the specified PQI index, thus being further associated with the received DMRS configuration. In essence, UE 202 may rely on quasi co-location assumptions in order to identify the NZP-CSI-RS configuration that is co-located with the DMRS configuration during each subframe.

As previously detailed, UE 202 may receive PDCCH data from the serving cell during each CoMP subframe, which may be in a particular Downlink Control Indicator (DCI) format. In accordance with UE 202 configured as a TM10 UE type-B, the PDCCH data may include DCI Format 2D data, which may specify a PQI index for the current subframe. UE 202 may then assume that data traffic received from CSI-RS antenna ports 7-14 associated with the specified PQI index are quasi co-located with DMRS antenna ports 15-22. In other words, UE 202 may assume that the NZP-CSI-RS configuration associated with the specified PQI index for the current subframe is quasi co-located with the DMRS configuration received during the current subframe. UE 202 may then identify the specified NZP-CSI-RS configuration based on the specified PQI index and assume that this NZP-CSI-RS configuration is associated with the received DMRS configuration by way of quasi co-location.

The PQI index identifying which NZP-CSI-RS configuration is quasi co-located with the received DMRS configuration may only be applicable on a per-subframe basis, as the active TP(s) (i.e. the TP(s) transmitting the DMRS configuration along with PDSCH data during the current subframe corresponding to the specified PQI index) may similarly switch for each subframe. Accordingly, UE 202 may only apply the quasi co-location assumption regarding NZP-CSI-RS and DMRS configurations garnered from the PQI index in DCI Format 2D data during the current subframe.

As a result, UE 202 may be able to determine which NZP-CSI-RS configuration is quasi co-located with the received PDSCH and by extension the received DMRS configuration for each subframe. UE 202 may therefore perform timing offset estimation based on the received DMRS configuration and the NZP-CSI-RS configuration specified by way of PQI index.

Method 700 may therefore detect the PQI index for the current CoMP subframe based on DCI Format 2D PDCCH data in 704. After detecting the PQI index in 704, UE 202 may hold the identified PQI index for later use in method 700, such as in 716.

UE 202 may proceed to 706 to demodulate the received DMRS, such as by receiving and demodulating the associated downlink signal using radio frequency circuitry. UE 202 may then perform DMRS-based timing offset estimation in 708, such as by applying processing circuitry to perform a phase rotation between different samples of the received DMRS in the frequency domain according to Equation 1. UE 202 may therefore obtain a DMRS-based timing offset estimate for the current PDSCH, which may be associated with the active TP(s) for the current subframe by virtue of PQI index.

In addition to obtaining a DMRS-based timing offset estimate for the current CoMP subframe, UE 202 may be configured to store DMRS-based timing offset estimates for one or more previous CoMP subframes, such as a historical average. For example, UE 202 may be configured to store a historical DMRS-based timing offset estimate for each PQI index, and to update the corresponding historical DMRS-based timing offset estimate upon determining a DMRS-based timing offset estimate for the PQI index of the current subframe. UE 202 may thus update one of the historical DMRS-based timing offset estimates during each CoMP subframe, i.e. by calculating a DMRS-based timing offset estimate for the current subframe and updating the corresponding historical DMRS-based timing offset estimate based on the specified PQI index for the current subframe. As previously indicated, each historical DMRS-based timing offset estimate may be e.g. a historical average based on DMRS-based timing offset estimates for one or more previous CoMP subframes. Additionally, the historical DMRS-based timing offset estimate may be calculated e.g. using a forgetting parameter, such that the most recently obtained DMRS-based timing offset estimates are more heavily considered in the historical DMRS-based timing offset estimate than less recent DMRS-based timing offset estimates.

Accordingly, UE 202 may average the DMRS-based timing offset estimate obtained in 708 with a corresponding historical DMRS-based timing offset estimate in 710, such as by retrieving a historical DMRS-based timing offset estimate associated with the same PQI index as the current CoMP subframe. UE 202 may then further utilize the resulting average DMRS-based timing offset in method 700.

Simultaneous to performing DMRS demodulation and DMRS-based timing offset estimation and averaging in 706-710, UE 202 may perform NZP-CSI-RS demodulation for each NZP-CSI-RS configuration. As previously detailed, UE 202 may receive an NZP-CSI-RS configuration from each of TPs 204-208 during the current subframe, which UE 202 may distinguish based on PQI index. As specified by the DCI Format 2D PQI index obtained in 704, UE 202 may assume that one of the NZP-CSI-RS configurations is quasi co-located with received PDSCH data and a received DMRS configuration.

UE 202 may perform NZP-CSI-RS demodulation in 712 and NZP-CSI-RS-based timing offset estimation in 714 for each PQI index, i.e. for each received NZP-CSI-RS configuration. UE 202 may therefore obtain a new NZP-CSI-RS-based timing offset estimate for each PQI index during each CoMP subframe in 714. While only one of the obtained NZP-CSI-RS-based timing offset estimates may be applicable for PDSCH demodulation in the current CoMP subframe, UE 202 may nevertheless constantly update a historical NZP-CSI-RS-based timing offset estimate for each PQI index during each subframe. In this manner, UE 202 may perform timing synchronization tracking for each PQI index using each received NZP-CSI-RS configuration, thereby maintaining a consistently accurate NZP-CSI-RS timing offset for each PQI index.

Similarly to as performed with the received DMRS configuration, UE 202 may store an NZP-CSI-RS-based timing offset estimates for one or more previous CoMP subframes for each PQI index, such as by storing a historical average NZP-CSI-RS-based timing offset estimate for each PQI index. Upon obtaining NZP-CSI-RS-based timing offset estimates for each PQI index for the current CoMP subframe in 714, UE 202 may update each corresponding historical NZP-CSI-RS-based timing offset estimate, such as e.g. by averaging the NZP-CSI-RS-based timing offset estimates obtained in 714 with the historical NZP-CSI-RS-based timing offset estimates. While UE 202 may only apply one of the historical NZP-CSI-RS-based timing offset estimates for PDSCH demodulation in the current CoMP subframe, UE 202 may nevertheless maintain a current NZP-CSI-RS-based timing offset estimate for each PQI index that is constantly updated based on each received NZP-CSI-RS configuration.

UE 202 may thus obtain an NZP-CSI-RS-based timing offset estimate for each PQI index in 714, where the NZP-CSI-RS-based timing offset estimates may be e.g. based on historical NZP-CSI-RS-based timing offset estimates. UE 202 may then select the NZP-CSI-RS-based timing offset estimate to be utilized for PDSCH demodulation in the current subframe. Specifically, UE 202 may select the NZP-CSI-RS-based timing offset estimate according to the PQI index specified obtained in 704, which as previously detailed may be assumed to be quasi co-located with received PDSCH data and a received DMRS configuration. Due to the associated quasi co-location assumption, UE 202 may be able to utilize the selected NZP-CSI-RS-based timing offset estimate in 716 along with the DMRS-based timing offset estimate obtained in 710 to perform DMRS-aided NZP-CSI-RS-based timing offset estimation for the current CoMP subframe.

Accordingly, UE 202 may combine the DMRS-based timing offset estimate obtained in 710 and the selected NZP-CSI-RS-based timing offset estimated obtained in 714 and selected in 716. UE 202 may then utilize the resulting DMRS-aided NZP-CSI-RS-based timing offset estimate to perform timing offset compensation for the received PDSCH data traffic in 720.

As previously detailed, NZP-CSI-RS-based timing offset estimation may provide a high degree of accuracy but may suffer from a narrow timing offset estimation range spanning from [−2.78 μs, +2.78 μs] (i.e. [−π, +π] in the discrete sample domain). In contrast, DMRS-based timing offset estimation may provide a low degree of accuracy but may offer an increased timing offset estimation range. UE 202 may thus utilize DMRS-based timing offset estimation to expand the range of NZP-CSI-RS-based timing offset estimation to [−5.56 μs, +5.56 μs] (i.e. [−2π, +2π] in the discrete sample domain) without sacrificing accuracy.

Figure 8:
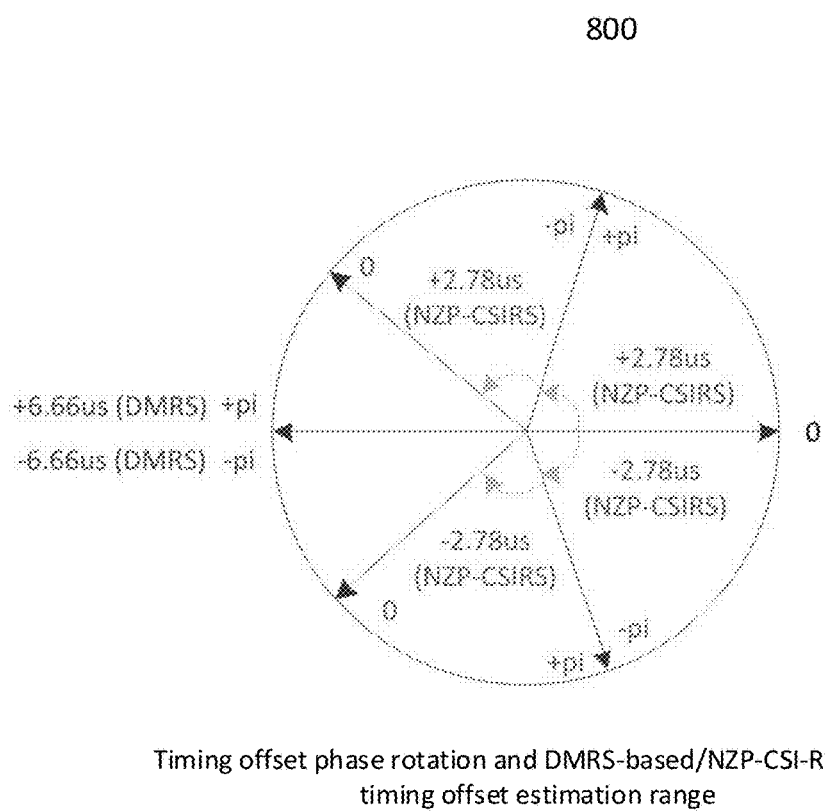
FIG. 8 shows a unit circle illustrating timing and phase offset estimation ranges.

As shown in unit circle 800 of FIG. 8, DMRS-based timing offset estimation may provide a timing offset estimation range of [−6.66 μs, +6.66 μs], which projects around the extent of unit circle 800 as depicted in FIG. 8. NZP-CSI-RS-based timing offset estimation may provide a timing offset estimation range of [−2.78 μs, +2.78 μs], which may result in a "wrapped" distribution around unit circle 800 within the associated timing offset estimation range of DMRS-based timing offset estimation projected onto unit circle 800.

Due to the associated phase wrapping property of timing offset estimation based on phase rotation, timing offsets in the range of [−5.56 μs, −2.78 μs] will be projected into the range [0 μs, +2.78 μs] by NZP-CSI-RS-based timing offset estimation. Similarly, timing offsets in the range of [+2.78 μs, +5.56 μs] will be projected into the range [−2.78 μs, 0 μs] by NZP-CSI-RS-based timing offset estimation.

Accordingly, the resulting NZP-CSI-RS-based timing offset estimates may be offset from the correct timing offsets by ±π, resulting in an incorrect timing offset estimate. PDSCH demodulation performed using these incorrect NZP-CSI-RS-based timing offset estimates, such as by applying the NZP-CSI-RS-based timing offset estimate in phase de-rotation of PDSCH data, will accordingly result in corruption of the demodulated PDSCH data.

As shown in FIG. 8, the range of DMRS-based timing offset estimation may extend from [−6.66 μs, +6.66 μs]. UE 202 may thus utilize the DMRS-based timing offset estimate in order to determine whether an obtained NZP-CSI-RS-based timing offset estimate has been offset by ±2.78 μs (i.e. ±π in the phase domain) and to perform any necessary correction in order to shift the NZP-CSI-RS-based timing offset estimate into the correct range.

Accordingly, method 700 may combine the DMRS-based timing offset of 708 and the selected NZP-CSI-RS-based timing offset estimate of 716 in 718 by comparing the sign of the DMRS-based timing offset and selected NZP-CSI-RS-based timing offset estimate in order to determine whether the NZP-CSI-RS-based timing offset estimate should be shifted into the correct range. If the sign of the DMRS-based timing offset estimate agrees with the selected NZP-CSI-RS-based timing offset estimate, 718 may utilize the selected NZP-CSI-RS-based timing offset estimate as the DMRS-aided NZP-CSI-RS-based timing offset estimate for the current subframe. However, if the sign of the DMRS-based timing offset estimate does not agree with the selected NZP-CSI-RS-based timing offset estimate, 718 may add either +2.78 or −2.78 to the additive inverse of the selected NZP-CSI-RS-based timing offset estimate depending on whether the sign of the DMRS-based timing offset estimate is positive or negative, respectively.

In summary, 718 may select the DMRS-aided NZP-CSI-RS-based timing offset estimate $\hat{T}$ for the current subframe to be used in timing offset compensation for the current subframe as follows:

$$\hat{T}=\hat{T}_{CSIRS} \text{ if } (+\hat{T}_{CSIRS},+\hat{T}_{DMRS}) \qquad (3a),$$

$$\hat{T}=\hat{T}_{CSIRS} \text{ if } (-\hat{T}_{CSIRS},-\hat{T}_{DMRS}) \qquad (3b),$$

$$\hat{T}=+2.78 \text{ μs}-\hat{T}_{CSIRS} \text{ if } (+\hat{T}_{CSIRS},-\hat{T}_{DMRS}) \qquad (3c),$$

$$\hat{T}=-2.78 \text{ μs}-\hat{T}_{CSIRS} \text{ if } (-\hat{T}_{CSIRS},+\hat{T}_{DMRS}) \qquad (3d),$$

where $\hat{T}_{CSIRS}$ is the NZP-CSI-RS-based timing offset estimate, $\hat{T}_{DMRS}$ is the DMRS-based timing offset estimate, $(+\hat{T}_{CSIRS},+\hat{T}_{DMRS})$ indicates conditional expression where $\hat{T}_{CSIRS}$ has a positive (+) sign and $\hat{T}_{DMRS}$ has a positive (+) sign, and so forth.

Method 700 may thus combine the DMRS-based timing offset and the selected NZP-CSI-RS-based timing offset estimate in 718 according to Equations 3a-3d in order to obtain a DMRS-aided NZP-CSI-RS-based timing offset estimate $\hat{T}$ for the current subframe. Method 700 may then utilize the DMRS-aided NZP-CSI-RS-based timing offset estimate $\hat{T}$ in order to perform timing offset compensation for the PDSCH data received in the current subframe in 720, such as by applying the DMRS-aided NZP-CSI-RS-based timing offset estimate $\hat{T}$ in phase de-rotation.

By utilizing DMRS-based timing offset estimation to evaluate the sign of NZP-CSI-RS-based timing offset estimates and performing any requisite shift, method 700 may expand the range of NZP-CSI-RS-based timing offset estimation without sacrificing the accuracy of NZP-CSI-RS-based timing offset estimation. PDSCH demodulation may thus be improved through the use of NZP-CSI-RS-based timing offset estimates with higher accuracy.

Furthermore, it is appreciated that method 700 may be implemented in an iterative manner, and thus may be repeated for over a sequence of more than one CoMP subframe over time. Method 700 may thus determine the appropriate PQI index for the current CoMP subframe and perform the proper timing offset estimation based on the quasi co-location assumption between the specified NZP-CSI-RS configuration and received PDSCH data and DMRS configuration specified by the PQI index.

It is appreciated that UE 202 may perform method 700 in either the time or phase domain, i.e. using either timing offset estimates or phase offset estimates. It is appreciated that due to the inter-related nature of time and phase between their respective domains, time offset estimates and phase offset estimates may be transformed between the time and phase domains as follows:

$$\hat{T} = \frac{1}{2\pi} \times \hat{\theta} \times OFDMSymbolDuration, \quad (4)$$

$$\hat{\theta} = \frac{2\pi \times \hat{T}}{OFDMSymbolDuration}, \quad (5)$$

where $\hat{T}$ is the timing offset estimate, $\hat{\theta}$ is the phase offset estimate, and OFDMSymbolDuration is the duration of an OFDM symbol in time (e.g. 71.3 μs including CP length). Accordingly, it is appreciated that any of 702-720 in method 700 may be implemented in either the time or phase domain, where timing offset estimates and phase offset estimates may be translated into the other domain through the use of Equations 4 and 5.

Equations 3a-3d may be written as follows to correspond with the phase domain to determine a DRMS-aided NZP-CSI-RS-based phase offset estimate:

$$\hat{\theta} = \hat{\theta}_{CSIRS} \text{ if } (+\hat{\theta}_{CSIRS}, +\hat{\theta}_{DMRS}) \quad (6a),$$

$$\hat{\theta} = \hat{\theta}_{CSIRS} \text{ if } (-\hat{\theta}_{CSIRS}, -\hat{\theta}_{DMRS}) \quad (6b),$$

$$\hat{\theta} = +\pi - \hat{\theta}_{CSIRS} \text{ if } (+\hat{\theta}_{CSIRS}, \hat{\theta}_{DMRS}) \quad (6c),$$

$$\hat{\theta} = -\pi - \hat{\theta}_{CSIRS} \text{ if } (-\hat{\theta}_{CSIRS}, +\hat{\theta}_{DMRS}) \quad (6d),$$

where $\hat{\theta}_{CSIRS}$ is the NZP-CSI-RS-based phase offset estimate, $\hat{\theta}_{DMRS}$ is the DMRS-based phase offset estimate, $(+\hat{\theta}_{CSIRS}, +\hat{\theta}_{DMRS})$ indicates conditional expression where $\hat{\theta}_{CSIRS}$ has a positive (+) sign and $\hat{\theta}_{DMRS}$ has a positive (+) sign, and so forth.

Figure 9:
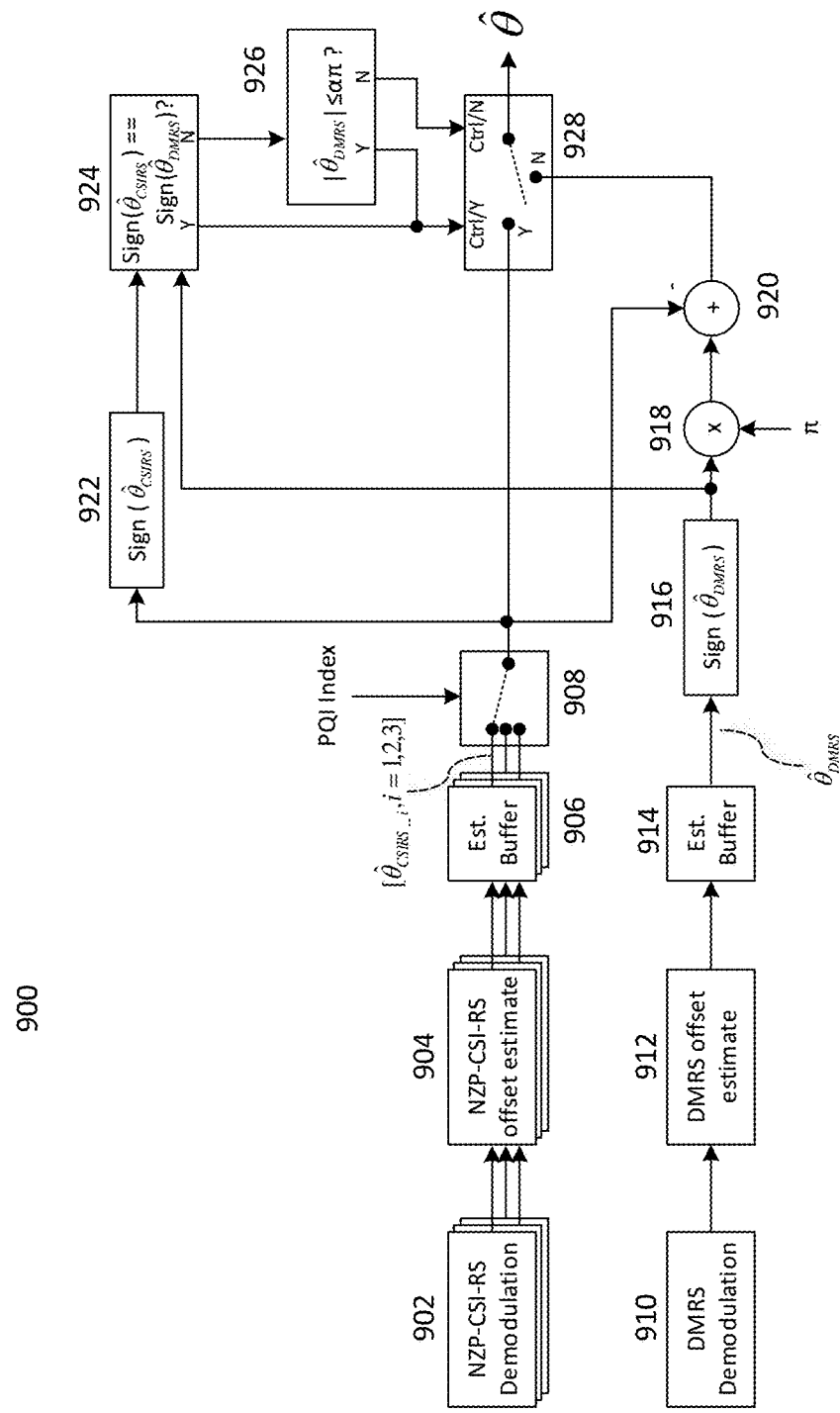
FIG. 9 shows a block diagram illustrating a timing offset estimation process according to second exemplary aspect of the disclosure.

FIG. 9 shows block system 900 further illustrating an approach for utilizing received DMRS to improve the range of NZP-CSI-RS-based timing offset estimation, such as by obtaining a DMRS-aided NZP-CSI-RS-based timing offset estimate. It is appreciated that aspects of block system 900 may be similar in nature to the approach detailed regarding method 700. Block system 900 may similarly be implemented by UE 202, and accordingly one or more internal components of UE 202 may perform similar functions as to one or more of blocks 902-926.

Block system 900 may seek to obtain a phase offset estimate $\hat{\theta}$ corresponding to a timing offset estimate $\hat{T}$ to be used in timing compensation for PDSCH reception in a CoMP subframe. Accordingly, block system 900 may be suitable for use in a CoMP network in order to maintain timing synchronization with one or more TPs, such as e.g. TPs 204-208 of FIG. 2. Block system 900 may thus receive a PQI index as DCI Format 2D PDCCH data indicating an NZP-CSI-RS configuration that may be assumed to be quasi co-located with PDSCH data and a received DMRS configuration in the current subframe. Block system 900 may then obtain a phase offset estimate $\hat{\theta}$ for the specified PQI index based on the indicated NZP-CSI-RS configuration and received DMRS configuration, where the phase offset estimate $\hat{\theta}$ may be subsequently used for timing compensation in reception of the PDSCH data.

As detailed regarding method 700, there may be up to four possible values for the PQI index, where each PQI index corresponds to a respective parameter set associated with a unique NZP-CSI-RS configuration and one or more TPs. The specified PQI index contained in DCI Format 2D PDCCH data may be different for each CoMP subframe, which may correspond to switching of the active TP(s) between TPs 204-208. Block system 900 may not be aware of the exact identity of each TP, i.e. may not have explicit knowledge of which of TPs 204-208 is the active TP(s). Instead, block system 900 may be able to identify an NZP-CSI-RS configuration that is quasi co-located with received PDSCH data and a received DMRS configuration, which may indirectly correspond to identification of which NZP-CSI-RS configuration is associated with the active TP for the current subframe. Block system 900 may be able to able to maintain timing synchronization based on received PQI indices, which may have the effect of maintaining timing synchronization with each TP due to the relationship between each PQI index and each TP.

By obtaining a phase offset estimate for the specified PQI index for the current CoMP subframe, block system 900 may maintain tight timing synchronization with the TP(s) associated with the specified PQI index. Block system 900 may obtain the phase offset estimate to be utilized for the current CoMP subframe based on both a received DMRS configuration and an identified NZP-CSI-RS configuration. Block system 900 may additionally obtain a phase offset estimate during each CoMP subframe for the remaining PQI indices based on the other NZP-CSI-RS configurations in order to maintain timing synchronization with each associated TP for use in later CoMP subframes, e.g. by maintaining a historical NZP-CSI-RS configuration for each PQI index for later use dependent on the PQI index specified in later subframes.

Block system 900 may receive one or more NZP-CSI-RS configurations in NZP-CSI-RS demodulation block 902. Each received NZP-CSI-RS configuration may correspond to a PQI index, which may correspond to one of TPs 204-208. NZP-CSI-RS demodulation block 902 may demodulate each received NZP-CSI-RS configuration.

NZP-CSI-RS offset estimation block 904 may then perform NZP-CSI-RS-based offset estimation using the demodulated NZP-CSI-RS configurations provided by NZP-CSI-RS demodulation block 902. NZP-CSI-RS offset estimation block 904 may e.g. perform phase rotation of NZP-CSI-RS samples over multiple frequency tones in order to obtain an NZP-CSI-RS-based phase offset estimate for each received NZP-CSI-RS. In the exemplary scenario detailed in FIG. 2, there may exist three TPs in exemplary a CoMP network using DPS scheme 200. Accordingly, there may exist three possible PQI indices, where each PQI index corresponds to one of TPs 204-208. Block system 900 may not have explicit knowledge of which of TPs 204-208 corresponds to each PQI index, in particular in CoMP scenarios where more than one TP maps to a single PQI index. However, as PQI index assignments may be assumed to be static, block system 900 may rely on the PQI indices to indirectly identify and differentiate between TPs 204-208 and maintain synchronization therewith without having explicit knowledge of the identity of each of TPs 204-208.

NZP-CSI-RS offset estimation block 904 may obtain three NZP-CSI-RS-based phase offset estimates $\theta_{CSIRS\_i}$, i={1, 2, 3}, where each NZP-CSI-RS-based phase offset estimate $\theta_{CSIRS\_i}$ uniquely corresponds to a respective $i^{th}$ PQI index (which may each in practice be a 2-bit identifier of the set {00, 01, 10, 11}). Estimation buffer block 906 may receive the NZP-CSI-RS-based phase offset estimates and may store each NZP-CSI-RS-based phase offset estimate in a buffer. Estimation buffer block 906 may store each NZP-CSI-RS-based phase offset estimate based on the PQI index associated with each NZP-CSI-RS-based phase offset estimate, i.e. based on the PQI index associated with the NZP-CSI-RS configuration utilized to obtain each NZP-CSI-RS-based phase offset estimate.

Estimation buffer block 906 may store a historical NZP-CSI-RS-based phase offset estimate for each PQI index, such as e.g. by averaging each of the NZP-CSI-RS-based phase offset estimates provided by NZP-CSI-RS offset estimation block 904 with a historical NZP-CSI-RS-based phase offset estimate based on one or more previous NZP-CSI-RS-based phase offset estimates. Estimation buffer block 906 may thus update a historical NZP-CSI-RS-based phase offset estimate associated with each PQI index based on the NZP-CSI-RS-based phase offset estimates provided by NZP-CSI-RS offset estimation block 904. Accordingly, estimation buffer block 906 may maintain a current NZP-CSI-RS-based phase offset estimate [$\hat{\theta}_{CSIRS_j}$; i=1, 2, 3] for each PQI index, and may update the NZP-CSI-RS-based phase offset estimate [$\hat{\theta}_{CSIRS_j}$; i=1, 2, 3] for each PQI index during each CoMP subframe using newly obtained NZP-CSI-RS-based phase offset estimates based on the =NZP-CSI-RS configurations during each CoMP subframe.

Estimation buffer block 906 may then provide each NZP-CSI-RS-based phase offset estimate $\hat{\theta}_{CSIRS\_i}$ to selection block 908. Selection block 908 may additionally receive a PQI index as input, which may the PQI index specified in the DCI Format 2D PDCCH data for the current subframe. As previously detailed, the specified PQI index may identify an NZP-CSI-RS resource that may be assumed to be quasi co-located with PDSCH data and DMRS received in the current subframe. Accordingly, the PQI index received by selection block 908 may correspond to the PQI index of one of NZP-CSI-RS-based phase offset estimates [$\hat{\theta}_{CSIRS_j}$; i=1, 2, 3] obtained by NZP-CSI-RS offset estimation block 904. The PQI index may therefore additionally correspond to an NZP-CSI-RS-based phase offset estimate $\hat{\theta}_{CSIRS\_i}$ stored in estimation buffer block 906.

Selection block 908 may then select the NZP-CSI-RS-based phase offset estimate $\hat{\theta}_{CSIRS\_i}$ corresponding to the PQI index specified for the current subframe. As this NZP-CS-RS-based phase offset estimate $\hat{\theta}_{CSIRS\_i}$ may be assumed quasi co-located with a received DMRS, block system 900 may utilize this NZP-CSI-RS-based phase offset estimate $\hat{\theta}_{CSIRS\_i}$ in conjunction with a DMRS-based phase offset estimate to obtain a DMRS-aided NZP-CSI-RS-based phase offset estimate $\hat{\theta}$ for the current subframe. The DMRS-aided NZP-CSI-RS based phase offset estimate $\hat{\theta}$ may offer an expanded phase offset estimation range than normal NZP-CSI-RS-based phase offset estimation, and accordingly may allow block system 900 to produce a more accurate phase offset estimate for use in timing compensation for the PDSCH data traffic in the current subframe.

Selection block 908 may thus select an NZP-CSI-RS-based phase offset estimate $\hat{\theta}_{CSIRS}$ based on the received PQI index, and may provide the resulting NZP-CSI-RS-based phase offset estimate $\hat{\theta}_{CSIRS}$ to adder 920, sign block 922, and selection block 928.

DMRS demodulation block 910 may concurrently perform DMRS demodulation on a DMRS configuration received in the current subframe, and may provide the demodulated DMRS to DMRS-based phase offset estimation block 912. DMRS-based phase offset estimation block 912 may then obtain a DMRS-based phase offset estimate $\hat{\theta}_{DMRS}$, such as by performing phase rotation of DMRS samples as previously detailed. DMRS-based phase offset estimation block 912 may then provide the resulting DMRS-based phase offset estimate to estimate buffer block 914. Estimate buffer block 914 may utilize the DMRS-based phase offset estimate to update a historical DMRS-based phase offset estimate stored in estimate buffer block 914. Estimate buffer block 914 may store a DMRS-based phase offset estimate for each PQI index in a similar manner as to estimate buffer block 906. However, as only one DMRS may be received in the current subframe, estimate buffer block 914 may only update a single DMRS-based phase offset estimate per CoMP subframe. For example, estimate buffer block 914 may average the DRMS-based phase offset estimate provided by DMRS-based phase offset estimation block 912 with a historical DMRS-based phase offset estimate corresponding to the PQI index of the DRMS-based phase offset estimate provided by DMRS-based phase offset estimation block 912. DMRS-based phase offset estimation block 912 may then store the resulting DMRS-based phase offset estimate $\hat{\theta}_{DMRS}$ for use in a subsequent CoMP subframe.

Block system 900 may utilize NZP-CSI-RS-based phase offset estimate $\hat{\theta}_{CSIRS}$ and DMRS-based phase offset estimate $\hat{\theta}_{DMRS}$ in conjunction to determine DMRS-aided NZP-CSI-RS-based phase offset estimate $\hat{\theta}$. Block system 900 may utilize the sign of NZP-CSI-RS-based phase offset estimate $\hat{\theta}_{CSIRS}$ and DMRS-based phase offset estimate $\hat{\theta}_{DMRS}$ in order to determine a phase offset estimate $\hat{\theta}$, such as detailed above in Equations 6a-6d.

The output of NZP-CSI-RS-based phase offset estimation may be bound by the wrapped range [−π, +π] (corresponding to [−2.78 μs, +2.78 μs] in the time domain), and accordingly outputs falling outside of the wrapped range [−π, +π] will be wrapped back within the range by a shift of a multiple of π. Accordingly, outputs of NZP-CSI-RS-based phase offset estimation falling within the ranges [−2π, −π] and [π, 2π] will be offset from the correct phase offset estimate by ±π.

Accordingly, NZP-CSI-RS-based phase offset estimate $\hat{\theta}_{CSIRS}$ may be offset by ±pi. Block system 900 Nice to thus identify whether the signs of NZP-CSI-RS-based phase offset estimate $\hat{\theta}_{CSIRS}$ and DMRS-based phase offset estimate $\hat{\theta}_{DMRS}$ are equal or opposite. If the sign of NZP-CSI-RS-based phase offset estimate $\hat{\theta}_{CSIRS}$ and the sign of DMRS-based phase offset estimate $\hat{\theta}_{DMRS}$ are the same, block system 900 may determine that NZP-CSI-RS-based phase offset estimate $\hat{\theta}_{CSIRS}$ is correct, and has not been offset due to the wrapped phase offset estimation range. Alternatively, if the sign of NZP-CSI-RS-based phase offset estimate $\hat{\theta}_{CSIRS}$ and the sign of DMRS-based phase offset estimate $\hat{\theta}_{DMRS}$ are different, block system 900 may determine that NZP-CSI-RS-based phase offset estimate $\hat{\theta}_{CSIRS}$ has been offset by ±π, and may add either +π or −π to the additive inverse of NZP-CSI-RS-based phase offset estimate $\hat{\theta}_{CSIRS}$ based on the sign of DMRS-based phase offset estimate $\hat{\theta}_{DMRS}$ in order to correct the offset. Such is described in Equations 6a-6d.

Accordingly, sign block 916 may determine the sign of DMRS-based phase offset estimate $\hat{\theta}_{DMRS}$. Similarly, sign block 922 may determine the sign of NZP-CSI-RS-based phase offset estimate $\hat{\theta}_{CSIRS}$. Sign comparison block 924 may compare the sign of DMRS-based phase offset estimate $\hat{\theta}_{DMRS}$ to the sign of NZP-CSI-RS-based phase offset estimate $\hat{\theta}_{CSIRS}$.

If the sign of DMRS-based phase offset estimate $\hat{\theta}_{DMRS}$ is the same as the sign of NZP-CSI-RS-based phase offset estimate $\hat{\theta}_{CSIRS}$, sign comparison block 924 may provide phase offset estimate selection block 928 with a positive control signal. As the sign of DMRS-based phase offset estimate $\hat{\theta}_{DMRS}$ is the same as the sign of NZP-CSI-RS-based phase offset estimate $\hat{\theta}_{CSIRS}$, block system 900 may determine that NZP-CSI-RS-based phase offset estimate $\hat{\theta}_{CSIRS}$ is correct. Phase offset estimate selection block 928 may then provide NZP-CSI-RS-based phase offset estimate $\hat{\theta}_{CSIRS}$ located as the positive input pin as phase offset estimate $\hat{\theta}$, which may be subsequently used for timing compensation in reception of PDSCH data in the current subframe. Phase offset estimate $\hat{\theta}$ may be translated into the time domain in order to arrive at a timing offset estimate.

Alternatively, if the sign of DMRS-based phase offset estimate $\hat{\theta}_{DMRS}$ is not the same as the sign of NZP-CSI-RS-based phase offset estimate $\hat{\theta}_{CSIRS}$, sign comparison block 924 may provide a negative output signal. DMRS region determination block 926 may then determine if DMRS-based phase offset estimate $\hat{\theta}_{DMRS}$ is within the inherent phase offset estimation region [−απ, +απ], where α=0.5. If DMRS-based phase offset estimate $\hat{\theta}_{DMRS}$ is within the inherent phase offset estimation region, DMRS region determination block 926 may provide phase offset estimate selection block 928 with a positive control signal. Phase offset estimate selection block 928 may then select NZP-CSI-RS-based phase offset estimate $\hat{\theta}_{CSIRS}$ as DMRS-aided NZP-CSI-RS-based phase offset estimate $\hat{\theta}$.

If DMRS-based phase offset estimate $\hat{\theta}_{DMRS}$ is falls outside the inherent phase offset estimation region, DMRS region determination block 926 may provide phase offset estimate selection block 928 with a negative control signal. Phase offset estimate selection block 928 may then select the phase offset estimate at the negative input pin as DMRS-aided NZP-CSI-RS-based phase offset estimate $\hat{\theta}$.

The phase offset estimate at the negative input pin may be dependent on the sign of DMRS-based phase offset estimate $\hat{\theta}_{DMRS}$. As shown in FIG. 9, sign block 916 may determine the sign of DMRS-based phase offset estimate $\hat{\theta}_{DMRS}$ and provide the resulting sign to multiplication block 918. Multiplication block 918 may multiply the resulting sign with π. As previously detailed, NZP-CSI-RS-based phase offset estimate $\hat{\theta}_{CSIRS}$ may be offset by ±π if the NZP-CSI-RS-based phase offset estimate falls outside of the range [−π, +π]. The sign of DMRS-based phase offset estimate $\hat{\theta}_{DMRS}$ may be utilized to determine the proper offset, either −π or +π, to be applied to NZP-CSI-RS-based phase offset estimate $\hat{\theta}_{CSIRS}$ in order to arrive at the correct timing offset estimate value.

Accordingly, addition block 920 may output either −π−$\hat{\theta}_{CSIRS}$ or π−$\hat{\theta}_{CSIRS}$ dependent on the sign of DMRS-based phase offset estimate $\hat{\theta}_{DMRS}$, i.e. as denoted in Equations 6a-6d. Phase offset estimate selection block 928 may receive the resulting output from addition block 920 at the negative input pin, and may select the resulting output as DMRS-aided NZP-CSI-RS-based phase offset estimate $\hat{\theta}$ if a negative control input is provided by DMRS region determination block 926.

As opposed to being bound within the wrapped phase offset estimation region of [−π, +π] of NZP-CSI-RS-based phase offset estimation, block system 900 may be able to provide phase offset estimate $\hat{\theta}$ that is accurate within the range [−2π, +2π] (i.e. corresponding to [−5.56 μs, +5.56 μs] in the time domain) through the use of DMRS-based phase offset estimation. Accordingly, the DMRS-aided NZP-CSI-RS-based phase offset estimation implemented by block system 900 may offer an expanded range without sacrificing accuracy to determine an accurate value for phase offset estimate $\hat{\theta}$.

It is appreciated that while the calculations of block system 900 have been described as being performed in the phase domain, it may be similarly practical to perform one or more of the calculations in the time domain. It is further appreciated that phase offset estimate $\hat{\theta}$ may be translated into the time domain in order to perform timing offset compensation for reception of PDSCH data traffic for the current CoMP subframe.

Method 700 and block system 900 thus detail an exemplary approach in which timing and/or phase offset estimates falling outside of the NZP-CSI-RS-based timing/phase offset estimation range may be corrected for using DMRS-based timing/phase offset estimates. Accordingly, the approach detailed in method 700 and block system 900 may improve PDSCH demodulation performance due to increased accuracy in timing and/or phase offset estimation.

Figure 10:
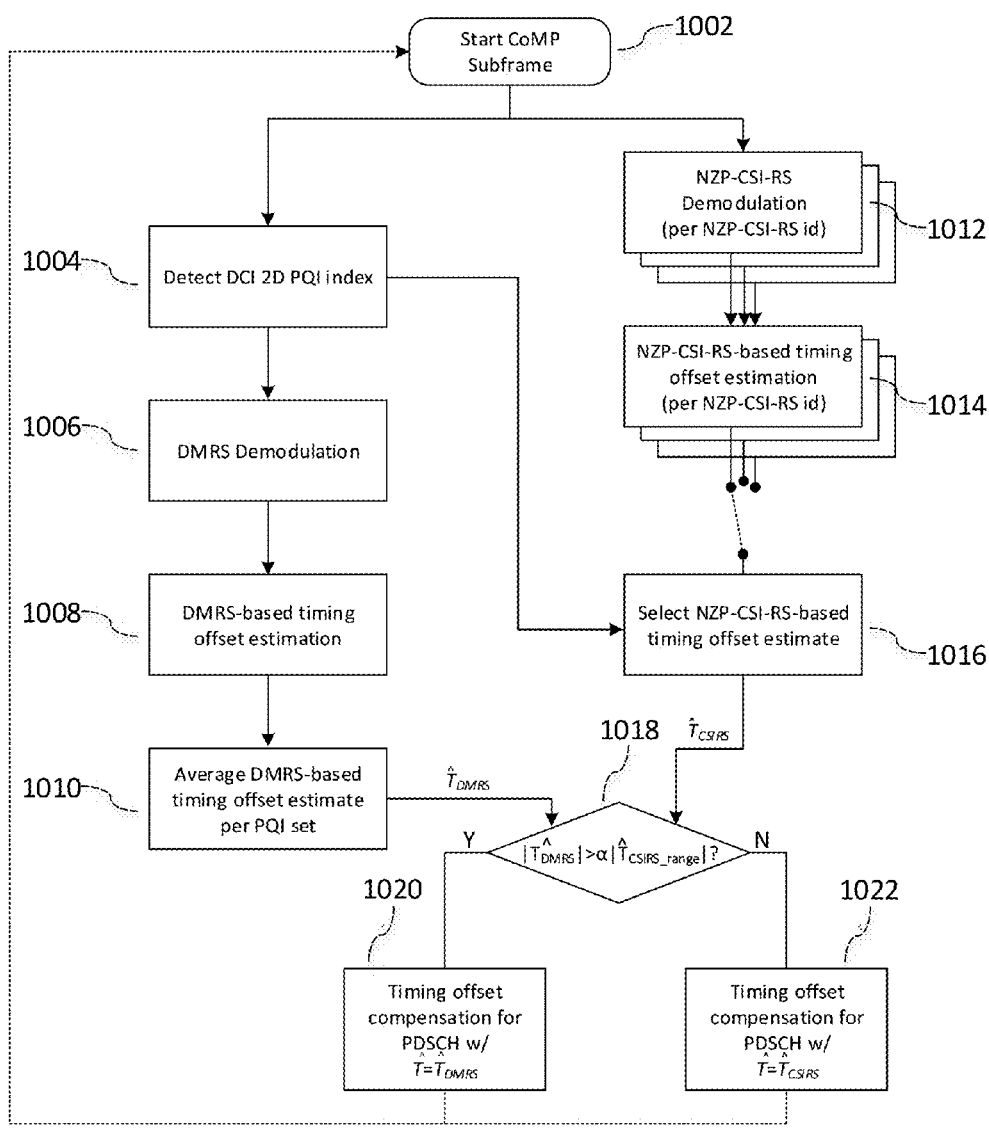
FIG. 10 shows a flow diagram illustrating a timing offset estimation process according to a third exemplary aspect of the disclosure.

FIG. 10 shows method 1000. Method 1000 may be an alternative approach to combining a DMRS-based timing offset estimate $\hat{T}_{DMRS}$ and NZP-CSI-RS-based timing offset estimate $\hat{T}_{CSIRS}$ as detailed regarding method 700 in FIG. 7.

1002-1016 of method 1000 may function in a substantially similar manner as to 702-716 in method 700 in order to provide a DMRS-based timing offset estimate $\hat{T}_{DMRS}$ and NZP-CSI-RS-based timing offset estimate $\hat{T}_{CSIRS}$ where the NZP-CSI-RS-based timing offset estimate $\hat{T}_{CSIRS}$ corresponds to the PQI index specified in DCI Format 2D PDCCH data for the current subframe identifying an NZP-CSI-RS configuration that may be assumed quasi co-located with a received DMRS configuration.

Method 1000 may provide DMRS-aided NZP-CSI-RS-based timing offset estimate $\hat{T}$. As opposed to 718 in method 700, which as previously detailed may combine DMRS-based timing offset estimate $\hat{T}_{DMRS}$ and NZP-CSI-RS-based timing offset estimate $\hat{T}_{CSIRS}$ by shifting the additive inverse of NZP-CSI-RS-based timing offset estimate $\hat{T}_{CSIRS}$ by ±π according to the relative signs of DMRS-based timing offset estimate $\hat{T}_{DMRS}$ and NZP-CSI-RS-based timing offset estimate $\hat{T}_{CSIRS}$, 1018 may instead select one of DMRS-based timing offset estimate $\hat{T}_{DMRS}$ or NZP-CSI-RS-based timing offset estimate $\hat{T}_{CSIRS}$ to use as timing DMRS-aided NZP-CSI-RS-based timing offset estimate $\hat{T}$.

Accordingly, 1018 may evaluate the following expression to select either DMRS-based timing offset estimate $\hat{T}_{DMRS}$ or NZP-CSI-RS-based timing offset estimate $\hat{T}_{CSIRS}$ as DMRS-aided NZP-CSI-RS-based timing offset estimate:

$$|\hat{T}_{DMRS}| > \alpha |\hat{T}_{CSIRS\_range}| \tag{7}$$

where α is a scaling parameter and $\hat{T}_{CSIRS\_range}$ is the range in time of NZP-CSI-RS-based timing offset estimation. As previously detailed, the range in time of NZP-CSI-RS-based timing offset estimation may be bound as [−2.78 μs, +2.78 μs]. Equation 7 may thus be alternatively written as follows:

$$|\hat{T}_{DMRS}| > \alpha \times 2.78 \text{ μs} \quad (8).$$

The scaling parameter α may be selected such that $0 < \alpha \le 1$, and may be adjusted accordingly in order to obtain intended results. The equivalent expressions of Equation 7 and 8 may thus determine whether DMRS-based timing offset estimate $\hat{T}_{DMRS}$ falls within a scaled range based on the range of NZP-CSI-RS-based timing offset estimation.

If 1018 determines that DMRS-based timing offset estimate $\hat{T}_{DMRS}$ falls outside of the range $\alpha|T_{CSIRS\_range}|$, 1000 may proceed to 1020 to perform timing offset compensation for PDSCH reception using timing offset estimate $\hat{T} = \hat{T}_{DMRS}$. Alternatively, if 1018 determines that DMRS-based timing offset estimate $\hat{T}_{DMRS}$ falls inside of the range $\alpha|\hat{T}_{CSIRS\_range}|$, 1000 may proceed to 1022 to perform timing offset compensation for PDSCH reception using timing offset estimate $\hat{T} = \hat{T}_{CSIRS}$.

Method 1000 may thus also utilize the expanded range of DMRS-aided NZP-CSI-RS-based timing offset estimation. Despite having lower accuracy than NZP-CSI-RS-based timing offset estimation, DMRS-based timing offset estimation may prove more reliable in scenarios in which an actual timing offset falls outside of the range of NZP-CSI-RS-based timing offset estimation.

It is appreciated that method 1000 may be implemented in either the time or phase domain. Furthermore, it is appreciated that method 1000 may be implemented as an iterative process which is repeated based on the PQI indices specified over a sequence of more than one subframe.

As previously detailed regarding Equation 1, a mobile terminal may obtain a phase offset estimate or timing offset estimate relative to a transmission point by evaluating the mean angle between two reference signal samples adjacent on the frequency axis, i.e. separated by a number of REs on a resource grid. 3GPP has specified a frequency distribution of 12 REs for NZP-CSI-RS (i.e. $N_{REgap\_CSIRS}=12$) and 5 REs for DMRS (i.e. $N_{REgap\_DMRS}=5$).

Autocorrelation bins may be utilized to determine a timing offset estimate (or equivalent phase offset estimate). An autocorrelation bin $\hat{r}_n$ with lag n may be calculated based on a reference signal as follows:

$$\hat{r}_n = \frac{1}{|\mathcal{K}|} \sum_{k \in \mathcal{K}} h(k) h^*(k+n), \quad (9)$$

where $\mathcal{K}$ is the set of index pairs (k, k+n) corresponding to the RE allocation for demodulated reference signal h on the resource grid.

Autocorrelation bin $\hat{r}_n$ may thus be calculated based on samples of demodulated reference signal h (which may be e.g. either an NZP-CSI-RS or DMRS in the implementation of method 1100) separated by lag n in the frequency domain. The corresponding timing offset estimate $\hat{T}_n$ may then be obtained by evaluating the argument (i.e. phase) of autocorrelation bin $\hat{r}_n$ as follows:

$$\hat{T}_n = \frac{\arg(\hat{r}_n)}{j 2\pi f_n}, \quad (10)$$

where $\hat{f}_n$ is the distance in frequency corresponding to lag n, i.e. as defined by the associated $N_{REgap}$ and subcarrier spacing.

The quality of resulting timing offset estimate $\hat{T}_n$ may be quantitatively analyzed by evaluating the product of the cardinality $\mathcal{K}$ and the magnitude $|\hat{r}_n|$. The resulting expression $|\mathcal{K}| \cdot |\hat{r}_n|$ may thus be utilized as e.g. a confidence or reliability metric, as the accuracy of resulting timing offset estimate $\hat{t}_n$ may be proportional to $|\mathcal{K}| \cdot |\hat{r}_n|$.

A mobile terminal such as UE 202 may therefore utilize autocorrelation bins in order to determine a timing offset estimate $\hat{T}$ to be used in timing offset compensation during PDSCH demodulation, such as during the reception of PDSCH data as part of a CoMP scenario. UE 202 may additionally utilize the reliability evaluation associated with autocorrelation bin-based timing offset estimation, such as by evaluating the expression $|\mathcal{K}| \cdot |\hat{r}_n|$ of an obtained autocorrelation bin $\hat{r}_n$ to determine whether an associated timing offset estimate $\hat{t}_n$ is reliable.

UE 202 may thus calculate an autocorrelation bin $\hat{r}_n$ with lag n based on a reference signal received during a CoMP subframe, e.g. an NZP-CSI-RS configuration. UE 202 may then calculate an associated reliability metric of the form $|\mathcal{K}| \cdot |\hat{r}_n|$ and compare the reliability metric to a predefined threshold. If the reliability metric satisfies the threshold, UE 202 may calculate the related timing offset estimate $\hat{T}_n$ based on autocorrelation bin $\hat{r}_n$ and apply timing offset estimate $\hat{T}_n$, e.g. as timing offset estimate $\hat{T}$ in 720 of method 700.

Alternatively, if the reliability metric does not satisfy the threshold, UE 202 may not generate a timing offset estimate $\hat{T}_n$ based on the NZP-CSI-RS received in the current subframe. Instead, UE 202 may utilize a timing offset estimate $\hat{T}'_n$ calculated in a previous CoMP subframe for timing offset compensation current CoMP subframe, and accumulate autocorrelation bin $\hat{r}_n$ over subsequent CoMP subframes in order to generate an updated timing offset estimate $\hat{T}_n$ in a later subframe once the reliability metric satisfies the threshold.

Furthermore, UE 202 may be configured to calculate autocorrelations bins $\hat{r}_m$ and $\hat{r}_n$ based on DMRS and NZP-CSI-RS for a current CoMP subframe, respectively, where lag m≠n due to the frequency distances $N_{REgap\_CSIRS}=12$ and $N_{REgap\_DMRS}=5$ according to the frequency distances between adjacent reference signals on the resource grid. UE 202 may then be configured to combine autocorrelation bins $\hat{r}_m$ and $\hat{r}_n$ by translating both $\hat{r}_m$ and $\hat{r}_n$ into the same lag domain, i.e. the lag n domain of NZP-CSI-RS, thereby producing a combined lag m autocorrelation bin $\hat{r}_n^{comb}$. UE 202 may then determine a resulting timing offset estimate $\hat{T}_n^{comb}$ based on the combined autocorrelation bins, thereby obtaining a timing offset estimate based on NZP-CSI-RS and DMRS.

A particular advantage of such an approach may be the aforementioned reliability evaluation associated with timing offset estimation based on autocorrelation bins. UE 202 may thus evaluate one or more reliability metrics associated with $\hat{r}_m$, $\hat{r}_n$, and/or $\hat{r}_n^{comb}$ for the current CoMP subframe to evaluate the accuracy of an associated combined timing offset estimate $\hat{T}_n^{comb}$. UE 202 may thus have a mechanism available to determine if the timing offset estimates calculated based on reference signals in the current CoMP are accurate. UE 202 may then decide to utilize the timing offset estimates if the associated reliability metrics are satisfactory, or to utilize timing offset estimates calculated based on reference signals from previous CoMP frames while continuing to accumulate autocorrelation bins in subsequent subframes for potential later use.

Figure 11:
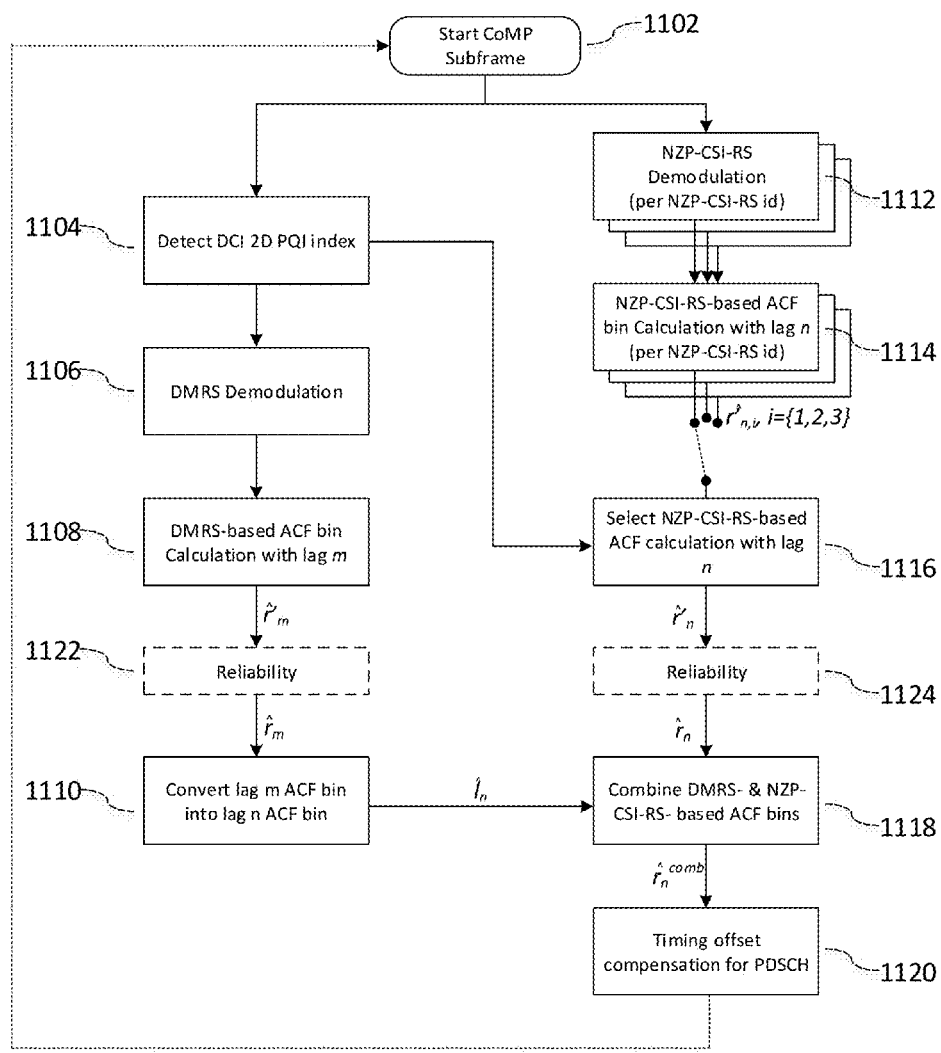
FIG. 11 shows a flow diagram illustrating a timing offset estimation process according to a fourth exemplary aspect of the disclosure.

FIG. 11 shows a flow chart illustrating method 1100. Method 1100 may be utilized for similar applications as methods 700 and 1000, such as to produce a timing offset estimate or phase offset estimate for multiple TPs in a CoMP scheme.

Similarly to as previously detailed, method 1100 may utilize autocorrelation bins associated with both NZP-CSI-RS-based timing offset estimation and DMRS-based timing offset estimation in order to generate a combined timing offset estimate $\hat{T}_n^{comb}$ for the specified PQI index of a given CoMP subframe.

Method 1100 may utilize reliability metrics associated with the related autocorrelation bins in order to determine if a resulting timing offset estimation is suitable for use.

Method 1100 may execute 1102-1106 and 1112 in a manner substantially similar to 702-706 and 712 respectively in method 700 and 1002-1006 and 1012 respectively in method 1000. Method 1100 may thus determine the specified PQI index for the current subframe by receiving DCI Format 2D PDCCH data from the serving cell in 1104, and perform DMRS demodulation on a received DMRS configuration in 1106 to obtain a demodulated DMRS configuration.

Method 1100 may perform NZP-CSI-RS demodulation for each NZP-CSI-RS configuration according to each PQI index in 1112, and may thus obtain a demodulated NZP-CSI-RS configuration for each PQI index.

Method 1100 may then determine a DMRS-based autocorrelation (ACF) bin $\hat{r}'_m$ with lag m in 1108, such as by evaluating the mean angle between two DMRS samples separated by $N_{REgap\_DMRS}=5$ REs along the frequency axis of the resource grid as detailed regarding Equation 9.

Similarly, method 1100 may determine an NZP-CSI-RS-based autocorrelation (ACF) bin $\hat{r}'_{n,i}$, i={1, 2, 3} for each of the 3 possible PQI indices of A CoMP network using DPS scheme 200 with lag n in 1108, such as by evaluating the mean angle between two NZP-CSI-RS samples separated by $N_{REgap\_CSIRS}=12$ REs along the frequency axis of the resource grid as detailed regarding Equation 9.

Method 1100 may then select the NZP-CSI-RS-based autocorrelation bin based on the specified PQI index for the current subframe in 1104 as the NZP-CSI-RS-based autocorrelation bin $\hat{r}'_n$ with lag n. As previously detailed, this selection in 1116 is based on the quasi co-location assumption between CSI-RS antenna ports and DMRS antenna ports specified by the PQI index for a given CoMP subframe.

Method 1100 may thus obtain autocorrelation bins $\hat{r}'_m$ and $\hat{r}'_n$ with lags m and n, respectively, in 1108 and 1116. Method 1100 may then perform a reliability check on autocorrelation bins $\hat{r}'_m$ and $\hat{r}'_n$ in 1122 and 1124 in order to determine whether timing offset estimates generated from autocorrelation bins $\hat{r}'_m$ and $\hat{r}'_n$ would be accurate.

Method 1100 may thus determine a reliability metric for each autocorrelation bin $\hat{r}'_m$ and $\hat{r}'_n$, where the reliability metrics are calculated as $|\mathcal{K}_m|\cdot|\hat{r}'_m|$ and $|\mathcal{K}_n|\cdot|\hat{r}'_n|$ using the respective cardinality of $\mathcal{K}_m$ and $\mathcal{K}_n$ utilized in Equation 9 to calculate autocorrelation bins $\hat{r}'_m$ and $\hat{r}'_n$, respectively.

1122 and 1124 may thus evaluate the reliability metrics $|\mathcal{K}_m|\cdot|\hat{r}'_m|$ and $|\mathcal{K}_n|\cdot|\hat{r}'_n|$ associated with each autocorrelation bin $\hat{r}'_m$ and $\hat{r}'_n$, such as by comparing the each reliability metric $|\mathcal{K}_m|\cdot|\hat{r}'_m|$ and $|\mathcal{K}_n|\cdot|\hat{r}'_n|$ to a respective reliability threshold.

For example, 1122 may evaluate the expression $|\mathcal{K}_m|\cdot|\hat{r}'_m|>th_m$, where $th_m$ is a predefined reliability threshold for DMRS autocorrelation bins. If $|\mathcal{K}_m|\cdot|\hat{r}'_m|>th_m$, 1122 may select autocorrelation bin $\hat{r}'_m$ obtained in 1108 as DMRS autocorrelation bin $\hat{r}_m$, which may be subsequently applied in method 1100 as will be later detailed.

If $|\mathcal{K}_m|\cdot|\hat{r}'_m|\leq th_m$, 1122 may determine that $\hat{r}'_m$ does not satisfy reliability requirements for generating timing offset estimates from autocorrelation bins, and thus may conclude that autocorrelation bin $\hat{r}'_m$ determined based on the DMRS configuration received in the current subframe is unsuitable for use in generating a timing offset estimate. Accordingly, 1122 may not select $\hat{r}'_m$ as DMRS autocorrelation bin $\hat{r}_m$.

Instead, 1122 may utilize a previously obtained DMRS autocorrelation bin, such as a DMRS autocorrelation bin $\hat{r}''_m$ obtained in a previous subframe that satisfied the reliability metric evaluation expression $|\mathcal{K}_m|\cdot|\hat{r}''_m|>th_m$. 1122 may thus select $\hat{r}''_m$ as DMRS autocorrelation bin $\hat{r}_m$ to be used in subsequent operations of method 1100. Method 1100 may continue to accumulate autocorrelation bins $\hat{r}'_m$ over subsequent subframes to determine if an autocorrelation bin $\hat{r}'_m$ satisfies the requisite reliability thresholds for timing offset estimate generation.

1124 may similarly evaluate the expression $|\mathcal{K}_n|\cdot|\hat{r}'_n|>th_n$, where $th_n$ is a predefined reliability threshold for NZP-CSI-RS autocorrelation bins. If $|\mathcal{K}_n|\cdot|\hat{r}'_n|>th_n$, 1124 may select autocorrelation bin $\hat{r}'_n$ ad NZP-CSI-RS autocorrelation bin $\hat{r}_m$, which may be subsequently applied in method 1100 as will be later detailed.

If $|\mathcal{K}_n|\cdot|\hat{r}'_n|\leq th_n$, 1124 may determine that $\hat{r}'_n$ does not satisfy reliability requirements for generating timing offset estimates from autocorrelation bins, and thus may conclude that autocorrelation bin $\hat{r}'_n$ determined based on the NZP-CSI-RS configuration associated with the specified PQI index of the current subframe is unsuitable for use in generating a timing offset estimate. Accordingly, 1124 may not select $\hat{r}'_n$ as NZP-CSI-RS autocorrelation bin $\hat{r}_n$.

Similarly as to 1122, 1124 may utilize a previously obtained NZP-CSI-RS autocorrelation bin, such as an NZP-CSI-RS autocorrelation bin $\hat{r}''_n$ obtained in a previous subframe that satisfied the reliability metric evaluation expression $|\mathcal{K}_n|\cdot|\hat{r}''_n|>th_n$. 1122 may thus select $\hat{r}''_n$ as NZP-CSI-RS autocorrelation bin $\hat{r}_n$ to be used in subsequent operations of method 1100. Method 1100 may continue to accumulate autocorrelation bins $\hat{r}'_n$ over subsequent subframes to determine if an autocorrelation bin $\hat{r}'_n$ satisfies the requisite reliability thresholds for timing offset estimate generation.

Method 1100 may thus obtain DMRS autocorrelation bin $\hat{r}_m$ and NZP-CSI-RS autocorrelation bin $\hat{r}_n$ following 1124, with respective lags m and n in accordance with the distribution of DMRS and NZP-CSI-RS along the frequency axis in the resource grid.

Method 1100 may then convert lag n DMRS autocorrelation bin $\hat{r}_m$ into lag n DMRS autocorrelation bin $\hat{l}_n$ in 1110 as follows:

$$\hat{l}_n = |\hat{r}_m|\left(\frac{\hat{r}_m}{|\hat{r}_m|}\right)^{\pm m/n}, \quad (11)$$

where the ambiguity with in the sign of the exponent (±m/n) is distinguished by the cases where m>n and n>m. If m>n, the covered range of timing offsets that can be derived from a lag m autocorrelation bin is bound by $$\left[-\frac{1}{\pi f_m}, \frac{1}{\pi f_m}\right].$$

Accordingly, the destination resolution is smaller than the source resolution and the sign of the exponent is always positive. If n>m, the destination resolution is smaller than the source resolution, which implies the sign of the exponent may be selected as sign($\Im\{\hat{r}_m\}\cdot\Im\{\hat{r}_n\}$) in order to resolve the ambiguity of the phase of autocorrelation bin $\hat{r}_n$ with respect to the destination range.

1110 may thus convert lag m DMRS autocorrelation bin $\hat{r}_m$ in to the lag n domain to generate a corresponding lag n DMRS autocorrelation bin $\hat{l}_n$.

1118 may then combine lag n DMRS autocorrelation bin $\hat{l}_n$ and lag n NZP-CSI-RS autocorrelation bin $\hat{r}_n$ in 1118 to generate a combined lag n autocorrelation bin $\hat{r}_n^{comb}$. 1118 may calculate combined lag n autocorrelation bin $\hat{r}_n^{comb}$ from lag n DMRS autocorrelation bin $\hat{l}_n$ and lag n NZP-CSI-RS autocorrelation bin $\hat{r}_n$ as follows:

$$\hat{r}_n^{comb} = \alpha \hat{l}_n + \beta \hat{r}_n \qquad (12),$$

where $\alpha$ and $\beta$ are weighting coefficients that may be applied by 1118 in order to weight the contribution of lag n DMRS autocorrelation bin $\hat{l}_n$ or combined lag n autocorrelation bin $\hat{r}_n^{comb}$ more heavily in combined lag n autocorrelation bin $\hat{r}_n^{comb}$.

Weighting coefficients $\alpha$ and $\beta$ may be set as $\alpha=\beta$, e.g. as $\alpha=\beta=1$, in order to perform simple un-weighted combination of lag n DMRS autocorrelation bin $\hat{l}_n$ and lag n NZP-CSI-RS autocorrelation bin $\hat{r}_n$. Alternatively, weighting coefficients $\alpha$ and $\beta$ may be selected as constant values to consistently weight generation of combined lag n autocorrelation bin $\hat{r}_n^{comb}$ towards either lag n DMRS autocorrelation bin $\hat{l}_n$ or lag n NZP-CSI-RS autocorrelation bin $\hat{r}_n$.

In a further implementation, weighting coefficients $\alpha$ and $\beta$ may be adaptable. For example, one of the received DMRS configuration or NZP-CSI-RS configuration may be subject to increased interference and/or noise due to e.g. a specific RE allocation. Accordingly, 1118 may evaluate the noise variance of the received DMRS configuration and NZP-CSI-RS configuration, e.g. as a signal-to-noise ratio (SNR) in order to determine appropriate values for weighting coefficients $\alpha$ and $\beta$.

Combined lag n autocorrelation bin $\hat{r}_n^{comb}$ may thus be based on both DMRS and NZP-CSI-RS by virtue of lag n DMRS autocorrelation bin $\hat{l}_n$ and lag n NZP-CSI-RS autocorrelation bin $\hat{r}_n$. 1120 may then perform timing offset compensation on PDSCH using combined lag n autocorrelation bin $\hat{r}_n^{comb}$. 1120 may determine a corresponding timing offset estimate $\hat{T}_n^{comb}$ from combined lag n autocorrelation bin $\hat{r}_n^{comb}$, e.g. based on Equation 10, to apply in timing offset compensation for PDSCH data during the current subframe.

Method 1100 may perform reliability evaluation on combined lag n autocorrelation bin $\hat{r}_n^{comb}$ as opposed to performing reliability evaluation on both of lag m DMRS autocorrelation bin and lag $\hat{r}_m$ NZP-CSI-RS autocorrelation bin $\hat{r}_n$ in 1122 and 1124. For example, method 1100 may perform reliability evaluation on combined lag n autocorrelation bin $\hat{r}_n^{comb}$ between 1118 and 1120, such as by evaluating the associated reliability metric expression $\hat{r}_n^{comb}$ in order to determine whether a corresponding timing offset estimate $\hat{T}_n^{comb}$ will have satisfactory accuracy. If combined lag n autocorrelation bin $\hat{r}_n^{comb}$ fails the reliability evaluation, method 1100 may utilize a combined lag n autocorrelation bin $\hat{r}_n^{comb}$, calculated in a previous subframe for timing offset compensation in the current subframe, and continue to accumulate combined lag n autocorrelation bin $\hat{r}_n^{comb}$ for subsequent subframes.

Alternatively to utilizing legacy autocorrelation bins, i.e. autocorrelation bins calculated in previous subframes, in the event of reliability metric failure for the current subframe, method 1100 may be configured with one or more additional fallback procedures, such as any other timing offset estimate generation procedure detailed herein.

It is appreciated that method 1100 may be implemented in order to generate an equivalent phase offset estimate as opposed to timing offset estimate for a given subframe, such as e.g. to be used by phase de-rotators during PDSCH demodulation. It is additionally appreciated that method 1100 may be implemented in an iterative fashion, and thus may be performed over a progression of subsequent subframes. An iterative implementation of method 1100 may be practical due to the presence of the reliability check, which may require several iterations of method 1100 over several subframes in order to accumulate autocorrelation bins that satisfy the associated reliability check thresholds.

Accordingly, DMRS-aided NZP-CSI-RS-based timing offset estimates may be utilized to select a suitable FFT window placement, thereby potentially improving the effectiveness of FFT window placement selection due to the increased range of DMRS-aided NZP-CSI-RS-based timing offset estimation.

For example, UE 202 may obtain the current timing offset estimates for each PQI index in 504 using DMRS-aided NZP-CSI-RS-based timing offset estimation, e.g. as detailed regarding method 700, block system 900, method 1000, or method 1100, as opposed to applying only NZP-CSI-RS-based timing offset estimation as previously detailed regarding FIG. 5. The set of PQI index timing offset estimates $\hat{T}_{CSIRS\_i}$, i={1, 2, 3} determined in 504 may thus be based additionally based on DMRS, and thus may be obtained in a similar manner as detailed regarding method 700, block system 900, method 1000, or method 1100.

Accordingly, it is appreciated that the set of PQI index timing offset estimates $\hat{T}_{CSIRS\_i}$, i={1, 2, 3} may be obtained over a plurality of subframes, and thus may be historical DMRS-aided NZP-CSI-RS-based timing offset estimates. For example, a TM10 UE type-B may only be able to determine a DMRS timing offset for a single PQI index, i.e. the PQI index specified in DCI Format 2D PDCCH data, and thus may be able to determine a DMRS-aided NZP-CSI-RS-based timing offset estimate for only one of the possible PQI indices. 504 may thus provide DMRS-aided NZP-CSI-RS-based timing offset estimates $\hat{T}_{CSIRS\_i}$, i={1, 2, 3} that are based on a plurality of subframes in order to allow for multiple of PQI index timing offset estimates $\hat{T}_{CSIRS\_i}$, i={1, 2, 3} to be DMRS-aided.

Block system 600 may be similarly implemented using DMRS-aided NZP-CSI-RS phase offset estimation in determining of NZP-CSI-RS-based phase offset estimates [$\hat{\theta}_{CSIRS\_i}$, i=1, 2, 3].

Figure 12:
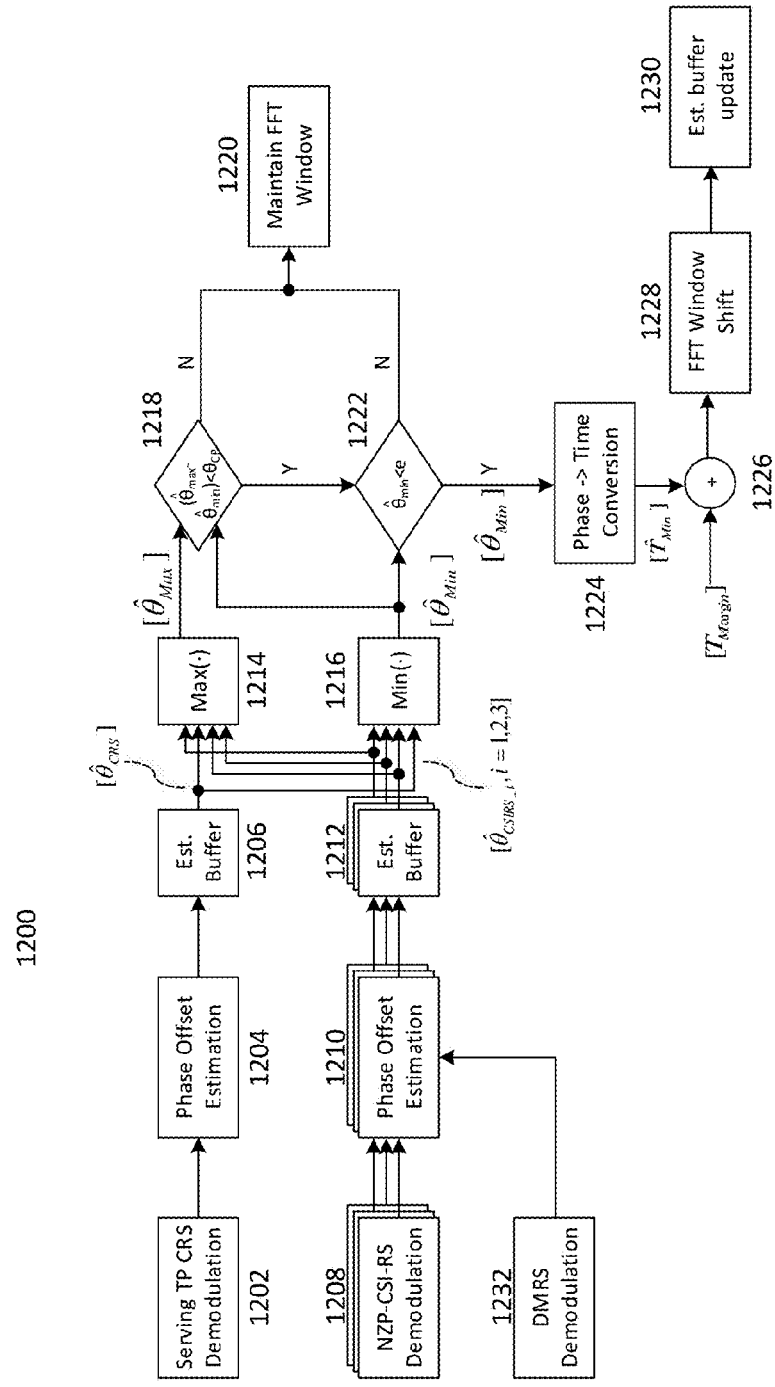
FIG. 12 shows a block diagram illustrating an FFT window optimization process for multiple transmit locations according to a third aspect of the disclosure.

FIG. 12 shows block system 1200. Block system 1200 may operate in a similar manner as to block system 600, and accordingly blocks 1202-1208 and 1216-1230 may perform substantially similar functionality to respective blocks 602-608 and 616-630.

However, block system 1200 may implement DMRS-aided NZP-CSI-RS-based phase offset estimation as opposed to NZP-CSI-RS-based phase offset estimation as applied in block system 600. Block system 1200 may thus produce DMRS-aided NZP-CSI-RS-base phase offset estimates $\hat{\theta}_{CSIRS\_i}$, i={1, 2, 3} that have greater effective phase offset estimate range than NZP-CSI-RS-base phase offset estimates $\hat{\theta}_{CSIRS\_i}$, i={1, 2, 3} of block system 600.

Accordingly, DMRS-aided NZP-CSI-RS-based phase offset estimation block 1210 may determine each NZP-CSI-RS-based phase offset estimate using a received DMRS configuration. Accordingly, DMRS demodulation block 1232 may perform DMRS demodulation on a DMRS configuration received for a subframe and provide the resulting demodulated DMRS configuration to DMRS-aided NZP-CSI-RS-based phase offset estimation block 1210.

Accordingly, DMRS demodulation block 1232 may provide NZP-CSI-RS-based phase offset estimation block 1210 with a DMRS configuration corresponding to the PQI index for the current subframe. Accordingly, the DMRS configuration provided by DMRS demodulation block 1232 may vary for each subframe as the active TP switches, thereby resulting in a different corresponding PQI index for the current subframe.

DMRS-aided NZP-CSI-RS-based phase offset estimation block 1210 may then perform DMRS-aided NZP-CSI-RS-based phase offset estimation using the demodulated NZP-CSI-RS configurations provided by NZP-CSI-RS demodulation block 1208 during the current subframe and the demodulated DMRS provided by DMRS demodulation block 1232. As the demodulated DMRS provided by DMRS demodulation block 1232 may only correspond to one of the demodulated NZP-CSI-RS configurations provided by NZP-CSI-RS demodulation block 1208 per subframe (i.e. based on PQI index), DMRS-aided NZP-CSI-RS-based phase offset estimation block 1210 may only provide one DMRS-aided NZP-CSI-RS-based phase offset estimate per subframe, i.e. a DMRS-aided NZP-CSI-RS-based phase offset estimate corresponding to the PQI index specified in DCI Format 2D PDCCH data for the current subframe.

DMRS-aided NZP-CSI-RS-based phase offset estimation block 1210 may then produce NZP-CSI-RS-based phase offset estimates that are not aided by the DMRS configuration received for the current subframe, i.e. corresponding to the PQI indices that were not specified as the PQI index for the current subframe. It is appreciated that block system 1200 may need to operate over a certain period of time in order to obtain DMRS-aided NZP-CSI-RS-based phase offset estimates corresponding to each PQI index, as block system 1200 may need to receive a DMRS associated with each possible PQI index in order to produce DMRS-aided NZP-CSI-RS-based phase offset estimates for each PQI index. However, it is appreciated that block system 1200 may still function without obtaining DMRS-aided NZP-CSI-RS-based phase offset estimates for each PQI index, and that block system 1200 may function utilizing only NZP-CSI-RS-based phase offset estimates such as detailed regarding block system 1200.

As one of the NZP-CSI-RS-based phase offset estimates provided by DMRS-aided NZP-CSI-RS-based phase offset estimation block 1210 may be aided by DMRS for a given subframe, it is appreciated that one or more of the historical NZP-CSI-RS-based phase offset estimates stored by DMRS-aided NZP-CSI-RS-based phase offset estimate buffer block 1212 may be additionally based on DMRS.

DMRS-aided NZP-CSI-RS-based phase offset estimate buffer block 1212 may operate similarly as to NZP-CSI-RS-based phase offset estimate buffer block 612 of block system 600, and thus may store historical DMRS-aided NZP-CSI-RS-based phase offset estimates, e.g. DMRS-aided NZP-CSI-RS-based phase offset estimates that are based on DMRS-aided NZP-CSI-RS-based phase offset estimates obtained in one or more previous CoMP subframes. DMRS-aided NZP-CSI-RS-based phase offset estimate buffer block 1212 may then update the DMRS-aided NZP-CSI-RS-based phase offset estimates during each CoMP subframe and provide resulting DMRS-aided NZP-CSI-RS-based phase offset estimates $\hat{\theta}_{CSIRS\_i}$, i={1, 2, 3} to minimum phase offset estimate selection block 1216 and maximum phase offset estimate selection block 1214.

The remaining blocks of block system 1200, i.e. blocks 1202-1208 and 1216-1230 may operate in a substantially similar fashion as to blocks 602-608 and 616-630, and thus will not be described in explicit detail. Block system 1200 may thus select the minimum- and maximum-valued phase offset estimates from CRS-based phase offset estimate $\hat{\theta}_{CRS}$ and DMRS-aided NZP-CSI-RS-based phase offset estimates $\hat{\theta}_{CSIRS\_i}$, i={1, 2, 3} and determine whether the difference between maximum-valued phase offset estimate $\hat{\theta}_{max}$ and minimum-valued phase offset estimate $\hat{\theta}_{min}$ is greater than the length of the cyclic prefix. If true, block system 1200 may then determine whether minimum-valued phase offset estimate $\hat{\theta}_{min}$ is negative, such as i.e. using negative tolerance parameter e. If true, block system 1200 may adjust the FFT window positioning based on the minimum-valued timing offset estimate $T_{min}$ corresponding to minimum-valued phase offset estimate $\hat{\theta}_{min}$ and $T_{margin}$. Block system 1200 may then update the phase offset estimates stored in estimation buffers 1206 and 1212 to reflect the change in FFT window positioning.

Due to the substantially static nature of FFT window placement, it is appreciated that the functionality of method 500 and block systems 600 and 1200 may not be constantly executed, i.e. may not be performed during each subframe, although such is realistically feasible. Instead, that the functionality of method 500 and block systems 600 and 1200 may be performed periodically, and may rely on timing and/or phase offset estimates obtained over multiple subframes to adjust FFT window placement.

It is appreciated that the NZP-CSI-RS-based timing and/or phase offset estimates used in method 500 and block systems 600 and 1200 may be obtained using any of the DMRS-aided implementations detailed in method 700, 1000, 1100, or block system 900, or any modifications thereof. Furthermore, it is appreciated that the NZP-CSI-RS-based timing and/or phase offset estimates used in method 500 and block systems 600 and 1200 may not be DMRS-aided, and may operate using only NZP-CSI-RS-based timing and/or phase offset estimates.

Figure 13:
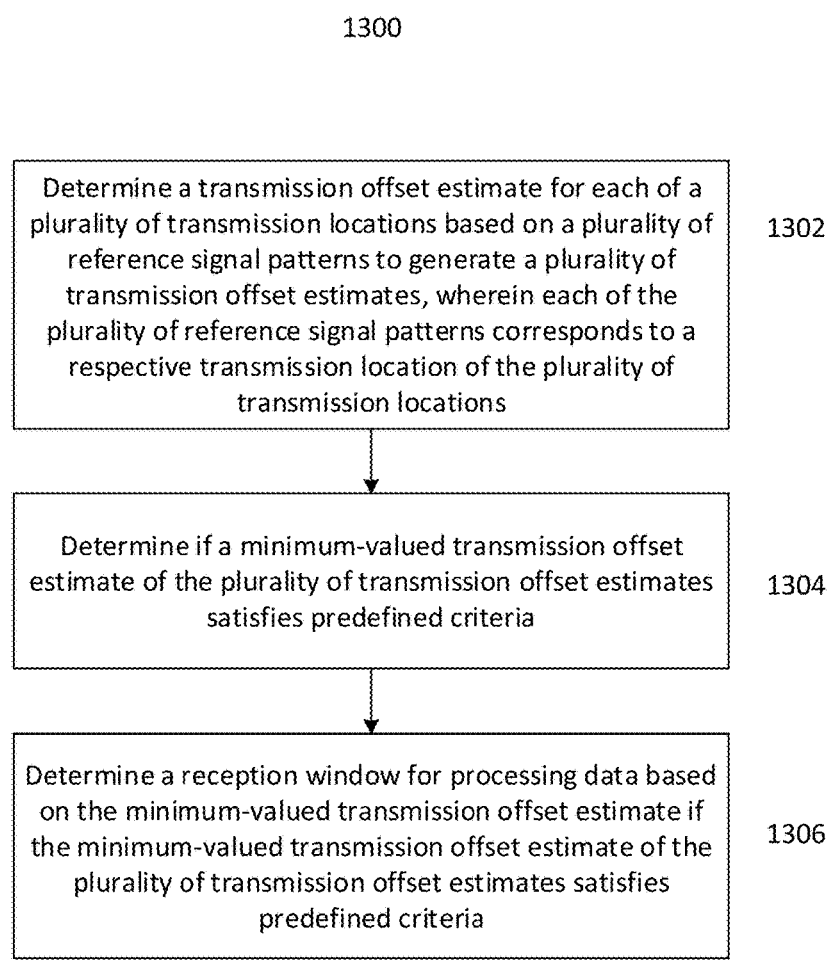
FIG. 13 shows a flow diagram illustrating a method of processing signals.

FIG. 13 shows method 1300, which is a method of processing signals. In 1302, method 1300 may determine a transmission offset estimate for each of a plurality of transmission locations based on a plurality of reference signal patterns to generate a plurality of transmission offset estimates, wherein each of the plurality of reference signal patterns corresponds to a respective transmission location of the plurality of transmission locations. Method 1300 may then determine if a minimum-valued transmission offset estimate of the plurality of transmission offset estimates satisfies predefined criteria in 1304. In 1306, method 1300 may determine a reception window for processing data based on the minimum-valued transmission offset estimate if the minimum-valued transmission offset estimate of the plurality of transmission offset estimates satisfies predefined criteria.

Method 1300 may thus e.g. be utilized to determine FFT window positioning to facilitate effective reception of data from a plurality of transmission locations. Method 1300 may be particularly applicable to CoMP scenarios, although it is appreciated method 1300 may be applied to many scenarios that involve synchronization with multiple transmission locations. Method 1300 may be further associated with any one or more of method 500, block system 600, method 700, block system 900, method 1000, method 1100, or block system 1200, and accordingly may perform substantially similar functionality to any related components thereof.

Figure 14:
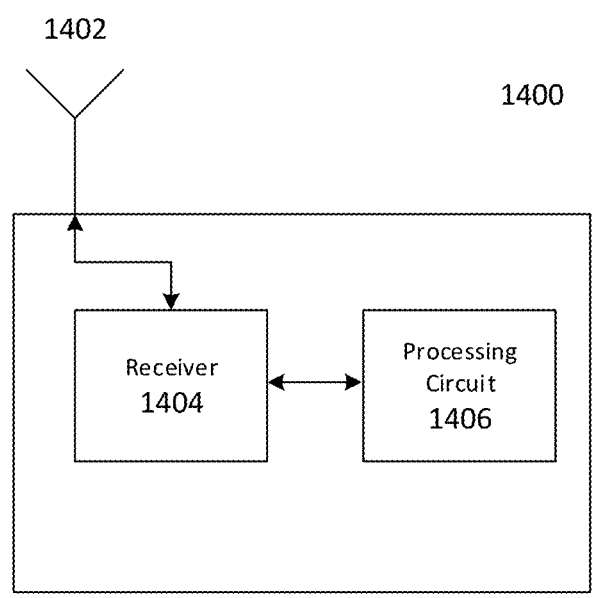
FIG. 14 shows a mobile terminal device including a mobile processing circuit.

FIG. 14 shows mobile terminal device 1400. Mobile terminal device 1400 may include at least a receiver circuit (receiver 1404) and a processing circuit (processing circuit 1406).

In a first exemplary aspect of the disclosure, the receiver circuit may be configured to receive a plurality of reference signal patterns from a plurality of transmission locations, wherein each of the plurality of reference signal patterns corresponds to a respective transmission location of the plurality of transmission locations. The processing circuit may be configured to determine a transmission offset estimate for each of the plurality of transmission locations based on the plurality of reference signal patterns to generate a plurality of transmission offset estimates, determine if a minimum-valued transmission offset estimate of the plurality of transmission offset estimates satisfies predefined criteria, and determine a reception time window for processing data traffic based on the minimum-valued transmission offset estimate if the minimum-valued transmission offset estimate satisfies the predefined criteria.

In a second exemplary aspect of the disclosure, the receiver may be configured to receive a signal comprising a data sequence of one or more data symbols and a plurality of reference signal patterns associated with a plurality of transmit locations. The processing circuit may be configured to determine a transmission offset estimate for each of the plurality of transmit locations based on a respective reference signal pattern of the plurality of reference signal patterns in order to determine a plurality of transmission offset estimates, determine if a minimum-valued transmission offset estimate of the plurality of transmission offset estimates is negative to determine a first determination result, determine if the difference between a maximum-valued transmission offset estimate of the plurality of transmission offset estimates and the minimum-valued transmission offset estimate of the plurality of transmission offset estimates is less than a predefined time duration to determine a second determination result, and determining positioning for a reception time window relative to the data sequence based on the minimum-valued transmission offset estimate, the first determination result, and the second determination result.

In a third exemplary aspect of the disclosure, processing circuit 1406 may be a mobile processing circuit. Processing circuit 1406 may be a mobile processing circuit, such a wireless communication modem or a broadband chipset. The mobile processing circuit may be configured to determine a transmission offset estimate for each of a plurality of transmission locations based on a plurality of reference signal patterns to generate a plurality of transmission offset estimates, wherein each of the plurality of reference signal patterns corresponds to a respective transmission location of the plurality of transmission locations, determine if a minimum-valued transmission offset estimate of the plurality of transmission offset estimates satisfies predefined criteria, and determine positioning for a reception time window for processing data based on the minimum-valued transmission offset estimate if the minimum-valued transmission offset estimate satisfies the predefined criteria.

In further exemplary aspects of the disclosure, mobile terminal device 1400 and/or processing circuit 1406 may be configured to implement functionality of one or more of method 500, block system 600, method 700, block system 900, method 1000, method 1100, or block system 1200, and accordingly may perform substantially similar functionality to any related components thereof.

As shown in FIG. 14, mobile terminal device may further include antenna 1402, which may receive and/or transmit wireless radio frequency signals. Receiver 1404 may be connected with antenna 1404 such that receiver 1404 may control the reception and transmission of wireless radio frequency signals.

Mobile terminal device 1400 may include further internal components not explicitly pictured in FIG. 14. For example, mobile terminal device 1400 may further include additional components, including hardware, processors, memory, and other specialty or generic hardware/processors/circuits, etc., in order to support a variety of additional operations of wireless radio communications. Mobile terminal device 1400 may include a core central processing unit (CPU), which may be configured to act as a controller for mobile terminal device 1400. The core CPU may be configured to execute applications, such as e.g. applications corresponding to program code stored in a memory component of mobile terminal 1400. The core CPU may also be configured to execute operations according to a protocol stack. Mobile terminal device 1400 may also include a variety of user input/output devices such as displays, keypads, touchscreens, speakers, external buttons, etc.

The implementations detailed herein may thus provide an approach to select proper FFT window placement based on timing and/or phase offset estimates from multiple transmit locations. Such implementations may be particularly applicable to CoMP scenarios, although it is appreciated that the implementations detailed herein are understood to be demonstrative in nature and may thus be applied to any number of scenarios involving timing synchronization with multiple transmit locations. Furthermore, while the exemplary scenarios detailed herein have been detailed regarding a certain number of transmission points, it is understood that the number of transmission points may be any number of transmission points, such as up to four transmission points in CoMP scenarios as specified by 3GPP Release 11.

The following examples pertain to further aspects of this disclosure:

Example 1 is a mobile terminal device. The mobile terminal device includes a receiver circuit configured to receive a plurality of reference signal patterns from a plurality of transmission locations, wherein each of the plurality of reference signal patterns corresponds to a respective transmission location of the plurality of transmission locations, and a processing circuit configured to determine a synchronization offset estimate for each of the plurality of transmission locations based on the plurality of reference signal patterns to generate a plurality of synchronization offset estimates, determine if a minimum-valued synchronization offset estimate of the plurality of synchronization offset estimates satisfies predefined criteria, and determine a reception time window for processing data based on the minimum-valued synchronization offset estimate if the minimum-valued synchronization offset estimate satisfies the predefined criteria.

In Example 2, the subject matter of Example 1 can optionally include wherein the processing circuit is configured to determine if a minimum-valued synchronization offset estimate of the plurality of synchronization offset estimates satisfies predefined criteria by determining if a minimum-valued synchronization offset estimate of the plurality of synchronization offset estimates is negative.

In Example 3, the subject matter of Example 2 can optionally include wherein the processing circuit is configured to determine if a minimum-valued synchronization offset estimate of the plurality of synchronization offset estimates is negative by comparing a minimum-valued synchronization offset estimate of the plurality of synchronization offset estimates to a negative threshold.

In Example 4, the subject matter of Example 2 can optionally include wherein the processing circuit is configured to determine if a minimum-valued synchronization offset estimate of the plurality of synchronization offset estimates satisfies predefined criteria by determining if the difference between a maximum-valued synchronization offset estimate of the plurality of synchronization offset estimates and the minimum-valued synchronization offset estimate is less than a predefined duration.

In Example 5, the subject matter of Example 1 can optionally include wherein the processing circuit is configured to determine if a minimum-valued synchronization offset estimate of the plurality of synchronization offset estimates satisfies predefined criteria by determining if the difference between a maximum-valued synchronization offset estimate of the plurality of synchronization offset estimates and the minimum-valued synchronization offset estimate is less than a predefined duration.

In Example 6, the subject matter of Example 5 can optionally include wherein the receiver circuit is further configured to receive a data sequence of one or more data symbols, and wherein the predefined duration is based on a guard period length associated with the data sequence.

In Example 7, the subject matter of Example 6 can optionally include wherein the data sequence includes one or more Orthogonal Frequency Division Multiplexing (OFDM) data symbols, and wherein the guard period length based on the length of a cyclic prefix associated with the data sequence.

In Example 8, the subject matter of Example 1 can optionally include wherein the processing circuit is configured to determine a synchronization offset estimate for each of the plurality of transmission locations based on the plurality of reference signal patterns to generate a plurality of synchronization offset estimates by calculating at least one of the plurality of synchronization offset estimates based on a first reference signal pattern and a second reference signal pattern of the plurality of reference signal patterns, wherein a synchronization offset estimate range of the first reference signal pattern is greater than a synchronization offset estimate range of the second reference signal pattern.

In Example 9, the subject matter of Example 8 can optionally include wherein the first reference signal pattern is a Demodulation Reference Signal (DMRS) configuration and the second reference signal pattern is a Channel State Information Reference Signal (CSI-RS) configuration.

In Example 10, the subject matter of any one of Examples 1 to 9 can optionally include wherein the receiving circuit is further configured to receive a data sequence including one or more data symbols, and wherein the processing circuit is further configured to apply the reception time window to receive one or more data symbol of the data sequence.

In Example 11, the subject matter of Example 10 can optionally include wherein the receiving circuit is configured to receive the data sequence from a first transmission location of the plurality of transmission locations.

In Example 12, the subject matter of Example 10 can optionally include wherein the processing circuit is configured to apply the reception time window to receive one or more data symbols of the data sequence by applying the reception time window as a Fast Fourier Transform window for receiving one or more data symbols of the data sequence.

In Example 13, the subject matter of any one of Examples 1 to 12 can optionally include wherein the processing circuit is configured to determine a reception time window for processing data based on a default synchronization offset estimate of the plurality of synchronization offset estimates if the minimum-valued transmission offset does not satisfy the predefined criteria.

In Example 14, the subject matter of Example 13 can optionally include wherein a first transmission location of the plurality of transmission locations is a serving cell of the mobile terminal device, and wherein the processing circuit is configured to determine the default synchronization offset estimate based on a first reference signal pattern of the plurality of reference signal patterns corresponding to the first transmission location.

In Example 15, the subject matter of any one of Examples 1 to 14 can optionally include wherein the plurality of reference signals include at least one of a Cell Specific Reference Signal (CRS) configuration, a DMRS configuration, or a CSI-RS configuration.

In Example 16, the subject matter of any one of Examples 1 to 15 can optionally include wherein the processing circuit is configured to calculate at least one of the plurality of synchronization offset estimates based on a first DMRS configuration and a first CSI-RS configuration of the plurality of reference signal patterns.

In Example 17, the subject matter of Example 16 can optionally include wherein the receiver circuit is configured to receive control information indicating similar signal properties between the first DMRS configuration and the first CSI-RS configuration.

In Example 18, the subject matter of Example 17 can optionally include wherein the control information indicates that the first DMRS configuration and the first CSI-RS configuration are quasi co-located.

In Example 19, the subject matter of any one of Examples 1 to 15 can optionally include wherein the processing circuit is configured to calculate at least one of the plurality of synchronization offset estimates based on a first reference signal pattern and a second reference signal pattern of the plurality of reference signal patterns, the first reference signal pattern being a different reference signal type than the second reference signal pattern.

In Example 20, the subject matter of any one of Examples 1 to 19 can optionally include wherein one or more of the plurality of transmission locations are associated with different geographical locations.

In Example 21, the subject matter of any one of Examples 1 to 20 can optionally include wherein the processing circuit is further configured to identify the minimum-valued synchronization offset estimate by performing a comparison on the plurality of synchronization offset estimates.

In Example 22, the subject matter of any one of Examples 1 to 21 can optionally include wherein the plurality of synchronization offset estimates are timing offset estimates or phase offset estimates.

In Example 23, the subject matter of any one of Examples 1 to 22 can optionally include wherein one or more of the plurality of transmission locations are transmission points in a Coordinated Multipoint (CoMP) network.

In Example 24, the subject matter of any one of Examples 1 to 23 can optionally include wherein one or more of the plurality of synchronization offset estimates are average synchronization offset estimates.

In Example 25, the subject matter of any one of Examples 1 to 23 can optionally include wherein the processing circuit is configured to determine a synchronization offset estimate for each of the plurality of transmission locations based on the plurality of reference signal patterns to generate a plurality of synchronization offset estimates by calculating an average synchronization offset estimate by averaging a plurality of intermediate synchronization offset estimate for a first transmission location of the plurality of transmission locations, wherein the plurality of synchronization offset estimates contains the average synchronization offset estimate.

Example 26 is a mobile processing circuit. The mobile processing circuit is configured to determine a synchronization offset estimate for each of a plurality of transmission locations based on a plurality of reference signal patterns to generate a plurality of synchronization offset estimates, wherein each of the plurality of reference signal patterns corresponds to a respective transmission location of the plurality of transmission locations, determine if a minimum-valued synchronization offset estimate of the plurality of synchronization offset estimates satisfies predefined criteria, and determine positioning for a reception time window for processing data based on the minimum-valued synchronization offset estimate if the minimum-valued synchronization offset estimate satisfies the predefined criteria.

In Example 27, the subject matter of Example 26 can optionally include wherein the mobile processing circuit is configured to determine if a minimum-valued synchronization offset estimate of the plurality of synchronization offset estimates satisfies predefined criteria by determining if a minimum-valued synchronization offset estimate of the plurality of synchronization offset estimates is negative.

In Example 28, the subject matter of Example 27 can optionally include wherein the mobile processing circuit is configured to determine if a minimum-valued synchronization offset estimate of the plurality of synchronization offset estimates is negative by comparing a minimum-valued synchronization offset estimate of the plurality of synchronization offset estimates to a negative threshold.

In Example 29, the subject matter of Example 26 can optionally include wherein the mobile processing circuit is configured to determine if a minimum-valued synchronization offset estimate of the plurality of synchronization offset estimates satisfies predefined criteria by determining if the difference between a maximum-valued synchronization offset estimate of the plurality of synchronization offset estimates and the minimum-valued synchronization offset estimate is less than a predefined duration.

In Example 30, the subject matter of Example 29 can optionally include wherein the mobile processing circuit is further configured to process a data sequence of one or more data symbols using the reception time window, and wherein the predefined duration is based on a guard period length associated with the data sequence.

In Example 31, the subject matter of Example 30 can optionally include wherein the data sequence includes one or more Orthogonal Frequency Division Multiplexing (OFDM) data symbols, and wherein the guard period length is based on a cyclic prefix length associated with the data sequence.

In Example 32, the subject matter of Example 26 can optionally include wherein the mobile processing circuit is configured to determine a synchronization offset estimate for each of the plurality of transmission locations based on the plurality of reference signal patterns to generate a plurality of synchronization offset estimates by calculating at least one of the plurality of synchronization offset estimates based on a first reference signal pattern and a second reference signal pattern of the plurality of reference signal patterns, wherein a transmission offset estimation range of the first reference signal pattern is greater than a transmission offset estimation range of the second reference signal pattern.

In Example 33, the subject matter of Example 32 can optionally include wherein the first reference signal pattern is a Demodulation Reference Signal (DMRS) configuration or the second reference signal pattern is a Channel State Information Reference Signal (CSI-RS) configuration.

In Example 34, the subject matter of any one of Examples 26 to 33 can optionally include wherein the mobile processing circuit is further configured to process a data sequence of one or more data symbols using the reception time window.

In Example 35, the subject matter of Example 34 can optionally include wherein the mobile processing circuit is further configured to process a data sequence of one or more data symbols using the reception time window by applying the reception time window as a Fast Fourier Transform time window to demodulate one or more data symbols of the data sequence.

In Example 36, the subject matter of any one of Examples 26 to 35 can optionally include wherein the mobile processing circuit is further configured to determine the reception time window for processing data based on a default synchronization offset estimate of the plurality of synchronization offset estimates if the minimum-valued transmission offset does not satisfy the predefined criteria.

In Example 37, the subject matter of Example 36 can optionally include wherein the mobile processing circuit is configured to determine the default synchronization offset estimate based on a first reference signal pattern of the plurality of reference signal patterns corresponding to a serving cell associated with the mobile processing circuit.

In Example 38, the subject matter of any one of Examples 26 to 37 can optionally include wherein the plurality of reference signal patterns include at least one of a Cell Specific Reference Signal (CRS) configuration, a Demodulation Reference Signal (DMRS) configuration, or a Channel State Information Reference Signal (CSI-RS) configuration.

In Example 39, the subject matter of any one of Examples 26 to 38 can optionally include wherein the mobile processing circuit is configured to calculate at least one of the plurality of synchronization offset estimates based on a first DMRS configuration and a first CSI-RS configuration of the plurality of reference signal patterns.

In Example 40, the subject matter of Example 39 can optionally include wherein the mobile processing circuit is configured to identify control information indicating similar signal properties between the first DMRS configuration and the first CSI-RS configuration.

In Example 41, the subject matter of Example 40 can optionally include wherein the control information indicates that the first DMRS configuration and the first CSI-RS configuration are quasi co-located.

In Example 42, the subject matter of any one of Examples 26 to 41 can optionally include wherein the processing circuit is configured to calculate at least one of the plurality of synchronization offset estimates based on a first reference signal pattern and a second reference signal pattern of the plurality of reference signal patterns, the first reference signal pattern being a different reference signal type than the second reference signal.

In Example 43, the subject matter of any one of Examples 26 to 42 can optionally include wherein one or more of the plurality of transmission locations are associated with different geographical locations.

In Example 44, the subject matter of any one of Examples 26 to 43 can optionally include wherein the mobile processing circuit is further configured to identify the minimum-valued synchronization offset estimate by performing a comparison on the plurality of synchronization offset estimates.

In Example 45, the subject matter of any one of Examples 26 to 44 can optionally include wherein the plurality of synchronization offset estimates are timing offset estimates or phase offset estimates.

In Example 46, the subject matter of any one of Examples 26 to 45 can optionally include wherein one or more of the plurality of transmission locations are transmission points in a Coordinated Multipoint (CoMP) network.

In Example 47, the subject matter of any one of Examples 26 to 46 can optionally include wherein one or more of the plurality of synchronization offset estimates are average synchronization offset estimates.

In Example 48, the subject matter of any one of Examples 26 to 46 can optionally include wherein the mobile processing circuit is configured to determine a synchronization offset estimate for each of the plurality of transmission locations based on the plurality of reference signal patterns to generate a plurality of synchronization offset estimates by calculating an average synchronization offset estimate by averaging a plurality of intermediate synchronization offset estimate for a first transmission location of the plurality of transmission locations, wherein the plurality of synchronization offset estimates contains the average synchronization offset estimate.

Example 49 is a mobile terminal device. The mobile terminal device includes a receiver circuit configured to receive a signal including a data sequence of one or more data symbols and a plurality of reference signal patterns associated with a plurality of transmit locations, and a processing circuit configured to determine a synchronization offset estimate for each of the plurality of transmit locations based on a respective reference signal pattern of the plurality of reference signal patterns in order to determine a plurality of synchronization offset estimates, determine if a minimum-valued synchronization offset estimate of the plurality of synchronization offset estimates is negative to determine a first determination result, determine if the difference between a maximum-valued synchronization offset estimate of the plurality of synchronization offset estimates and the minimum-valued synchronization offset estimate of the plurality of synchronization offset estimates is less than a predefined time duration to determine a second determination result, and determining positioning for a reception time window relative to the data sequence based on the minimum-valued synchronization offset estimate, the first determination result, and the second determination result.

In Example 50, the subject matter of Example 49 can optionally include wherein the receiver circuit is further configured to process the data sequence using the reception time window, and wherein the predefined duration is based on a guard period associated with the data sequence.

In Example 51, the subject matter of Example 49 or 50 can optionally include wherein the data sequence includes one or more OFDM data symbols, and wherein the predefined time duration is based on the length of a cyclic prefix associated with the data sequence.

In Example 52, the subject matter of any one of Examples 49 to 51 can optionally include wherein the processing circuit is configured to determine a synchronization offset estimate for each of the plurality of transmit locations based on the plurality of reference signal patterns to generate a plurality of synchronization offset estimates by calculating at least one of the plurality of synchronization offset estimates based on a first reference signal pattern and a second reference signal pattern of the plurality of reference signal patterns, wherein a transmission offset estimation range of the first reference signal pattern is greater than a transmission offset estimation range of the second reference signal pattern.

In Example 53, the subject matter of Example 52 can optionally include wherein the wherein the first reference signal pattern is a Demodulation Reference Signal (DMRS) configuration and the second reference signal pattern is a Channel State Information Reference Signal (CSI-RS) configuration.

In Example 54, the subject matter of Example 49 can optionally include wherein the processing circuit is further configured to process the data sequence using the reception time window.

In Example 55, the subject matter of Example 54 can optionally include wherein the processing circuit is further configured to process one or more data symbols of the data sequence using the reception time window by applying the reception time window as a Fast Fourier Transform window for receiving one or more data symbols of the data sequence.

In Example 56, the subject matter of Example 49 can optionally include wherein the processing circuit is further configured to process one or more data symbols of the data sequence received from more than one of the plurality of transmit locations using the reception time window.

In Example 57, the subject matter of Example 56 can optionally include wherein the processing circuit is configured to process one or more data symbols of the data sequence received from more than one of the plurality of transmit locations using the reception time window by applying the reception time window as a Fast Fourier Transform window to the one or more data symbols of the data sequence.

In Example 58, the subject matter of any one of Examples 49 to 57 can optionally include wherein the processing circuit is configured to determine positioning for a reception time window for processing data based on a default synchronization offset estimate of the plurality of synchronization offset estimates if the first determination result or the second determination result is negative.

In Example 59, the subject matter of Example 58 can optionally include wherein the processing circuit is configured to determine the default synchronization offset estimate based on a first reference signal pattern of the plurality of reference signal patterns corresponding to a serving cell of the mobile terminal device.

In Example 60, the subject matter of any one of Examples 49 to 59 can optionally include wherein the plurality of reference signals include at least one of a Cell Specific Reference Signal (CRS) configuration, a Demodulated Reference Signal (DMRS) configuration, or a Channel State Information Reference Signal (CSI-RS) Configuration.

In Example 61, the subject matter of any one of Examples 49 to 60 can optionally include wherein the mobile processing circuit is configured to calculate at least one of the plurality of synchronization offset estimates based on a first DMRS configuration and a first CSI-RS configuration of the plurality of reference signal patterns.

In Example 62, the subject matter of Example 61 can optionally include wherein the receiver circuit is further configured to receive control information indicating similar signal properties between the first DMRS configuration and the first CSI-RS configuration.

In Example 63, the subject matter of Example 62 can optionally include wherein the control information indicates that the first DMRS configuration and the first CSI-RS configuration are quasi co-located.

In Example 64, the subject matter of any one of Examples 49 to 63 can optionally include wherein the processing circuit is configured to calculate at least one of the plurality of synchronization offset estimates based on a first reference signal pattern and a second reference signal pattern of the plurality of reference signal patterns, the first reference signal pattern being a different reference signal type than the second reference signal In Example 65, the subject matter of any one of Examples 49 to 64 can optionally include wherein one or more of the plurality of transmit locations are associated with different geographical locations.

In Example 66, the subject matter of any one of Examples 49 to 65 can optionally include wherein the processing circuit is further configured to identify the minimum-valued synchronization offset estimate by performing a comparison on the plurality of synchronization offset estimates.

In Example 67, the subject matter of any one of Examples 49 to 66 can optionally include wherein the processing circuit is further configured to identify the maximum-valued synchronization offset estimate by performing a comparison on the plurality of synchronization offset estimates.

In Example 68, the subject matter of any one of Examples 49 to 67 can optionally include wherein the plurality of synchronization offset estimates are timing offset estimates or phase offset estimates.

In Example 69, the subject matter of any one of Examples 49 to 68 can optionally include wherein one or more of the plurality of transmit locations are transmission points in a Coordinated Multipoint (CoMP) network.

In Example 70, the subject matter of any one of Examples 49 to 69 can optionally include wherein one or more of the plurality of synchronization offset estimates are average synchronization offset estimates.

In Example 71, the subject matter of any one of Examples 45 to 69 can optionally include wherein the processing circuit is configured to determine a synchronization offset estimate for each of the plurality of transmission locations based on the plurality of reference signal patterns to generate a plurality of synchronization offset estimates by calculating an average synchronization offset estimate by averaging a plurality of intermediate synchronization offset estimate for a first transmission location of the plurality of transmission locations, wherein the plurality of synchronization offset estimates contains the average synchronization offset estimate.

Example 72 is a method of receiving signals. The method includes determining a synchronization offset estimate for each of a plurality of transmission locations based on a plurality of reference signal patterns to generate a plurality of synchronization offset estimates, wherein each of the plurality of reference signal patterns corresponds to a respective transmission location of the plurality of transmission locations, determining if a minimum-valued synchronization offset estimate of the plurality of synchronization offset estimates satisfies predefined criteria, and determining a reception time window for processing data based on the minimum-valued synchronization offset estimate if the minimum-valued synchronization offset estimate of the plurality of synchronization offset estimates does not satisfy the predefined criteria.

In Example 73, the subject matter of Example 72 can optionally include processing data received from more than one of the plurality of transmission locations using the reception time window.

In Example 74, the subject matter of Example 72 or 73 can optionally include wherein the determining if a minimum-valued synchronization offset estimate of the plurality of synchronization offset estimates satisfies predefined criteria includes determining if a minimum-valued synchronization offset estimate of the plurality of synchronization offset estimates is negative.

In Example 75, the subject matter of Example 74 can optionally include wherein the determining if a minimum-valued synchronization offset estimate of the plurality of synchronization offset estimates is negative includes comparing a minimum-valued synchronization offset estimate of the plurality of synchronization offset estimates to a negative threshold.

In Example 76, the subject matter of Example 72 can optionally include wherein the determining if a minimum-valued synchronization offset estimate of the plurality of synchronization offset estimates satisfies predefined criteria includes determining if the difference between a maximum-valued synchronization offset estimate of the plurality of synchronization offset estimates and the minimum-valued synchronization offset estimate is less than a predefined duration.

In Example 77, the subject matter of Example 74 can optionally include processing a data sequence of one or more data symbols using the reception time window, and wherein the predefined duration is based on a guard period length associated with the data sequence.

In Example 78, the subject matter of Example 77 can optionally include wherein the data sequence includes one or more Orthogonal Frequency Division Multiplexing (OFDM) data symbols, and wherein the guard period length is based on a cyclic prefix length associated with the data sequence.

In Example 79, the subject matter of any one of Examples 72 to 78 can optionally include wherein the determining a synchronization offset estimate for each of the plurality of transmission locations based on the plurality of reference signal patterns to generate a plurality of synchronization offset estimates includes calculating at least one of the plurality of synchronization offset estimates based on a first reference signal pattern and a second reference signal pattern of the plurality of reference signal patterns, wherein a transmission offset estimation range of the first reference signal pattern is greater than a transmission offset estimation range of the second reference signal pattern.

In Example 80, the subject matter of Example 72 can optionally include wherein the first reference signal pattern is a Demodulation Reference Signal (DMRS) configuration and the second reference signal pattern is a Channel State Information Reference Signal (CSI-RS) configuration.

In Example 81, the subject matter of any one of Examples 72 to 80 can optionally include processing a data sequence of one or more data symbols using the reception time window.

In Example 82, the subject matter of Example 81 can optionally include wherein the processing a data sequence of one or more data symbol using the reception time window includes applying the reception time window as a Fourier Transform Time window to demodulate one or more data symbols of the data sequence.

In Example 83, the subject matter of any one of Examples 72 to 78 can optionally include determining the reception time window for processing data based on a default synchronization offset estimate of the plurality of synchronization offset estimates if the minimum-valued synchronization offset estimate does not satisfy the predefined criteria.

In Example 84, the subject matter of Example 83 can optionally include determining the default synchronization offset estimate based on a first reference signal pattern of the plurality of reference signal patterns corresponding to a serving cell.

In Example 85, the subject matter of any one of Examples 73 to 84 can optionally include wherein the plurality of reference signal patterns include at least one of a Cell Specific Reference Signal (CRS) configuration, a Demodulation Reference Signal (DMRS) configuration, or a Channel State Information Reference Signal (CSI-RS) configuration.

In Example 86, the subject matter of any one of Examples 72 to 85 can optionally include calculating at least one of the plurality of synchronization offset estimates based on a first DMRS configuration and a first CSI-RS configuration of the plurality of reference signal patterns.

In Example 87, the subject matter of Example 86 can optionally include identifying control information indicating similar signal properties between the first DMRS configuration and the first CSI-RS configuration.

In Example 88, the subject matter of Example 87 can optionally include wherein the control information indicates that the first DMRS configuration and the first CSI-RS configuration are quasi co-located.

In Example 89, the subject matter of any one of Examples 72 to 88 can optionally include wherein one or more of the plurality of transmission locations are associated with different geographical locations.

In Example 90, the subject matter of any one of Examples 72 to 89 can optionally include identifying the minimum-valued synchronization offset estimate by performing a comparison on the plurality of synchronization offset estimates.

In Example 91, the subject matter of any one of Examples 72 to 90 can optionally include wherein the plurality of synchronization offset estimates are timing offset estimates or phase offset estimates.

In Example 92, the subject matter of any one of Examples 72 to 91 can optionally include wherein one or more of the plurality of transmission locations are transmission points in a Coordinated Multipoint (CoMP) network.

In Example 93, the subject matter of any one of Examples 72 to 92 can optionally include receiving a signal including the plurality of reference signal patterns.

In Example 94, the subject matter of any one of Examples 72 to 93 can optionally include wherein one or more of the plurality of synchronization offset estimates are average synchronization offset estimates.

In Example 95, the subject matter of any one of Examples 72 to 93 can optionally include wherein the determining a synchronization offset estimate for each of a plurality of transmission locations based on a plurality of reference signal patterns to generate a plurality of synchronization offset estimates includes calculating an average synchronization offset estimate by averaging a plurality of intermediate synchronization offset estimate for a first transmission location of the plurality of transmission locations, wherein the plurality of synchronization offset estimates contains the average synchronization offset estimate.

In Example 96, the subject matter of Example 1 can optionally include wherein the processing circuit is further configured to compare the plurality of synchronization offset estimates to each other to identify the minimum-valued synchronization offset estimate.

In Example 97, the subject matter of Example 27 can optionally include wherein the mobile processing circuit is further configured to compare the plurality of synchronization offset estimates to each other to identify the minimum-valued synchronization offset estimate.

In Example 98, the subject matter of Example 52 can optionally include wherein the processing circuit is further configured to compare the plurality of synchronization offset estimates to each other to identify the minimum-valued synchronization offset estimate.

In Example 99, the subject matter of Example 76 can optionally further include comparing the plurality of synchronization offset estimates to each other to identify the minimum-valued synchronization offset estimate.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device comprising:
 a receiver circuit configured to receive a plurality of reference signal patterns from a plurality of transmission locations, wherein each of the plurality of reference signal patterns corresponds to a respective transmission location of the plurality of transmission locations; and
 a processing circuit configured to:
 determine a synchronization offset estimate for each of the plurality of transmission locations based on the plurality of reference signal patterns to generate a plurality of synchronization offset estimates;
 determining if a difference between a maximum-valued synchronization offset estimate of the plurality of synchronization offset estimates and a minimum-valued synchronization offsets estimates of the plurality of synchronization offset estimates is less than a predefined duration; and
 determine a reception time window for processing data based on the minimum-valued synchronization offset estimate if the minimum-valued synchronization offset estimate satisfies the predefined criteria.

2. The mobile terminal device of claim 1, wherein the processing circuit is further configured to:
 compare the plurality of synchronization offset estimates to identify the minimum-valued synchronization offset estimate.

3. The mobile terminal device of claim 1, wherein the processing circuit is configured to determine if a minimum-valued synchronization offset estimate of the plurality of synchronization offset estimates satisfies predefined criteria by:
 determining if a minimum-valued synchronization offset estimate of the plurality of synchronization offset estimates is negative.

4. The mobile terminal device of claim 1, wherein the receiver circuit is further configured to receive a data sequence of one or more data symbols,
 and wherein the predefined duration is based on a guard period length associated with the data sequence.

5. The mobile terminal device of claim 4, wherein the data sequence comprises one or more Orthogonal Frequency Division Multiplexing (OFDM) data symbols, and wherein the guard period length based on the length of a cyclic prefix associated with the data sequence.

6. The mobile terminal device of claim 1, wherein the processing circuit is configured to determine a synchronization offset estimate for each of the plurality of transmission locations based on the plurality of reference signal patterns to generate a plurality of synchronization offset estimates by:
calculating at least one of the plurality of synchronization offset estimates based on a first reference signal pattern and a second reference signal pattern of the plurality of reference signal patterns, wherein a synchronization offset estimate range of the first reference signal pattern is greater than a synchronization offset estimate range of the second reference signal pattern.

7. The mobile terminal device of claim 6, wherein the first reference signal pattern is a Demodulation Reference Signal (DMRS) configuration and the second reference signal pattern is a Channel State Information Reference Signal (CSI-RS) configuration.

8. The mobile terminal device of claim 1, wherein the receiving circuit is further configured to receive a data sequence comprising one or more data symbols,
and wherein the processing circuit is further configured to apply the reception time window to receive one or more data symbol of the data sequence.

9. The mobile terminal device of claim 8, wherein the processing circuit is configured to apply the reception time window to receive one or more data symbols of the data sequence by:
applying the reception time window as a Fast Fourier Transform window for receiving one or more data symbols of the data sequence.

10. The mobile terminal device of claim 1, wherein the processing circuit is configured to determine a reception time window for processing data based on a default synchronization offset estimate of the plurality of synchronization offset estimates if the minimum-valued transmission offset does not satisfy the predefined criteria.

11. The mobile terminal device of claim 10, wherein a first transmission location of the plurality of transmission locations is a serving cell of the mobile terminal device,
and wherein the processing circuit is configured to determine the default synchronization offset estimate based on a first reference signal pattern of the plurality of reference signal patterns corresponding to the first transmission location.

12. The mobile terminal device of claim 1 wherein the plurality of synchronization offset estimates are timing offset estimates or phase offset estimates.

13. The mobile terminal device of claim 1, wherein one or more of the plurality of transmission locations are transmission points in a Coordinated Multipoint (CoMP) network.

14. A mobile terminal device comprising:
a receiver circuit configured to receive a signal comprising a data sequence of one or more data symbols and a plurality of reference signal patterns associated with a plurality of transmit locations; and
a processing circuit configured to:
determine a synchronization offset estimate for each of the plurality of transmit locations based on a respective reference signal pattern of the plurality of reference signal patterns in order to determine a plurality of synchronization offset estimates;
determine if a minimum-valued synchronization offset estimate of the plurality of synchronization offset estimates is negative to determine a first determination result;
determine if the difference between a maximum-valued synchronization offset estimate of the plurality of synchronization offset estimates and the minimum-valued synchronization offset estimate of the plurality of synchronization offset estimates is less than a predefined time duration to determine a second determination result; and
determining positioning for a reception time window relative to the data sequence based on the minimum-valued synchronization offset estimate, the first determination result, and the second determination result.

15. The mobile terminal device of claim 14, wherein the data sequence comprises one or more OFDM data symbols, and wherein the predefined time duration is based on the length of a cyclic prefix associated with the data sequence.

16. The mobile terminal device of claim 14, wherein the processing circuit is further configured to process one or more data symbols of the data sequence received from more than one of the plurality of transmit locations using the reception time window.

17. A method of receiving signals comprising:
determining a synchronization offset estimate for each of a plurality of transmission locations based on a plurality of reference signal patterns to generate a plurality of synchronization offset estimates, wherein each of the plurality of reference signal patterns corresponds to a respective transmission location of the plurality of transmission locations;
determining if a difference between a maximum-valued synchronization offset estimate of the plurality of synchronization offset estimates and a minimum-valued synchronization offset estimate is less than a predefined duration; and
determining a reception time window for processing data based on the minimum-valued synchronization offset estimate if the minimum-valued synchronization offset estimate of the plurality of synchronization offset estimates does not satisfy the predefined criteria.

18. The method of claim 17, further comprising processing data received from more than one of the plurality of transmission locations using the reception time window.

19. The method of claim 17, wherein the determining if a minimum-valued synchronization offset estimate of the plurality of synchronization offset estimates satisfies predefined criteria comprises:
determining if a minimum-valued synchronization offset estimate of the plurality of synchronization offset estimates is negative.

* * * * *